US009817294B2

(12) United States Patent
Goi et al.

(10) Patent No.: US 9,817,294 B2
(45) Date of Patent: Nov. 14, 2017

(54) OPTICAL MODULATION DEVICE

(71) Applicant: FUJIKURA LTD., Tokyo (JP)

(72) Inventors: Kazuhiro Goi, Sakura (JP); Hiroki Ishihara, Sakura (JP); Kensuke Ogawa, Sakura (JP); Kenji Oda, Sakura (JP); Hiroyuki Kusaka, Sakura (JP); Ryokichi Matsumoto, Sakura (JP); Hitoshi Uemura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/748,895

(22) Filed: Jun. 24, 2015

(65) Prior Publication Data

US 2015/0293427 A1 Oct. 15, 2015

Related U.S. Application Data

(63) Continuation of application No. PCT/JP2013/085137, filed on Dec. 27, 2013.

(30) Foreign Application Priority Data

Dec. 27, 2012 (JP) .................................. 2012-284723
Dec. 27, 2012 (JP) .................................. 2012-284724

(51) Int. Cl.
*G02F 1/035* (2006.01)
*G02F 1/225* (2006.01)
(Continued)

(52) U.S. Cl.
CPC ....... *G02F 1/2257* (2013.01); *G02B 6/29353* (2013.01); *G02B 6/29355* (2013.01);
(Continued)

(58) Field of Classification Search
USPC ...................................................... 385/32, 60
See application file for complete search history.

(56) References Cited

U.S. PATENT DOCUMENTS 5,078,516 A 1/1992 Kapon et al.
5,799,119 A 8/1998 Rolland et al.
(Continued)

FOREIGN PATENT DOCUMENTS

CN 1963577 A 5/2007
EP 0816908 A2 1/1998
(Continued)

OTHER PUBLICATIONS

Communication dated Jun. 7, 2016 from the European Patent Office issued in corresponding Application No. 13867394.2.
(Continued)

*Primary Examiner* — Eric Wong
(74) *Attorney, Agent, or Firm* — Sughrue Mion, PLLC

(57) ABSTRACT

An optical modulation device configured of a planar optical waveguide, includes: a light incidence unit which allows light to be incident on the planar optical waveguide; a Mach-Zehnder interferometer which includes a first optical splitter section branching the light incident on the light incidence unit, two arm portions guiding the light branched by the first optical splitter section, a phase modulation unit linearly disposed on each of the two arm portions, and a first optical coupler section combining the light guided from the two arm portions; a light launching unit which launches the light combined by the first optical coupler section from the planar optical waveguide; and a traveling-wave electrode which includes an input unit and an output unit, and applies a voltage to the phase modulation unit.

22 Claims, 38 Drawing Sheets

(51) Int. Cl.
    *G02F 1/025* (2006.01)
    *G02F 1/21* (2006.01)
    *G02B 6/293* (2006.01)
    *G02B 6/122* (2006.01)
    *G02B 6/12* (2006.01)
    *G02B 6/125* (2006.01)

(52) U.S. Cl.
    CPC .............. *G02F 1/025* (2013.01); *G02F 1/218* (2013.01); *G02F 1/2255* (2013.01); *G02B 6/122* (2013.01); *G02B 6/125* (2013.01); *G02B 6/1228* (2013.01); *G02B 2006/12097* (2013.01); *G02B 2006/12142* (2013.01); *G02B 2006/12147* (2013.01); *G02B 2006/12159* (2013.01); *G02F 2001/212* (2013.01); *G02F 2201/58* (2013.01)

(56) References Cited

U.S. PATENT DOCUMENTS

| | | | | |
|---|---|---|---|---|
| 2004/0240036 | A1* | 12/2004 | Porte | G02F 1/0356 359/322 |
| 2007/0104407 | A1* | 5/2007 | Mitomi | G02B 6/125 385/8 |
| 2010/0232737 | A1 | 9/2010 | Sugiyama et al. | |

FOREIGN PATENT DOCUMENTS

| | | |
|---|---|---|
| JP | 63-168620 A | 7/1988 |
| JP | 10-073792 A | 3/1998 |
| JP | 10-142566 A | 5/1998 |
| JP | 2007-133135 A | 5/2007 |
| JP | 2009-244812 A | 10/2009 |
| JP | 2010-217427 A | 9/2010 |
| JP | 2011-064993 A | 3/2011 |
| JP | 2012-013935 A | 1/2012 |
| JP | 2012-163876 A | 8/2012 |

OTHER PUBLICATIONS

Communication dated May 2, 2017, from the State Intellectual Property Office of People's Republic of China in counterpart Application No. 201380068057.9.
Communication dated Mar. 7, 2017, from the Japanese Patent Office in counterpart Japanese application No. 2014-554599.
Communication dated Jul. 5, 2016 from the Japanese Patent Office in counterpart application No. 2014-554599.
Po Dong et al., "High-speed low-voltage single-drive push-pull silicon Mach-Zehnder modulators", Optics Express, 2012, pp. 6163-6169, vol. 20, No. 6.
Po Dong et al., "112-Gb/s Monolithic PDM-QPSK Modulator in Silicon", European Conference and Exhibition on Optical Communication, 2012, Th.3.B.1.
Tsung-Yang Liow et al., "Silicon Modulators and Germanium Photodetectors on SOI: Monolithic Integration, Compatibility, and Performance Optimization", IEEE Journal of Selected Topics in Quantum Electronics, 2010, pp. 307-315, vol. 16, No. 1.
Tai Tsuchizawa et al., "Microphotonics Devices Based on Silicon Microfabrication Technology", IEEE Journal of Selected Topics in Quantum Electronics, 2005, pp. 232-240, vol. 11, No. 1.
Communication dated Aug. 15, 2017, from the Japanese Patent Office in counterpart Japanese application No. 2014-554599.

* cited by examiner

OPTICAL MODULATION DEVICE

CROSS REFERENCE TO RELATED APPLICATIONS

This application is a continuation application based on a PCT Patent Application No. PCT/JP2013/085137, filed Dec. 27, 2013, whose priority is claimed on Japanese Patent Application No. 2012-284723, filed on Dec. 27, 2012, and Japanese Patent Application No. 2012-284724, filed on Dec. 27, 2012

BACKGROUND OF THE INVENTION

Field of the Invention

The present invention relates to a structure of an optical waveguide device which is manufactured on a substrate, and in particular, relates to the design of an electrode and a waveguide of an optical modulation device.

Description of the Related Art

Currently, the amount of information used in optical communication has been increasing. In order to respond to such an increase in the amount of information, a response such as an increase in a signal speed and an increase in the number of channels due to wavelength multiplexing communication has progressed in an optical communication network such as a backbone, a metro, or an access. According to this, a system necessary for optical communication is complicated, and thus problems such as an increase in a device size, an increase in the cost, and an increase in power consumption occur.

In addition, even in a data center which has been recently increased, a response to an increase in the amount of information is required, as with the network. In the related art, an electrical signal was mainly transmitted through a metal cable in communication between computers in the data center. However, recently, optical communication using an optical fiber has been used due to demand for further increase in the speed and of further decreasing power consumption. Furthermore, even in each level such as inside a board and inside the CPU of the computer, there is a problem in optical communication introduction.

As means for solving such problems in the optical communication network and for realizing optical communication introduction with respect to new fields, a light integrated circuit of a planar light circuit (PLC) formed of quartz (silica), and a high speed operation device of a ferroelectric such as lithium niobate (LN), and the like have been used from the related art. Recently, in addition to this, an optical device using a high refractive index material such as silicon, InP, and GaAs has been also attracting attention. Research and development of a planar optical waveguide device (an optical device) have progressed in various places (for example, refer to P. Dong, L. Chen, and Y-kai Chen, "High-speed low-voltagesingle-drive push-pull silicon Mach-Zehnder modulators", Optics Express, 2012, Vol. 20, Issue 6, p. 6163-6169 (hereinafter referred to as "NPL 1"), P. Dong, C. Xie, L. Chen, L. L. Buhl, and Y.-K. Chen, "112-Gb/s Monolithic PDM-QPSK Modulator in Silicon", European Conference and Exhibition on Optical Communication, 2012, Th.3.B.1 (hereinafter referred to as "NPL 2"), T.-Y Liow, K.-W. Ang, Q. Fang, J.-F. Song, Y-Z. Xiong, M.-B. Yu, G-Q. Lo, and D.-L. Kwong, "Silicon Modulators and Germanium Photodetectors on SOI: Monolithic Integration, Compatibility, and Performance Optimization", IEEE Journal of Selected Topics in Quantum Electronics, 2010, Vol. 16, p. 307-315 (hereinafter referred to as "NPL 3"), and T. Tsuchizawa, K. Yamada, H. Fukuda, T. Watanabe, J. Takahashi, M. Takahashi, T. Shoji, E. Tamechika, S. Itabashi, and H. Morita, "Microphotonics devices based on silicon microfabrication technology", IEEE Journal of Selected Topics in Quantum Electronics, 2005, Vol. 11, p. 232-240 (hereinafter referred to as "NPL 4")).

A wavelength of light in a medium is inversely proportionate to a refractive index of the medium, and thus, in silicon of which a refractive index is high as approximately 3.5, a size such as a core width of an optical waveguide decreases. In addition, by using a medium such as silica of which a refractive index is considerably different from that of silicon of the core in a clad, an optical waveguide having high confinement is obtained. As characteristics of such an optical waveguide, a decrease in a radius of curvature is included. From these reasons, it is possible to decrease the size of an optical device using the optical waveguide, and thus it is possible to further decrease the size if the required functions of the optical device are same, and it is possible to realize various functions if the required size of the optical device are same.

In addition, by using silicon which is an electrically controllable semiconductor material, it is possible to realize a device having variable properties such as an optical modulator.

Furthermore, the optical device using silicon has a common element with a semiconductor device such as a CPU or a memory of the related art in a technology and a device used for a manufacturing process, and thus it is possible to reduce the cost due to quantity production. In addition, the optical device using the silicon can also integrate the optical device on the same substrate as that of a semiconductor device of related art. In this case, an electrical signal transmitted through metal wiring of the related art is replaced with an optical signal transmitted through the optical waveguide, and thus it is possible to increase the speed of additional instruments and to reduce power consumption.

In such circumstances, the optical modulator is one of major devices in the optical communication of converting the electrical signal into the optical signal, and has been studied by various institutes as an element for realizing an optical integrated device, as with other devices (for example, refer to NPL 1 to NPL 3).

In a Mach-Zehnder optical modulator using a semiconductor, a traveling-wave electrode is used in which the phase of the optical signal and the phase of the electrical signal are matched, and a voltage is applied from the outside of a substrate. Termination is performed on the outside of the substrate, but the termination may be performed on the substrate by arranging a resistor, or by forming a resistor in the process. On the other hand, in at least the input of the voltage, the voltage is usually applied from the outside of the substrate. In an LN modulator of the related art, as illustrated in FIG. 2, optical waveguides 113 and 115 before and after a Mach-Zehnder interferometer 120 are arranged on a straight line from a light incidence unit 112 to a light launching unit 114, and an earth electrode 130G, and an input unit 131 and an output unit 132 of a signal electrode 130S are formed on the side of the Mach-Zehnder interferometer 120. An electrical signal input from the outside is applied to an electrode on the substrate through the input unit 131 on the side of the substrate connected to the outside by wire bonding or the like. However, it is known that a traveling-wave electrode on a silicon substrate has a large propagation loss in the electrical signal, and when the electrode in a portion other than the phase modulation unit 124 is elongated, a loss due to a high frequency is remarkable in which modulation efficiency decreases due to a loss in power of the electrical signal, and thus a decrease in a modulation bandwidth is caused.

The present invention has been made in view of the above-described situation, and an object of the invention is to provide an optical modulation device which can shorten a distance from a phase modulation unit of an electrode to a device end portion.

In addition, the present invention is to provide an optical modulation device which can shorten a distance from the phase modulation unit of the electrode to the device end portion and is able to realize a further decrease in the size by decreasing a substrate in a longitudinal direction.

SUMMARY

In order to solve the aforementioned problem, according to a first aspect of the invention, an optical modulation device includes: a light incidence unit which allows light to be incident on the planar optical waveguide; a Mach-Zehnder interferometer which includes a first optical splitter section branching the light incident on the light incidence unit, two arm portions guiding the light branched by the first optical splitter section, a phase modulation unit linearly disposed on each of the two arm portions, and a first optical coupler section combining the light guided from the two arm portions; a light launching unit which launches the light combined by the first optical coupler section from the planar optical waveguide; and a traveling-wave electrode which includes an input unit and an output unit, and applies a voltage to the phase modulation unit, in which the planar optical waveguide has an outline including two sides each of which intersects with an extended line in a longitudinal direction of the phase modulation unit in a plan view, the input unit is formed on one of the two sides, and the light incidence unit and the light launching unit are positioned in a region different from a region in which the traveling-wave electrode is formed in a plan view.

The longitudinal direction of the phase modulation unit may be perpendicular to the two sides.

The longitudinal direction of the phase modulation unit may have an inclination at an angle of greater than 0° and less than 90° with respect to each of the two sides.

Distances between each of the two phase modulation units and one side may be identical to each other, and distances between the each of the two phase modulation unit and an other side may be identical to each.

The phase modulation units may be arranged in parallel with each other.

The output unit may be formed on the other side.

The traveling-wave electrode may be linearly formed from the input unit to the output unit.

The planar optical waveguide may be in a shape of a polygon configured of a plurality of sides including the two sides in a plan view, and the light incidence unit and the light launching unit may be arranged on a side different from the two sides among the plurality of sides.

The planar optical waveguide may be in a shape of a polygon configured of a plurality of sides including the two sides in plan view, and the light incidence unit and the light launching unit may be arranged on any one of the plurality of sides, and the side on which the light incidence unit is arranged and the side on which light launching unit is arranged may be different from each other.

The planar optical waveguide may be in a shape of a polygon configured of a plurality of sides including the two sides in a plan view, and the light incidence unit and the light launching unit may be arranged on any one of the plurality of sides, and the side on which the light incidence unit is arranged and the side on which light launching unit is arranged may be identical to each other.

The optical modulation device according to the first aspect described above may further include a groove portion which is configured to fix an optical fiber, in which one end of the groove portion may be formed on the outline, and at least one of the light incidence unit and the light launching unit may be formed on the other end of the groove portion.

The light incidence unit and the light launching unit may be positioned on the outside of a region between two lines each of which extends in a direction in parallel with the two sides from both end portions of the phase modulation unit.

The light incidence unit and the light launching unit may be positioned in a region between two lines which respectively extend in a direction in parallel with the two sides from both end portions of the phase modulation unit.

Part of the optical waveguide configuring the Mach-Zehnder interferometer may be positioned on the outside of a region between the extended lines of the two phase modulation units.

At least one of the two arm portions may further include other element parts including at least one of a low speed phase modulation unit, a PD for a monitor, a polarization conversion element, a polarized wave separating and coupling element, and a variable optical attenuator, and at least part of the other element parts may be positioned on the outside of the region between the extended lines.

At least one of the two arm portions may further include other element parts including at least one of a low speed phase modulation unit, a PD for a monitor, a polarization conversion element, a polarized wave separating and coupling element, and a variable optical attenuator, and at least part of the other element parts may be positioned on the inside of the region between the extended lines.

At least one of the first optical splitter section and the first optical coupler section may be positioned on the outside of the region between the extended lines.

Lengths of the two arm portions may be identical to each other.

At least one of the first optical splitter section and the first optical coupler section may be positioned in a region between two lines which respectively extend in a direction in parallel with the two sides from both end portions of the phase modulation unit.

The planar optical waveguide may include a plurality of Mach-Zehnder interferometers.

The optical modulation device according to the first aspect described above may further include at least one of a second optical splitter section which branches the light incident from the light incidence unit and launches the light to the plurality of Mach-Zehnder interferometers, and a second optical coupler section which combines the light launched from the plurality of Mach-Zehnder interferometers.

The optical modulation device according to the first aspect described above includes the second optical splitter section, and at least part of waveguides connecting the plurality of Mach-Zehnder interferometers to the second optical splitter section may be positioned on the outside of a region between two extended lines in the longitudinal direction of each of the phase modulation units included in the plurality of Mach-Zehnder interferometers, which are furthest from each other.

The optical modulation device according to the first aspect described above includes the second optical coupler section, and at least part of waveguides connecting the plurality of Mach-Zehnder interferometers to the second optical coupler section may be positioned on the outside of a region between two extended lines in the longitudinal direction of each of the phase modulation units included in the plurality of Mach-Zehnder interferometers, which are furthest from each other.

At least one of the second optical splitter section and the second optical coupler section may be positioned on the outside of the region between the two lines which are furthest from each other.

The lengths of the waveguides connecting the plurality of Mach-Zehnder interferometers to the second optical splitter section may be identical to each other.

The lengths of the waveguides connecting the plurality of Mach-Zehnder interferometers to the second optical coupler section may be identical to each other.

The planar optical waveguide may have a QPSK structure or a DP-QPSK structure.

At least one of the first optical splitter section and the first optical coupler section may be formed of a multimode interferometer.

At least one of the first optical splitter section, the first optical coupler section, and the second optical splitter section, and the second optical coupler section may be formed of a multimode interferometer.

The traveling-wave electrode may have any one of (1) a GSG structure which includes a signal electrode between the two arm portions, and includes an earth electrode on the outside of each of the two arm portions, (2) a GSGSG structure which includes an earth electrode between the two arm portions, includes a signal electrode on the outside of each of the two arm portions, and further includes an earth electrode on the outside of the signal electrode, and (3) a GS structure which includes an earth electrode and a signal electrode on the outside of each of the two arm portions. In addition, the traveling-wave electrode may have a GSG structure which is independent such that the signal electrode is arranged on the inside and the earth electrode is arranged further on the inside and on a position opposite to the signal electrode through the arm, independently from the two arms. In addition, the traveling-wave electrode may have a GSG structure which is independent such that the signal electrode is arranged on the outside and the earth electrode is arranged further on the outside and on a position opposite to the signal electrode through the arm, independently from the two arms.

At least one of a light source and a light receiver may be disposed on the planar optical waveguide.

An optical waveguide configuring the phase modulation unit may be formed of a rib waveguide which includes a rib portion, and a pair of slab portions each connected to both sides of the rib portion.

A rectangular waveguide may be connected to at least one end of the rib waveguide, and a transition region in which a width between the pair of slab portions is continuously changed to be optically coupled to the rectangular waveguide, may be included in a connection portion between the rib waveguide and the rectangular waveguide.

A core configuring the planar optical waveguide may be formed of silicon.

A substrate configuring the planar optical waveguide may be formed of silicon.

A clad formed of silica may be disposed between an upper surface of a core configuring the planar optical waveguide and the traveling-wave electrode, and a thickness of the clad in a position in which the core and the traveling-wave electrode vertically intersect with each other in a portion other than the phase modulation unit, may be greater than or equal to 1 μm.

In addition, according to a second aspect of the invention, an optical modulation device module includes: the optical modulation device according to the first aspect described above; and a package containing the optical modulation device.

According to the aspects of the present invention described above, it is possible to shorten a distance from a phase modulation unit of an electrode to a device end portion. Accordingly, it is possible to suppress a decrease in modulation efficiency due to a propagation loss of an electrical signal on the electrode.

DETAILED DESCRIPTION OF THE PREFERRED EMBODIMENTS

Hereinafter, the present invention will be described with reference to the drawings on the basis of preferred embodiments.

First Embodiment

Figure 1A:
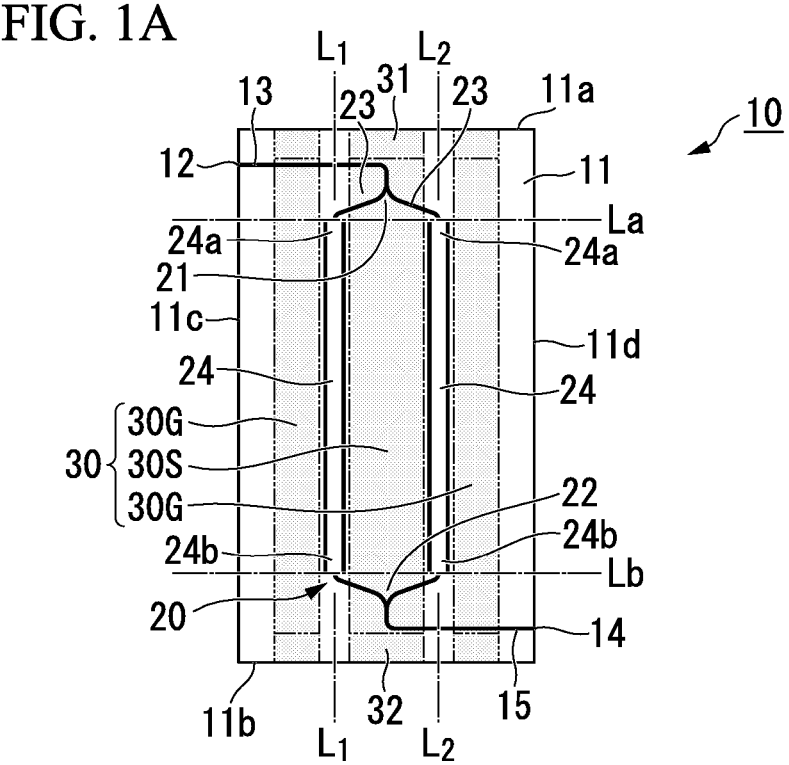
FIG. 1A is a plan view illustrating an optical modulation device according to a first embodiment of the present invention.
Figure 1B:
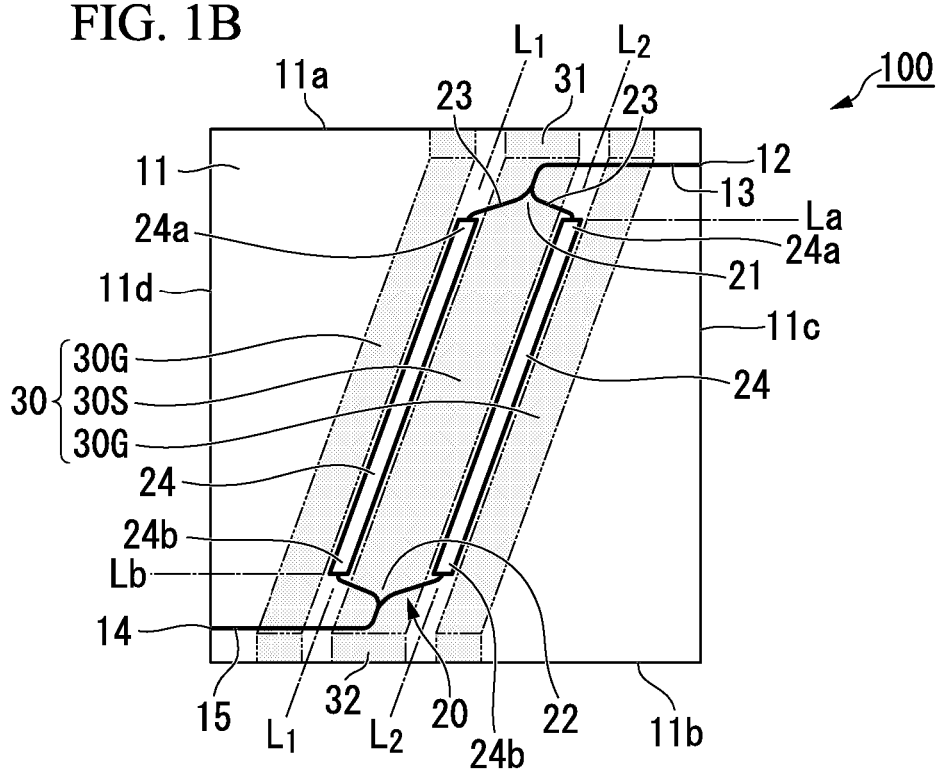
FIG. 1B is a modification example of the optical modulation device according to the first embodiment of the present invention, and is a plan view illustrating a case where a planar optical waveguide is in the shape of a rectangle.
Figure 1C:
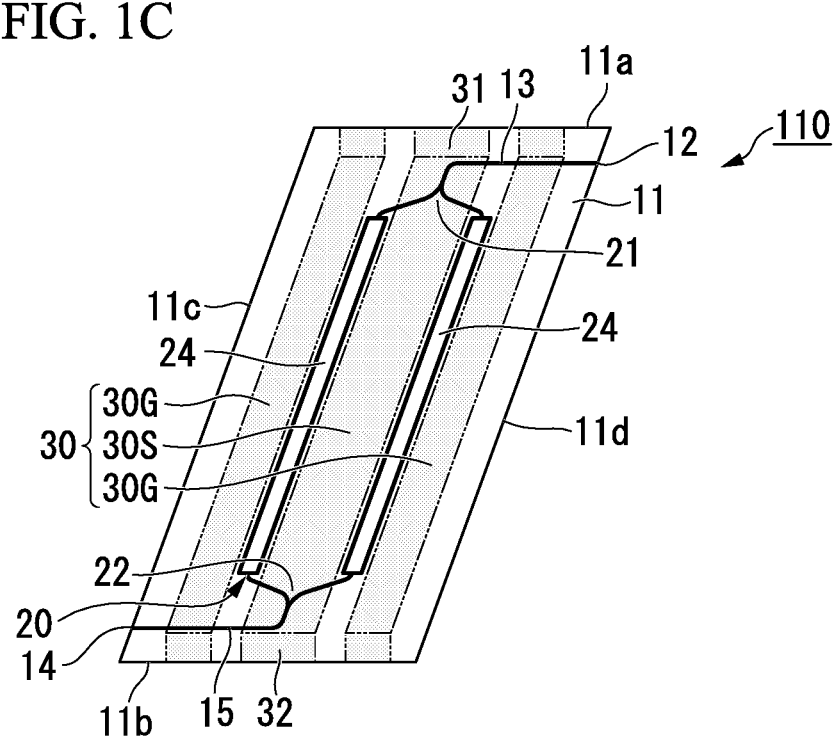
FIG. 1C is a modification example of the optical modulation device according to the first embodiment of the present invention, and is a plan view illustrating a case where the planar optical waveguide is in the shape of a rectangle.

In FIGS. 1A to 1C, an optical modulation device of a first embodiment according to the present invention is illustrated. These optical modulation devices 10, 100, and 110 are configured of a planar optical waveguide 11 including a Mach-Zehnder interferometer 20. The Mach-Zehnder interferometer 20 includes two arm portions 23 between an optical splitter section (a first optical splitter section) 21 which branches one input light into two output lights, and an optical coupler section (a first optical coupler section) 22 which combines the light two input lights into one output light. Light which incident on the optical splitter section 21 from a light incidence unit 12 through an optical waveguide 13 is branched into the two arm portions 23 by the optical splitter section 21. After that, the branched lights are combined into one light by the optical coupler section 22 through the two arm portions 23, and the combined light is launched from the light launching unit 14 through an optical waveguide 15.

Furthermore, the optical modulation devices 100 and 110 of FIGS. 1B and 1C are modification examples of the optical modulation device 10 of FIG. 1A, and the optical modulation devices 100 and 110 are different from the optical modulation device 10 in that a longitudinal direction of a phase modulation unit 24 is perpendicular to two sides 11a and 11b in the optical modulation device 10, but the longitudinal direction of the phase modulation unit 24 is inclined with respect to the two sides 11a and 11b in the optical modulation devices 100 and 110. Unless otherwise specifically described, the following description is common in all of the optical modulation devices of this embodiment in the drawings, and the same applies to the subsequent embodiments.

A phase modulation unit (a first phase adjustment unit) 24 is linearly disposed on each of the arm portions 23. In addition, a traveling-wave electrode 30 which applies a voltage to the phase modulation unit 24 is disposed on the planar optical waveguide 11. The traveling-wave electrode 30 of this embodiment has a coplanar electrode structure formed of Ground, Signal, and Ground (GSG) including a signal electrode 30S between the arm portions 23, and an earth electrode 30G on the outside of each of the arm portions 23. A high frequency electrical signal (hereinafter, referred to as a "high frequency signal".) is applied from an input unit 31 of the signal electrode 30S, and in the phase modulation unit 24, a predetermined phase difference is applied to the light propagating each of the arm portions 23, and the light combined by the optical coupler section 22 is modulated according to the phase difference. An output unit 32 of the signal electrode 30S is terminated by being connected to the outside of the optical modulation device 10.

In this embodiment, the phase modulation unit 24 is disposed on each of the arm portions 23, but the phase modulation unit may be disposed on one of the arms. However, when a phase difference which is not 0 (for example, π) is applied, the phase modulation unit is disposed on both of the arms, and thus it is possible to modulate the phase of guide light of each of the arms into an opposite side. That is, by disposing the phase modulation unit on both of the arms, a push-pull operation is performed in which the phase modulation unit on one arm advances the phase and the phase modulation unit on the other arm delays the phase, a frequency chirp is reduced, and an optical signal suitable for long distance transmission can be obtained as an output.

The planar optical waveguide 11, preferably, includes a semiconductor such as silicon as a core, and an insulating body such as silica as a clad. In addition, an optical waveguide configured of the core, and the clad surrounding the core may be formed on a substrate configured of silicon or the like. The optical waveguide using silicon has a high refractive index difference between the core and the clad, and thus the confinement of the light is high, and a propagation loss of the light which occurs due to a fine structure such as roughness of a side wall generated at the time of the manufacturing. On the other hand, the optical waveguide using silicon can be steeply bent at a radius of curvature of approximately 10 μm. For this reason, it is preferable that the optical waveguide using silicon is used in this embodiment.

The planar optical waveguide 11 of FIGS. 1A to 1C is in the shape of a rectangle having four sides 11a, 11b, 11 c, and 11d. Furthermore, it is not essential that the planar optical waveguide 11 is in the shape of a quadrangle (a tetragon) such as a rectangle (an oblong), and the planar optical waveguide 11 may be in the shape of various polygons such as a triangle, a pentagon, a hexagon, a heptagon, and an octagon. A corner of the polygon may be rounded or chamfered. That is, the planar optical waveguide 11 may have an outline including the two sides 11a and 11b.

In this embodiment, the longitudinal direction of the phase modulation unit 24 and an input and output direction of the traveling-wave electrode 30 are coincident with each other, and thus an electrode structure is minimized, and a propagation loss of the electrical signal is suppressed. In addition, steep curvature is disposed in the optical waveguides 13 and 15 between the light incidence unit 12 and the optical splitter section 21 and between the optical coupler section 22 and the light launching unit 14. Accordingly, even when a distance between the optical splitter section 21 of the Mach-Zehnder interferometer 20 and the input unit 31 of the traveling-wave electrode 30 and a distance between the optical coupler section 22 and the output unit 32 are shortened, the optical waveguides 13 and 15 can be directed towards the side of the traveling-wave electrode 30. Furthermore, in the present invention, the side of the traveling-wave electrode 30 is a region in which an electrode is not formed in a plan view of the planar optical waveguide 11, and a region between the side signal electrode and the earth electrode may be indicated as the side.

In FIGS. 1A to 1C, the traveling-wave electrode 30 is linearly formed from the input unit 31 to the output unit 32. In this case, the length of the electrode can be minimized. In practice, it is not limited to a fact that the traveling-wave electrode 30 has an even width over the entire length, the width of a part of the traveling-wave electrode 30 can be changed into a tapered shape, or a center line of the traveling-wave electrode 30 in a width direction can be bent. For example, the two sides 11a and 11b of the planar optical waveguide 11 are both sides of the phase modulation unit 24 in the longitudinal direction, and when extended lines L1 and L2 in the longitudinal direction intersect with each other, it is preferable that the input unit 31 and the output unit 32 are arranged on the two sides 11a and 11b.

It is preferable that the two phase modulation units 24 are in parallel with each other. In addition, it is preferable that distance between one of the two phase modulation units 24 and the side 11a and distance between the other of the two phase modulation units 24 and the side 11a are identical, the side 11a being a substrate end. Also, it is preferable that a distance between the one of two phase modulation units 24 and the side 11b a distance between the other of the two phase modulation units 24 and the side 11b are identical to each other, the side 11b being a substrate end. That is, it is preferable that distances between one end portions 24a of the two phase modulation units 24 and the side 11a are identical to each other, and distances between the other end portions 24b of the two phase modulation units 24 and the side 11b are identical to each other.

In addition, it is preferable that distances from the input unit 31 of the electrode to the end portion 24a on an incidence side of the phase modulation unit 24 along a propagation direction of the electrode are identical to each other with respect to each of the phase modulation units 24.

In addition, it is preferable that distances from the end portion 24b on the launch side of the phase modulation unit 24 to the output unit 31 of the electrode along the propagation direction of the electrode are identical to each other with respect to each of the phase modulation units 24.

Accordingly, a timing of the electrical signal input from the input unit 31 is easily matched with each of the phase modulation units 24.

The light incidence unit 12 and the light launching unit 14 are positioned on the side of the traveling-wave electrode 30. Accordingly, the input unit 31 and the output unit 32 of the traveling-wave electrode 30 or a structural object which is electrically connected thereto, and the light incidence unit 12 and the light launching unit 14 or a structural object which is optically coupled thereto can be arranged by being spatially separated.

In the light modulation device 10 of FIG. 1A, as described above, the longitudinal direction of the phase modulation unit 24 is perpendicular to the two sides 11a and 11b, and is bent by approximately 90° from the optical splitter section 21 or the optical coupler section 22, and thus the waveguides 13 and 15 can be directed towards the side. In addition, in the optical modulation devices 100 and 110 of FIGS. 1B and 1C, as described above, the longitudinal direction of the phase modulation unit 24 is inclined with respect to the two sides 11a and 11b, and is bent at an acute angle of less than 90° from the optical splitter section 21 or the optical coupler section 22, and thus the waveguides 13 and 15 can be directed towards the side.

Such direction conversion can be realized by allowing part of the waveguides 13 and 15 to pass through a lower portion of the traveling-wave electrode 30 between the phase modulation unit 24 and the sides 11a and 11b. The direction of the waveguides 13 and 15 is converted by using steep curvature, and thus the distance between the phase modulation unit 24 and the sides 11a and 11b can be shortened, and attenuation due to propagation of a high frequency signal on the silicon substrate and signal degradation due to impedance mismatch can be reduced.

Furthermore, in the optical modulation devices 100 and 110 of FIGS. 1B and 1C, an angle between the longitudinal direction of the phase modulation unit 24 and the two sides 11a and 11b may be an angle of greater than 0° and less than 90°. However, an angle between two straight lines is defined by a range of 0° to 90°. For example, the angle may be less than or equal to 80°, or may be less than or equal to 70°. Accordingly, it is possible to further shorten the length of the substrate (a distance from the side 11a to the side 11b). On the other hand, when the width of the substrate (a distance from a side 11c to a side 11d) is planned to be shortened, as in the optical modulation device 10 of FIG. 1A, the longitudinal direction of the phase modulation unit 24 may be perpendicular to the two sides 11a and 11b.

According to this embodiment, it is possible to perform electrode connection on a chip (the substrate) at the earliest, and it is possible to prevent a decrease in modulation efficiency due to a power loss of the electrical signal on the electrode. In addition, it is possible to shorten the length of the chip (the substrate).

Figure 2:
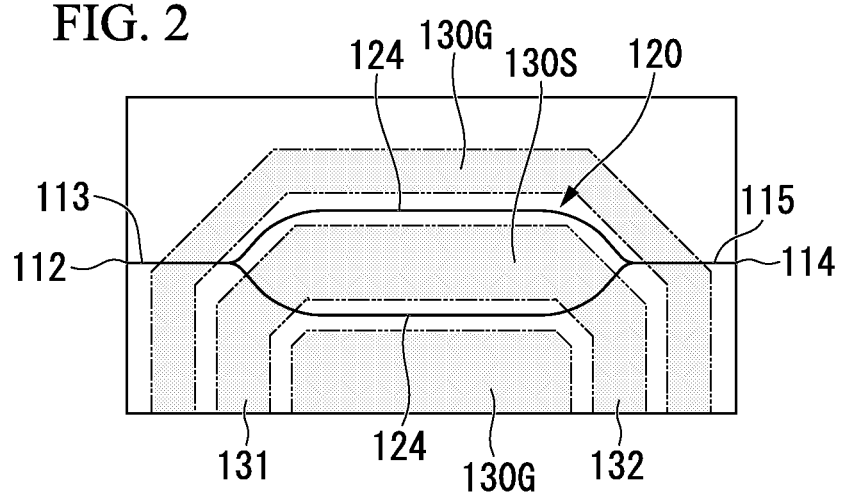
FIG. 2 is a plan view illustrating an example of an optical modulation device of the related art.

In addition, even when a plurality of electrodes is necessary, the length of each of the electrodes is rarely changed, and thus it is possible to scalably increase the electrode. In a case where the electrode is arranged by being bent as in FIG. 2 which is a technology of the related art, when the number of parallel electrodes increases, the length of the electrode increases towards the outside, and the difference in the lengths of the electrodes increases.

In addition, an optical axis of the light incidence unit 12 and an optical axis of the light launching unit 14 are not on one straight line, but are arranged by being shifted, and thus it is possible to prevent leakage light (stray light) which is not coupled to the waveguide 13 at the time of being incident from the light incidence unit 12 from being mixed from the light launching unit 14. Accordingly, it is possible further reduce light power in a light extinction state, and it is possible to improve an extinction ratio.

When the length of the sides 11a and 11b on which the input unit 31 and the output unit 32 are arranged is sufficiently long, it is possible to arrange the light incidence unit 12 and the light launching unit 14 on the sides 11a and 11b, and in FIGS. 1A to 1C, the light incidence unit 12 and the light launching unit 14 are arranged on the sides 11c and 11d different from the sides 11a and 11b on which the input unit 31 and the output unit 32 are arranged. Accordingly, it is possible to further decrease the size of the planar optical waveguide 11.

The chip (the substrate) may be cut into the shape of a rectangle as illustrated in FIG. 1B, and may be cut such that the sides 11c and 11d on which the light incidence unit 12 and the light launching unit 14 are arranged are inclined with respect to the sides 11a and 11b on which the input unit 31 and the output unit 32 are arranged as illustrated in FIG. 1C. In FIG. 1C, a chip area is minimized, and thus it is possible to increase the number of pieces.

Furthermore, the chip is not limited to inclining both of the sides 11c and 11d, and only one side can be inclined into the shape of trapezoid (refer to FIG. 4B described later). In this case, instead of collectively performing dicing with respect to a wafer, the wafer may be cut into a rectangular block in which two chips share an oblique side, and then the oblique side may be cut into two.

When the substrate is not in the shape of a rectangle, a direction with respect to a chip end surface of a coupling waveguide (for example, an inversely tapered waveguide 93 of FIG. 32) described later used in a joining portion (the light incidence unit 12 and the light launching unit 14) with respect to the outside of the chip may not be vertical. When the coupling waveguide is not perpendicular to the chip end surface, the angle is determined in a plane of the chip in consideration of a refractive index difference in a boundary of the end surface, and thus the light can be launched to a desirable direction, or the light can be incident from a desirable direction, and it is possible to design the light to have high coupling properties.

In FIG. 1B, a case is illustrated in which the waveguides 13 and 15 is bent at an obtuse angle of greater than 90° from the optical splitter section 21 or the optical coupler section 22 towards the light incidence unit 12 and the light launching unit 14 positioned on the side of the traveling-wave electrode 30, and thus the waveguides 13 and 15 are directed towards the side. In this case, it is possible to further shorten a waveguide length to which the light follows from the incidence to the launch insofar as a chip size is not particularly changed compared to FIG. 3B described later, and the length of the chip can be shortened. Accordingly, it is possible to reduce an optical loss due to the waveguide length.

Second Embodiment

Figure 3A:
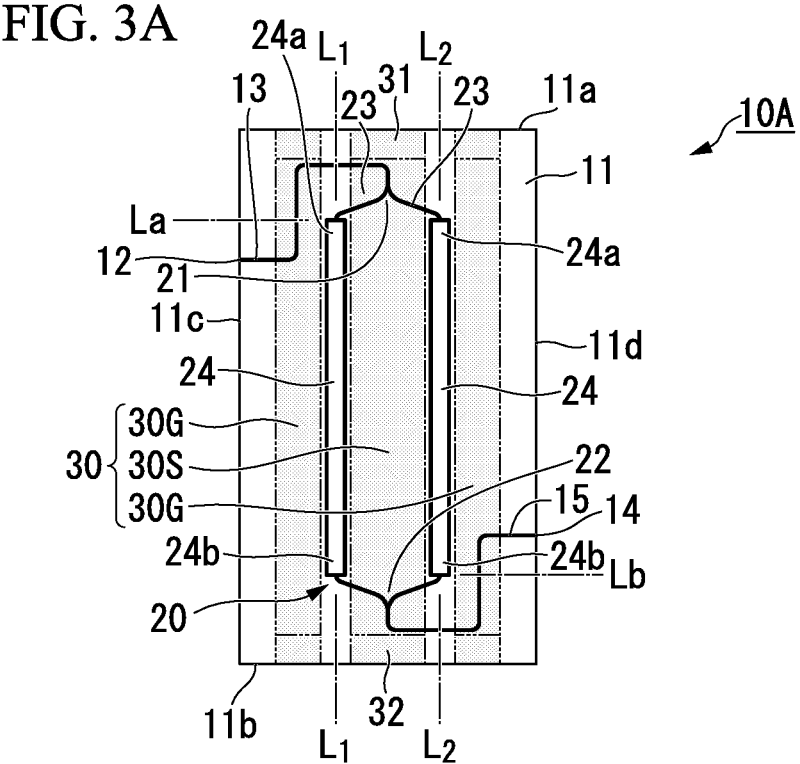
FIG. 3A is a plan view illustrating an optical modulation device according to a second embodiment of the present invention.
Figure 3B:
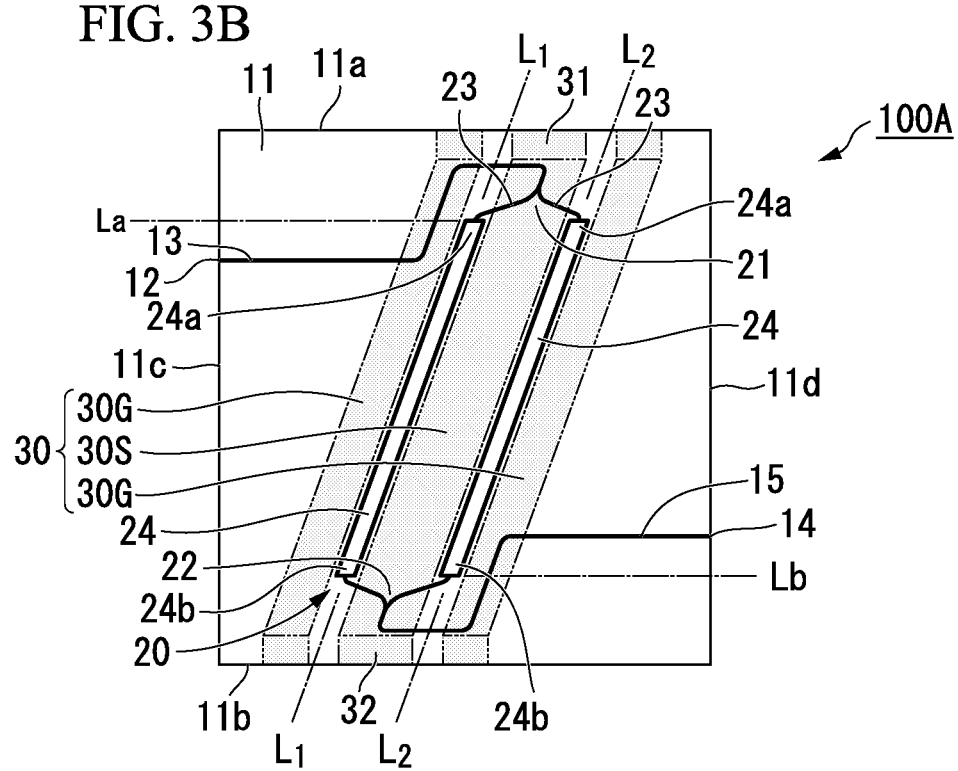
FIG. 3B is a plan view illustrating a modification example of the optical modulation device according to the second embodiment of the present invention.

In FIGS. 3A and 3B, an optical modulation device of a second embodiment according to the present invention is illustrated. Furthermore, in the following description, the same reference numerals are applied to the common configurations described above, and the repeated description thereof will be omitted.

Optical modulation devices 10A and 100A according to this embodiment are configured of the planar optical waveguide 11 including the Mach-Zehnder interferometer 20, as with the optical modulation devices 10, 100, and 110 of the first embodiment. In addition, in this embodiment, the light incidence unit 12 and the light launching unit 14 are positioned in a region between two lines La and Lb which extend in a direction in parallel with the two sides 11a and 11b from the two end portions 24a and 24b in the longitudinal direction of the phase modulation unit 24.

Here, the side on which the input unit 31 of the traveling-wave electrode 30 is arranged is defined as "11a", and the side on which the output unit 32 is arranged is defined as "11b". In addition, a line which extends in a direction in parallel with the side 11a from the end portion 24a on the optical splitter section 21 side in the longitudinal direction of the phase modulation unit 24 is defined as "La", and a line which extends in a direction in parallel with the side 11b from the end portion 24b on the optical coupler section 22 side in the longitudinal direction of the phase modulation unit 24 is defined as "Lb". Furthermore, in the optical modulation device 10A of FIG. 3A, the longitudinal direction of the phase modulation unit 24 is perpendicular to the two sides 11a and 11b, but in the optical modulation device 100A of FIG. 3B, the longitudinal direction of the phase modulation unit 24 is inclined with respect to the two sides 11a and 11b.

Furthermore, in the optical modulation devices 10, 100, and 110 of FIGS. 1A to 1C, the light incidence unit 12 and the light launching unit 14 are positioned on the outside from a region between the line La and the line Lb, as opposed to the optical modulation devices 10A and 100A of FIGS. 3A and 3B. Specifically, the light incidence unit 12 is positioned in the region between the line La and the side 11a, and the light launching unit 14 is positioned in the region between the line Lb and the side 11b.

In addition, in FIG. 3A, the longitudinal direction of the phase modulation unit 24 is perpendicular to the two sides 11a and 11b, and "the direction in parallel with the two sides 11a and 11b" is coincident with "a width direction of the phase modulation unit 24". Accordingly, the two lines La and Lb can be defined as lines which respectively extend in the width direction of the phase modulation unit 24 from the two end portions 24a and 24b.

In a case where the light incidence unit 12 and the light launching unit 14 are optically coupled to an optical component such as an optical fiber or a lens, when the light incidence unit 12 and the light launching unit 14 are arranged in the vicinity of the sides 11a and 11b on which the input unit 31 and the output unit 32 are arranged, a probability that the optical component such as the optical fiber and the lens collides with a previous substrate or the like which connects the electrode from the input unit 31 and the output unit 32 and an end surface of a package which contains the optical modulation device is considered.

When the optical fiber is arranged in the vicinity of the light incidence unit 12 or the light launching unit 14, a clad which generally has a diameter of 125 µm is included in the optical fiber, and thus when a covered portion is included, an outer diameter is greater than or equal to the value described above (for example, 160 µm to 250 µm). In addition, in order to retain the optical fiber, it is necessary that the optical fiber is fixed to a fixing jig such as a pedestal, and the size of the fixing jig is greater than or equal to the outer diameter of the optical fiber.

In addition, when the lens is arranged in the vicinity of the light incidence unit 12 or the light launching unit 14, a lens diameter is generally a few mm. In particular, when the optical modulation device is positioned on a package end surface, it is necessary to dispose a clearance from the end such that the lens can be arranged in the package.

Accordingly, as illustrated in FIGS. 3A and 3B, it is preferable that the light incidence unit 12 and the light launching unit 14 are positioned by having a distance from the end portion of the optical modulation device, that is, from the sides 11a and 11b. Accordingly, at the time of the mounting, it is possible to prevent interference with a lens or the like, a package or the like, and a relay substrate or the like. Accordingly, it is not necessary to make the space of the package wider, and it is possible to prevent an increase in the size.

In FIGS. 3A and 3B, the direction of the optical waveguides 13 and 15 which connect the Mach-Zehnder interferometer 20 to the light incidence unit 12 and the light launching unit 14 indicates a combination of linear waveguides in a direction which is approximately perpendicular to the sides 11a and 11b or is approximately parallel with the sides 11a and 11b, and bent waveguides which connect the linear waveguides. In order to shorten the length of the waveguide, a linear waveguide in an oblique direction, a curved waveguide having a large radius of curvature, and the like can be used.

According to such a method, when an optical modulation device having a different substrate size is treated by the same package, it is possible to arrange the light incidence unit 12 and the light launching unit 14 in an arbitrary position such as making relative positional relationships with respect to the light incidence unit 12 and the light launching unit 14 identical to each other, and a degree of freedom in the arrangement is improved.

In this embodiment, it is preferable that the optical axis of the light incidence unit 12 and the optical axis of the light launching unit 14 are not on the one straight line, but are arranged by being shifted. Accordingly, as with the first embodiment, it is possible to prevent stray light from being mixed, and it is possible to improve an extinction ratio.

Third Embodiment

Figure 4A:
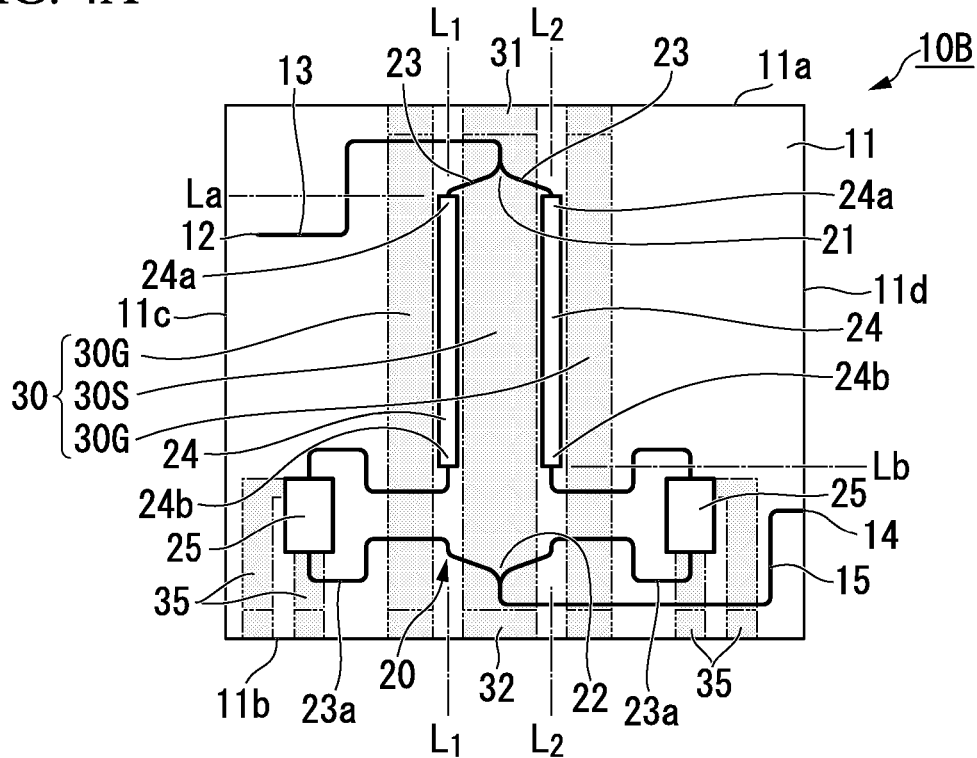
FIG. 4A is a plan view illustrating an optical modulation device according to a third embodiment of the present invention.
Figure 4B:
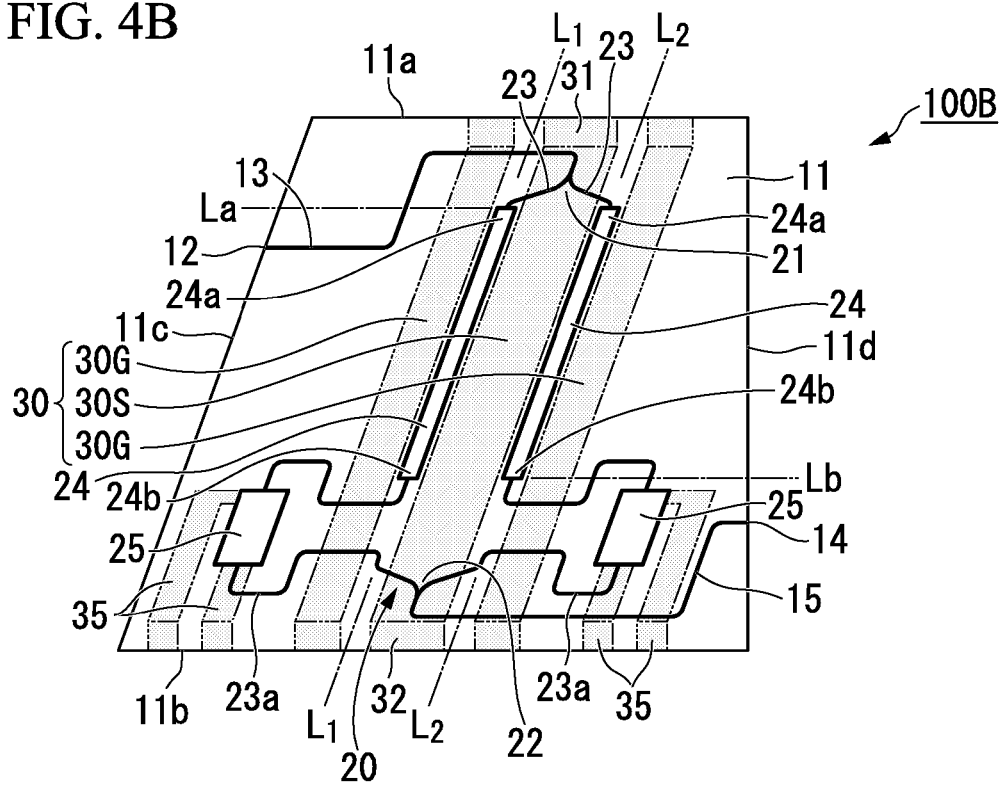
FIG. 4B is a plan view illustrating a modification example of the optical modulation device according to the third embodiment of the present invention.

In FIGS. 4A and 4B, an optical modulation device of a third embodiment according to the present invention is illustrated. Optical modulation devices 10B and 100B according to this embodiment are configured of the planar optical waveguide 11 including the Mach-Zehnder interferometer 20, as with the optical modulation devices 10 and 100 of the first embodiment. Furthermore, in the optical modulation device 10B of FIG. 4A, the longitudinal direction of the phase modulation unit 24 is perpendicular to the two sides 11a and 11b, but in the optical modulation device 100B of FIG. 4B, the longitudinal direction of the phase modulation unit 24 is inclined with respect to the two sides 11a and 11b.

In addition, in this embodiment, each of the arm portions 23 of the Mach-Zehnder interferometer 20 includes a phase adjustment unit (a second phase adjustment unit) 25 which is electrically independent and different from the phase modulation unit (the first phase adjustment unit) 24. The phase adjustment unit may be used in a semiconductor type optical modulator, and relatively adjusts a phase between the two arms in addition to the phase modulation unit which performs high speed modulation according to a high frequency signal. In such phase adjustment, a high speed response which is required for the phase modulation unit 24 is not necessary, and a response speed (a response time) may be approximately a few μs to a few ms. As a specific example of the phase adjustment unit 25, for example, a low speed phase modulation unit using a thermooptical effect which has a heater structure in which a material having electrical resistance such as nichrome is arranged on an upper portion of the waveguide, or a heater structure which is formed through the same processes as that of the phase modulation unit 24 by using doped silicon as a resistive element is included. In FIGS. 4A and 4B, an electrode 35 (may be two wirings) for supplying electric power to the phase adjustment unit 25 is arranged in parallel with the traveling-wave electrode 30 and towards the side 11b on which the output unit 32 is arranged. In addition, the electrode 35 may be disposed as in a tenth embodiment described later.

In order to allow a current to flow through the phase adjustment unit, two electrodes on a voltage side and a GND side are generally necessary.

In this embodiment, two electrodes may be independently disposed, and when a plurality of phase adjustment units is disposed, the GND may be shared. In addition, the GND of the phase adjustment unit can be shared with a GND disposed in the phase modulation unit.

As other element parts disposed on the arm portion 23, a PD for a monitor, a polarization conversion element in a polarization multicircuit, a polarized wave separating and coupling element, a variable optical attenuator (VOA) for uniformalizing light power between the arms in the Mach-Zehnder interferometer, and the like are included in addition to the phase adjustment unit 25.

The other elements may be disposed on both of the arms, or may be disposed on only one arm.

In order to prevent an influence on high speed phase modulation, it is preferable that a constituent separated from the phase modulation unit 24 is arranged by avoiding the phase modulation unit and the traveling-wave electrode for applying a voltage to the phase modulation unit. Therefore, the other elements may be arranged in a position shifted from an extension direction of the phase modulation unit 24, and in particular, in a region on the outside from the region between the two lines L1 and L2 each of which extends in the longitudinal direction of the phase modulation unit 24. Accordingly, it is possible to realize a desirable function without affecting electrical properties of the phase modulation unit.

In FIGS. 4A and 4B, a waveguide 23a shifted to the region on the outside (a region between the line L1 and the side 11c, and a region between the line L2 and the side 11d) may be bent or may dispose a portion in which the propagation direction of the light is opposite to that in the phase modulation unit 24 (in FIGS. 4A and 4B, a direction from a bottom to a top) such that a chip length of the planar optical waveguide 11 (a distance between the sides 11a and 11b) is shortened.

In addition, in FIGS. 4A and 4B, the light launching unit 14 is positioned in the region (between the line Lb and the side 11b) on the outside from the region between the two lines La and Lb each of which extends in the width direction of the phase modulation unit 24 from the two end portions 24a and 24b of the phase modulation unit 24, but is sufficiently separated from the side 11b on which the output unit 32 of the electrode is arranged, and thus a clearance for arranging the optical fiber, the lens, or the like is ensured.

Fourth Embodiment

Figure 5A:
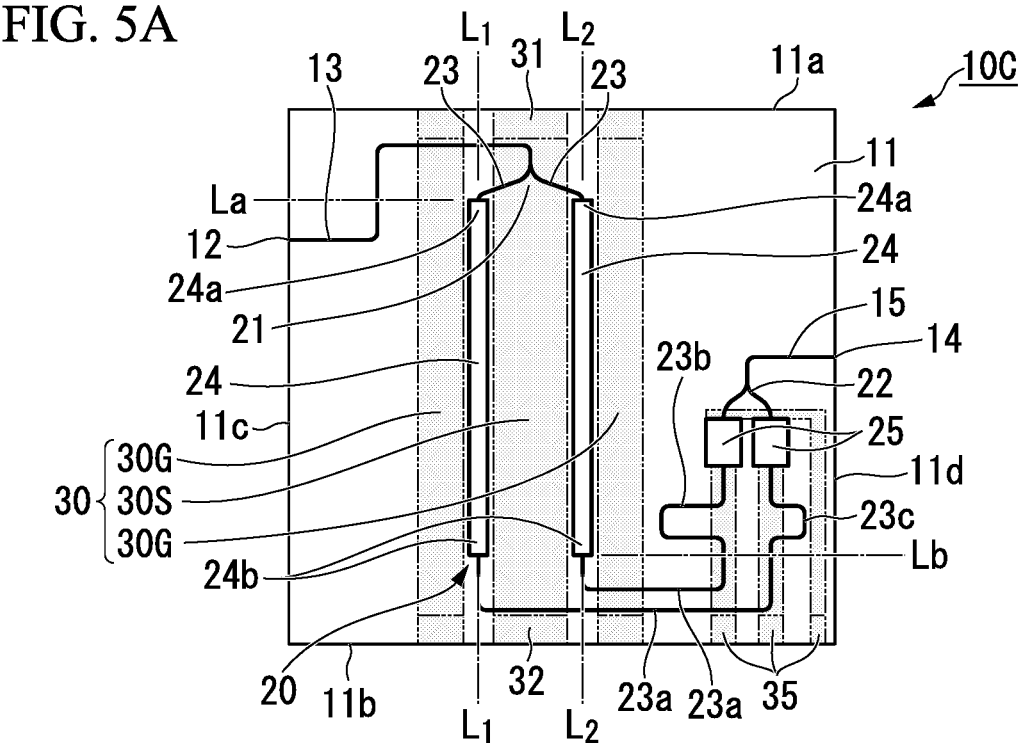
FIG. 5A is a plan view illustrating an optical modulation device according to a fourth embodiment of the present invention.
Figure 5B:
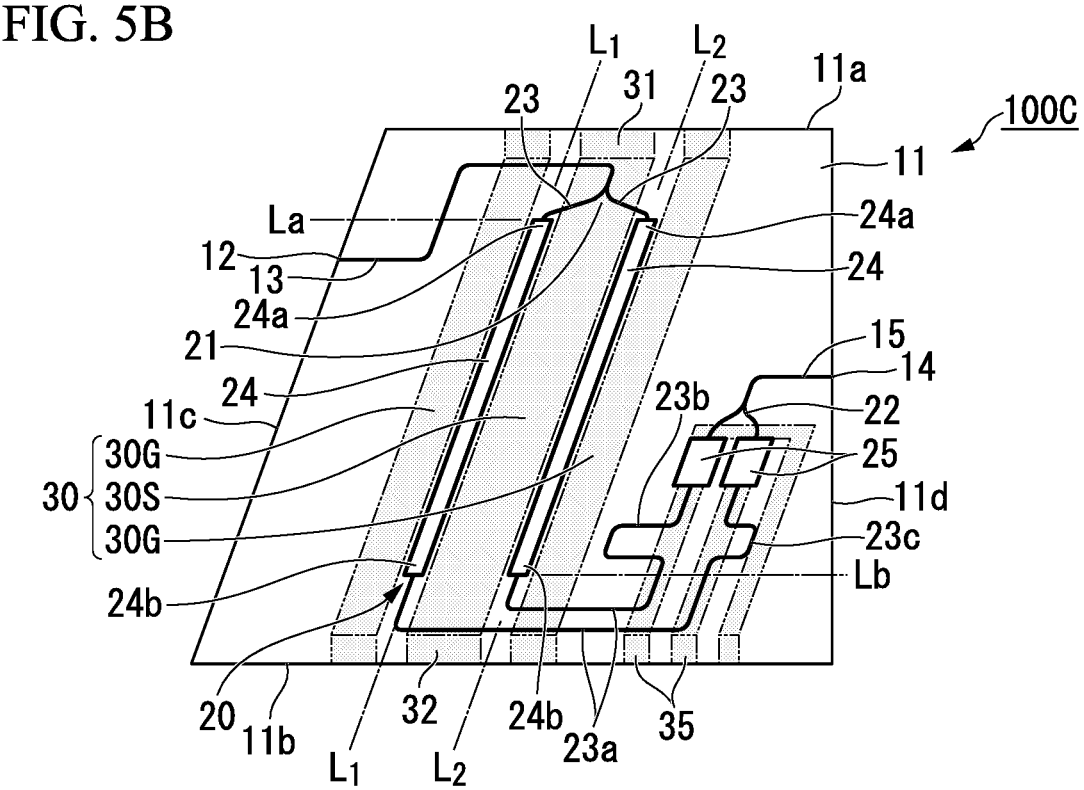
FIG. 5B is a plan view illustrating a modification example of the optical modulation device according to the fourth embodiment of the present invention.

In FIGS. 5A and 5B, an optical modulation device of a fourth embodiment according to the present invention is illustrated. Optical modulation devices 10C and 100C include the phase adjustment unit 25 which is electrically independent and different from the phase modulation unit 24 on each of the arm portions 23 of the Mach-Zehnder interferometer 20, as with the third embodiment. In addition, in the middle of each of the arm portions 23, the waveguide 23a shifted to the region on the outside (the region between the line L2 and the side 11d) extends to the side 11d side on which the light launching unit 14 is arranged. In addition, the optical coupler section 22 of the Mach-Zehnder interferometer 20 is also positioned in the region on the outside (the region between the line L2 and the side 11d), and is arranged in the vicinity of the light launching unit 14. Accordingly, a waveguide length is shortened, and thus an optical loss can be reduced.

Furthermore, in the optical modulation device 10C of FIG. 5A, the longitudinal direction of the phase modulation unit 24 is perpendicular to the two sides 11a and 11b, but in the optical modulation device 100C of FIG. 5B, the longitudinal direction of the phase modulation unit 24 is inclined with respect to the two sides 11a and 11b.

As illustrated in FIGS. 1A to 1C, in a structure where only the phase modulation unit 24 is formed on the two arm portions 23, when the Mach-Zehnder interferometer 20 is symmetrically configured, the lengths of the two arm portions 23 (the waveguide length) are identical to each other.

In addition, as illustrated in FIGS. 4A and 4B, even when the elements (for example, the phase adjustment unit 25) other than the phase modulation unit 24 are arranged on the arm portion 23 are right-left symmetrically (or point symmetrically) configured, the lengths of the two arm portions 23 (the waveguide length) are identical to each other.

On the other hand, as illustrated in FIGS. 5A and 5B, when the other elements are arranged on only one side of the phase modulation unit 24, or arranged on the other position, it is possible to shorten the waveguide compared to the symmetric configuration illustrated in FIGS. 4A and 4B, and it is possible to concentrate the position of the electrode. In this case, in order to equalize the lengths of the two arm portions 23 (the waveguide length), length equalization units 23b and 23c which are bent by a different length can be disposed on each of the arm portions 23 (in particular, the waveguide 23a which is horizontally shifted). In FIGS. 5A and 5B, the waveguide 23a between the phase modulation unit 24 and the optical coupler section 22 adjusts the waveguide length by disposing a long length equalization unit 23b on the arm rotating around the inside of the chip, and by disposing a short length equalization unit 23c on the arm rotating around the outside of the chip. The length equalization units 23b and 23c can be disposed on only one arm.

By equalizing the lengths of the two arms, it is possible to resolve wavelength dependence properties of the optical modulator. In addition, by equalizing the waveguide lengths from the phase modulation unit to the optical coupler section, it is possible to suppress degradation of a waveform in the optical coupler section. For example, a time slot per one bit at the time of performing optical communication at 10 Gbps is 100 ps, but the waveguide length corresponding to this is approximately 1 cm in consideration of an effective refractive index of a silicon/silica optical waveguide. When there is a difference of 100 μm is in the waveguide lengths subsequent to the phase modulation unit, a difference of 1 ps from a suitable timing occurs in the optical coupler section, and thus a margin at the time of the designing decreases. In addition, when there is a difference in the timings at which the light propagating each of the two arms is incident on the optical coupler section, an effect of reducing frequency chirp due to a push-pull operation decreases along with distortion of the waveform. In addition, the phase modulations of both of the arms are not simultaneously performed, and thus the phase of the output light at the time of the operation is changed, and the frequency chirp is induced. Accordingly, by equalizing the lengths of the two arms as possible, it is possible to maximize the margin, and it is possible to maximize the effect of reducing the frequency chirp.

Fifth Embodiment

Figure 6A:
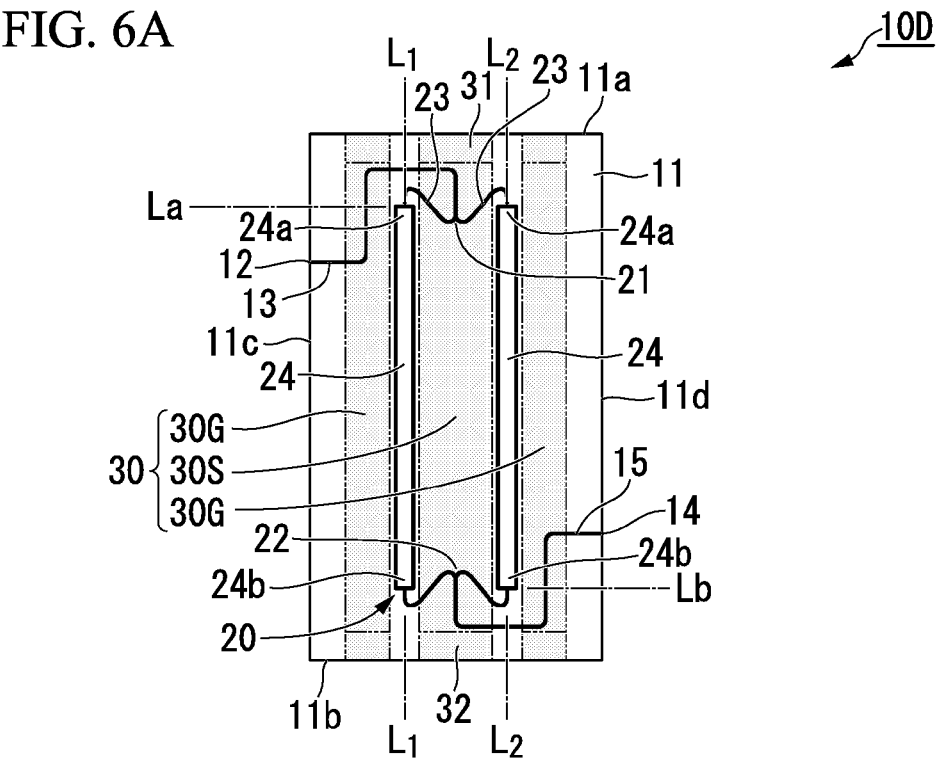
FIG. 6A is a plan view illustrating an optical modulation device according to a fifth embodiment the present invention.
Figure 6B:
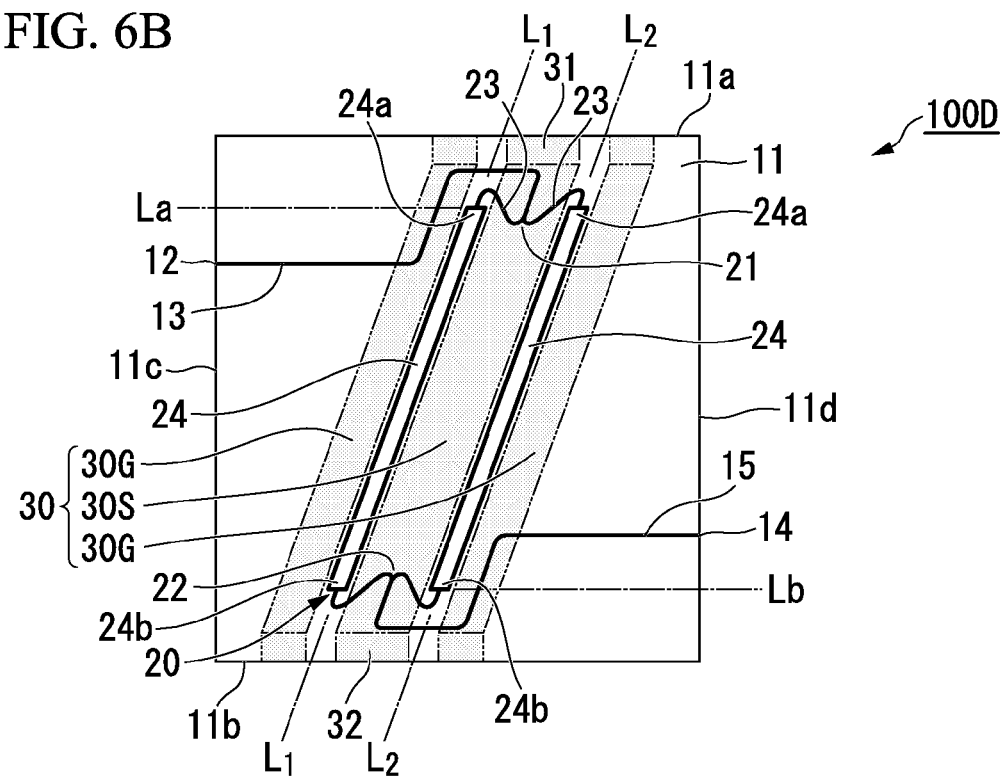
FIG. 6B is a plan view illustrating a modification example of the optical modulation device according to the fifth embodiment of the present invention.

In FIGS. 6A and 6B, an optical modulation device of a fifth embodiment according to the present invention is illustrated. Optical modulation devices 10D and 100D are configured of the planar optical waveguide 11 including the Mach-Zehnder interferometer 20, as with the optical modulation devices 10, 100, and 110 of the first embodiment. In addition, in this embodiment, the optical splitter section 21 and the optical coupler section 22 of the Mach-Zehnder interferometer 20 may be positioned in the region between the two lines La and Lb each of which extends in the direction in parallel with the two sides 11a and 11b from the two end portions 24a and 24b of the phase modulation unit 24.

Furthermore, in the optical modulation device 10D of the FIG. 6A, the longitudinal direction of the phase modulation unit 24 is perpendicular to the two sides 11a and 11b, but in the optical modulation device 100D of FIG. 6B, the longitudinal direction of the phase modulation unit 24 is inclined with respect to the two sides 11a and 11b.

In addition, in FIG. 6A, the longitudinal direction of the phase modulation unit 24 is perpendicular to the two sides 11a and 11b, and "the direction in parallel with the two sides 11a and 11b" is coincident with "the width direction of the phase modulation unit 24". Therefore, the two lines La and Lb can be defined as lines each of which extends in the width direction of the phase modulation unit 24 from the two end portions 24a and 24b.

According to this embodiment, it is possible to further shorten the distance from the phase modulation unit 24 to the two sides 11a and 11b of the chip end portion. Accordingly, it is possible to reduce a propagation loss of the electrical signal on the electrode, and it is possible to improve high frequency properties. That is, a predetermined length is necessary in order to arrange the optical splitter section 21 and the optical coupler section 22. The optical splitter section 21 and the optical coupler section 22 are arranged on the inside of the phase modulation unit 24, and thus the waveguides 13 and 15 before and after the Mach-Zehnder interferometer 20 can be closer to the end portions 24a and 24b of the phase modulation unit 24. As a method for this, for example, a method is included in which the waveguide of the arm portion 23 is considerably bent between the end portions 24a and 24b of the phase modulation unit 24 and the optical splitter section 21 or the optical coupler section 22, and a bent portion, for example, having an angle exceeding 90° is disposed.

The optical splitter section 21 is separated from the side 11a on which the input unit 31 is arranged, and thus it is possible to reduce a space for introducing the waveguide 13 in front of the Mach-Zehnder interferometer 20 to the side of the Mach-Zehnder interferometer 20. In addition, the optical coupler section 22 is separated from the side 11b on which the output unit 32 is arranged, and thus it is possible to reduce a space for introducing the waveguide 15 in a poststage of the Mach-Zehnder interferometer 20 to escape to the side of the Mach-Zehnder interferometer 20.

Sixth Embodiment

Figure 36:
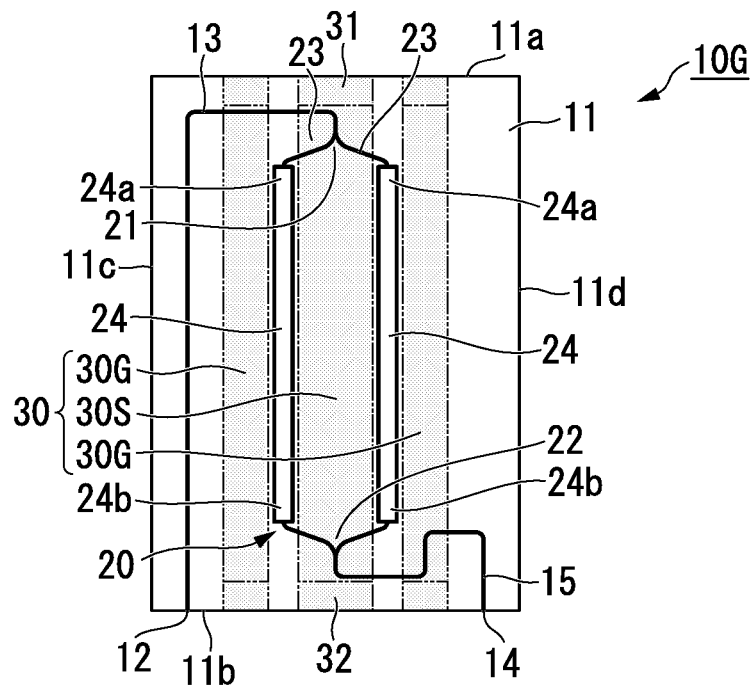
FIG. 36 is a plan view illustrating an optical modulation device according to a sixth embodiment of the present invention.

In FIG. 36, an optical modulation device of a sixth embodiment according to the present invention is illustrated. Optical modulation device 10G is configured of the planar optical waveguide 11 including the Mach-Zehnder interferometer 20, as with the optical modulation device 10 of the first embodiment.

The optical modulation device 10G of FIG. 36 is different from the optical modulation device 10 of the first embodiment in that the light incidence unit 12 and the light launching unit 14 are arranged on the same side 11b on which the output unit 32 of the traveling-wave electrode 30 is arranged. In addition, in this embodiment, the light incidence unit 12 and the light launching unit 14 are arranged on the same side 11b on which the output unit 32 of the traveling-wave electrode 30 is arranged, and the light incidence unit 12 and the light launching unit 14 may be arranged on the same side 11*a* on which the input unit 31 of the traveling-wave electrode 30 is arranged. Furthermore, the arrangement of the waveguides 13 and 15 (a wiring method) is not limited insofar as the light incidence unit 12 and the light launching unit 14 are arranged on the outside from the input unit 31 and the output unit 32 of the electrode.

According to this embodiment, for example, the Mach-Zehnder interferometer 20 can be applied to a case where it is necessary that the light incidence and the light launch are performed from one side due to the restriction of the package or the like.

Furthermore, in the optical modulation device 10G of FIG. 36, it is not limited to the fact that longitudinal direction of the phase modulation unit 24 is perpendicular to the two sides 11*a* and 11*b*, and the longitudinal direction of the phase modulation unit 24 may be inclined with respect to the two sides 11*a* and 11*b*.

Seventh Embodiment

Figure 37:
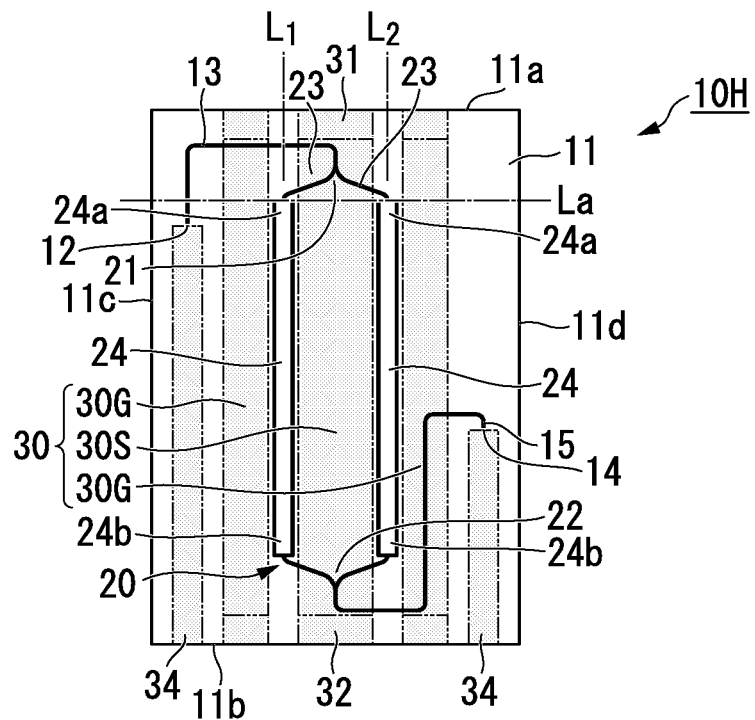
FIG. 37 is a plan view illustrating an optical modulation device according to a seventh embodiment of the present invention.

In FIG. 37, an optical modulation device of a seventh embodiment according to the present invention is illustrated. Optical modulation device 10H is configured of the planar optical waveguide 11 including the Mach-Zehnder interferometer 20, as with the optical modulation device 10 of the first embodiment.

The optical modulation device 10H of FIG. 37 is different from the optical modulation device 10G according to the sixth embodiment in that a groove portion 34 such as a V-groove or a deep trench is disposed, and the incidence unit 12 and the light launching unit 14 which are disposed on an end portion of the groove portion 34 are disposed in an arbitrary position on the side of the traveling-wave electrode 30. In addition, the other end of the groove portion is formed on the end portion of the planar optical waveguide 11 (the outline of the planar optical waveguide 11).

The groove portion 34 can fix the optical fiber, and is configured such that the light incidence unit 12 and the light launching unit 14, and the optical fiber fixed to the groove portion 34 are positioned. The light incidence unit 12 and the light launching unit 14 are connected to the optical fiber which is disposed in the groove portion 34 by butt-joining (Butt Joint) through a mode field converter (MFC), a spot size converter (SSC), or the like. Furthermore, in the optical modulation device 10H, the end portion of the V-groove 34 configures both of the incidence unit 12 and the light launching unit 14, and the groove portion 34 may configure only any one of them.

According to this embodiment, it is possible to arrange the optical fiber in the vicinity of a functional component which requires the optical fiber, it is possible to reduce unnecessary wiring, and it is possible to suppress an optical loss. In addition, in this embodiment, the V-groove is disposed in the optical modulation device 10H, and thus it is possible to fix the optical fiber, and it is possible to easily perform the butt-joining (Butt Joint).

Furthermore, in the optical modulation device 10H of FIG. 37, it is not limited to the fact that the longitudinal direction of the phase modulation unit 24 is perpendicular to the two sides 11*a* and 11*b*, and the longitudinal direction of the phase modulation unit 24 may be inclined with respect to the two sides 11*a* and 11*b*.

Eighth Embodiment

Figure 38:
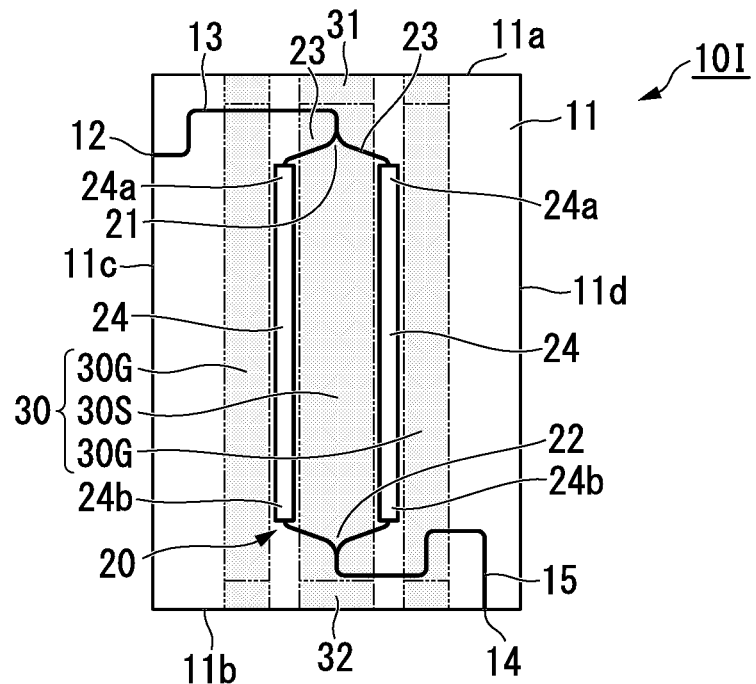
FIG. 38 is a plan view illustrating an optical modulation device according to an eighth embodiment of the present invention.

In FIG. 38, an optical modulation device of an eighth embodiment according to the present invention is illustrated. Optical modulation device 10I is configured of the planar optical waveguide 11 including the Mach-Zehnder interferometer 20, as with the optical modulation device 10 of the first embodiment.

The optical modulation device 10I of FIG. 38 is different from the optical modulation device 10 of the first embodiment in that the light launching unit 14 is arranged on the same side 11*b* on which the output unit 32 of the traveling-wave electrode 30 is arranged, and the light incidence unit 12 is arranged on the side 11*c* which is the side of the traveling-wave electrode 30. In addition, in this embodiment, the light launching unit 14 is arranged on the same side 11*b* on which the output unit 32 of the traveling-wave electrode 30 is arranged, and the light incidence unit 12 is arranged on the side 11*c* which is the side of the traveling-wave electrode 30, and the light incidence unit 12 may be arranged on the same side 11*b* on which the output unit of the traveling-wave electrode 30 is arranged, and the light launching unit 14 may be arranged on the side 11*d* which is the side of the traveling-wave electrode 30. In addition, the light incidence unit 12 or the light launching unit 14 may be disposed on the same side 11*a* on which the input unit 31 of the traveling-wave electrode 30 is arranged. Furthermore, in this embodiment, the arrangement of the waveguides 13 and 15 (a wiring method) is not limited insofar as the light incidence unit 12 and the light launching unit 14 are arranged on the outside from the input unit 31 and the output unit 32 of the electrode.

For example, when a laser is arranged in front of the modulator, a layout may be formed in which the direction on the light incidence side is different from the direction on the light launch side in order to compose the optical modulation device including the laser in a single package, but by using this embodiment, it is possible to apply to a free layout.

Furthermore, in the optical modulation device 10I of FIG. 38, it is not limited to the longitudinal direction of the phase modulation unit 24 perpendicular to the two sides 11*a* and 11*b*, and the longitudinal direction of the phase modulation unit 24 may be inclined with respect to the two sides 11*a* and 11*b*.

Ninth Embodiment

Figure 39:
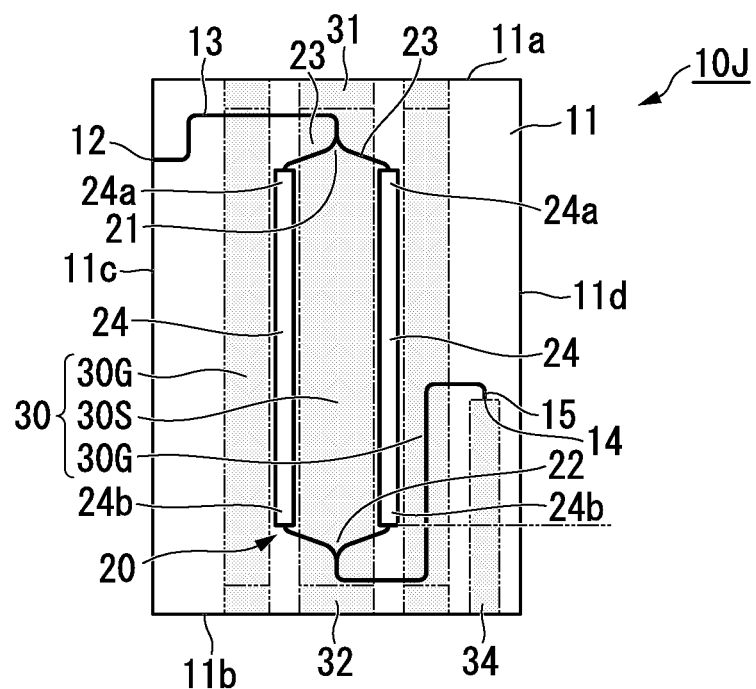
FIG. 39 is a plan view illustrating an optical modulation device according to a ninth embodiment of the present invention.

In FIG. 39, an optical modulation device of a ninth embodiment according to the present invention is illustrated. Optical modulation device 10J is configured of the planar optical waveguide 11 including the Mach-Zehnder interferometer 20, as with the optical modulation device 10 of the first embodiment.

The optical modulation device 10J of FIG. 39 is different from the optical modulation device 10I of the eighth embodiment in that the V-groove (or the deep trench) 36 is disposed, and the light launching unit 14 disposed on the end portion of the groove portion is disposed in an arbitrary position on the side of the traveling-wave electrode 30. In addition, as with the seventh embodiment, the light launching unit 14 is connected to the optical fiber by the butt-joining (Butt Joint) through the mode field converter (MFC), the spot size converter (SSC), or the like, and the groove portion 34 can fix the optical fiber. Furthermore, in the optical modulation device 10J, the end portion of the groove portion 34 configures only the light launching unit 14, and the groove portion 34 may configure both of the incidence unit 12 and the light launching unit 14.

By using this embodiment, for example, it is possible to respond to a case where one side of the light incidence unit is butt-joined (Butt Joint) to the light launching unit, and the other side of the light incidence unit is lens-coupled to the other side of the light launching unit or the like by using a different MFC, and it is possible to apply to a free layout.

Furthermore, in the optical modulation device 10J of FIG. 39, it is not limited to the longitudinal direction of the phase modulation unit 24 perpendicular to the two sides 11a and 11b, and the longitudinal direction of the phase modulation unit 24 may be inclined with respect to the two sides 11a and 11b.

Tenth Embodiment

Figure 40A:
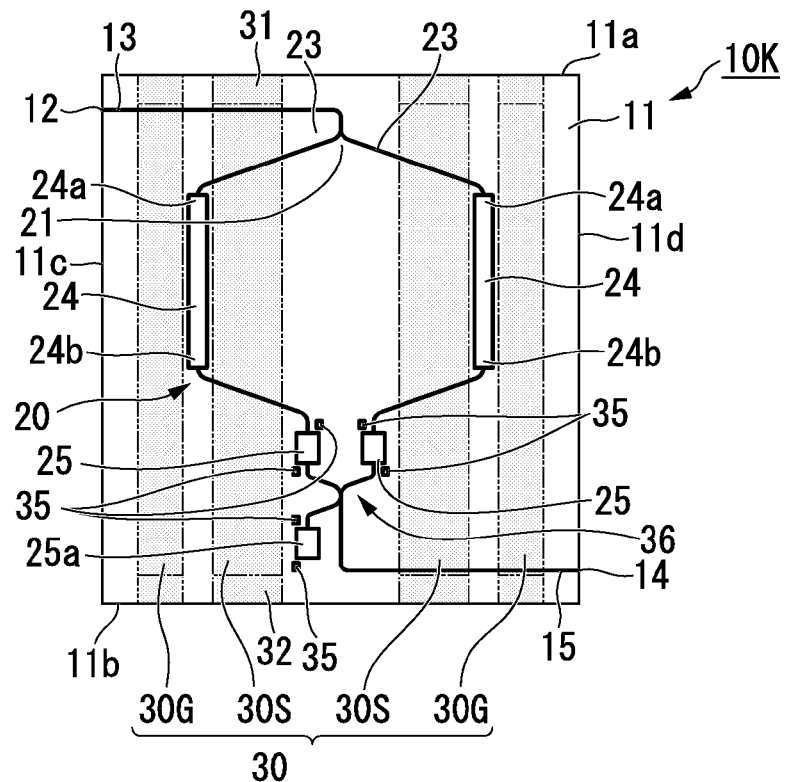
FIG. 40A is a plan view illustrating an optical modulation device according to a tenth embodiment of the present invention.
Figure 40B:
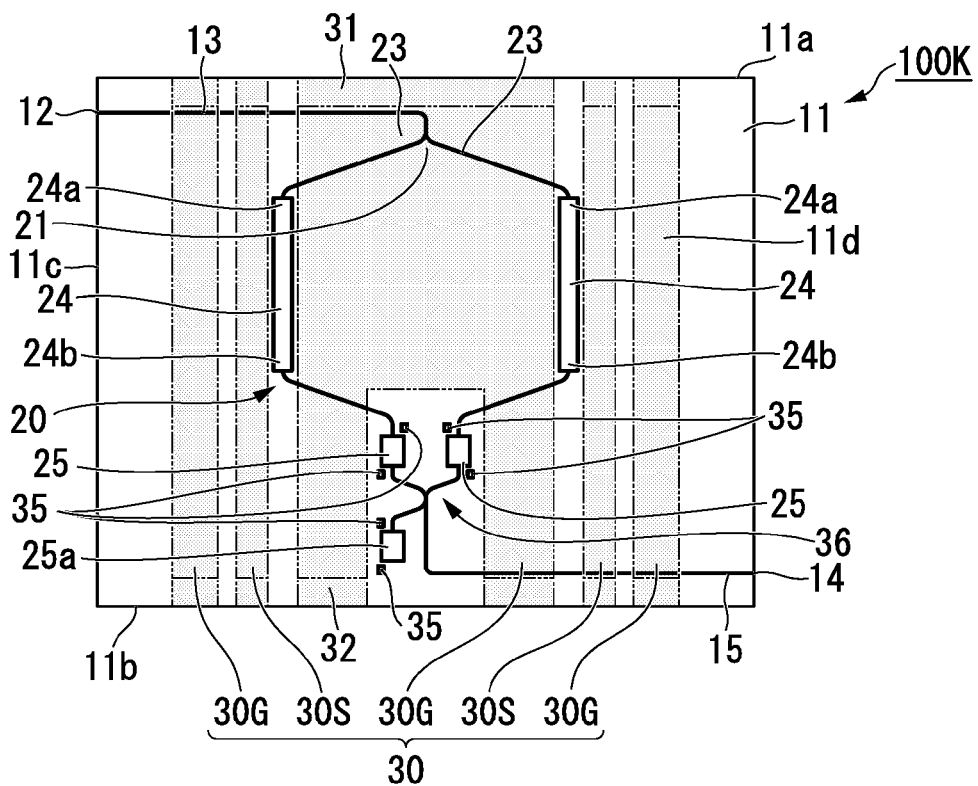
FIG. 40B is a plan view illustrating a modification example of the optical modulation device according to the tenth embodiment of the present invention.

In FIGS. 40A and 40B, an optical modulation device of a tenth embodiment according to the present invention is illustrated. Optical modulation devices 10K and 100K are configured of the planar optical waveguide 11 including the Mach-Zehnder interferometer 20, as with the optical modulation devices 10 and 100 of the first embodiment. In addition, in this embodiment, as with the optical modulation device 10B of the third embodiment, the phase adjustment unit (for example, the low speed phase modulation unit) 25 which is electrically independent and different from the phase modulation unit 24 is included on each of the arm portions 23 of the Mach-Zehnder interferometer 20. In the optical modulation device 10B, the phase adjustment unit 25 is disposed on the outside of the two phase modulation units 24, but in the optical modulation device 10K, the phase adjustment unit 25 is disposed between the two phase modulation units 24 (on the inside of the Mach-Zehnder interferometer 20). In addition, the PD for a monitor 25a may be disposed on the output side of the phase adjustment unit 25, and for example, when the phase adjustment unit 25 has a heater structure, it is possible to measure the temperature of the phase adjustment unit 25. Furthermore, in FIGS. 40A and 40B, one PD for a monitor 25a is disposed, and two PDs for a monitor 25a may be disposed to measure a signal of each of the phase adjustment units 25.

In addition, in this embodiment, the electrode 35 for supplying electric power to the phase adjustment unit 25 is connected to the phase adjustment unit 25 and the PD for a monitor 25a which are the element parts 36 on the inside of the planar optical waveguide 11, and in FIGS. 40A and 40B, only an input and output unit of two electrodes of the earth electrode and the signal electrode is illustrated. Furthermore, a wiring method of the electrode 35 is not limited, and the wiring may be performed as the electrode 35 in FIGS. 4A and 4B. In addition, a common earth electrode may be used by the two phase adjustment units 25. However, in a low speed phase adjuster, it is preferable that the electrode is not wired up to the side of the planar optical waveguide 11 as a high frequency electrode, the electrode 35 is arranged in the vicinity of each of the element parts 36, and the electrode 35 is connected to the outside by using wire bonding, a relay substrate, or the like as illustrated in FIGS. 40A and 40B.

In addition, in the arrangement of the traveling-wave electrode 30 of this embodiment, the output side of the earth electrode 30G in the center is hollow in FIG. 40A. In addition, in FIG. 40B, the signal electrode 30S in the center is divided into two electrodes which are independent. Furthermore, the arrangement is not particularly limited insofar as the traveling-wave electrode 30 is suitably arranged such that the function of the traveling-wave electrode 30 is not lost and the operation of the phase adjustment unit 25, the PD for a monitor 25a, and the electrode 35 does not impede the function. For example, the traveling-wave electrode 30G in the center of FIG. 40A may be divided in the width direction into two electrodes which are independent.

FIG. 40B illustrates a modification example which is applied to a case where the electrode of this embodiment has a GSGSG structure.

As the other element parts 36 disposed on the arm portion 23, the polarization conversion element in the polarization multicircuit, the polarized wave separating and coupling element, the variable optical attenuator (VOA) for uniformalizing the light power between the arms in the Mach-Zehnder interferometer, and the like are included in addition to the phase adjustment unit 25 and the PD for a monitor 25a.

The other element may be disposed on both of the arms, or may be disposed on only one arm.

According to the configuration as in this embodiment, it is possible to increase a degree of freedom on a layout without degrading properties of a high frequency transmission path.

Furthermore, in the optical modulation device 10K of FIGS. 40A and 40B, it is not limited to the longitudinal direction of the phase modulation unit 24 perpendicular to the two sides 11a and 11b, and the longitudinal direction of the phase modulation unit 24 may be inclined with respect to the two sides 11a and 11b.

Eleventh Embodiment

Figure 41:
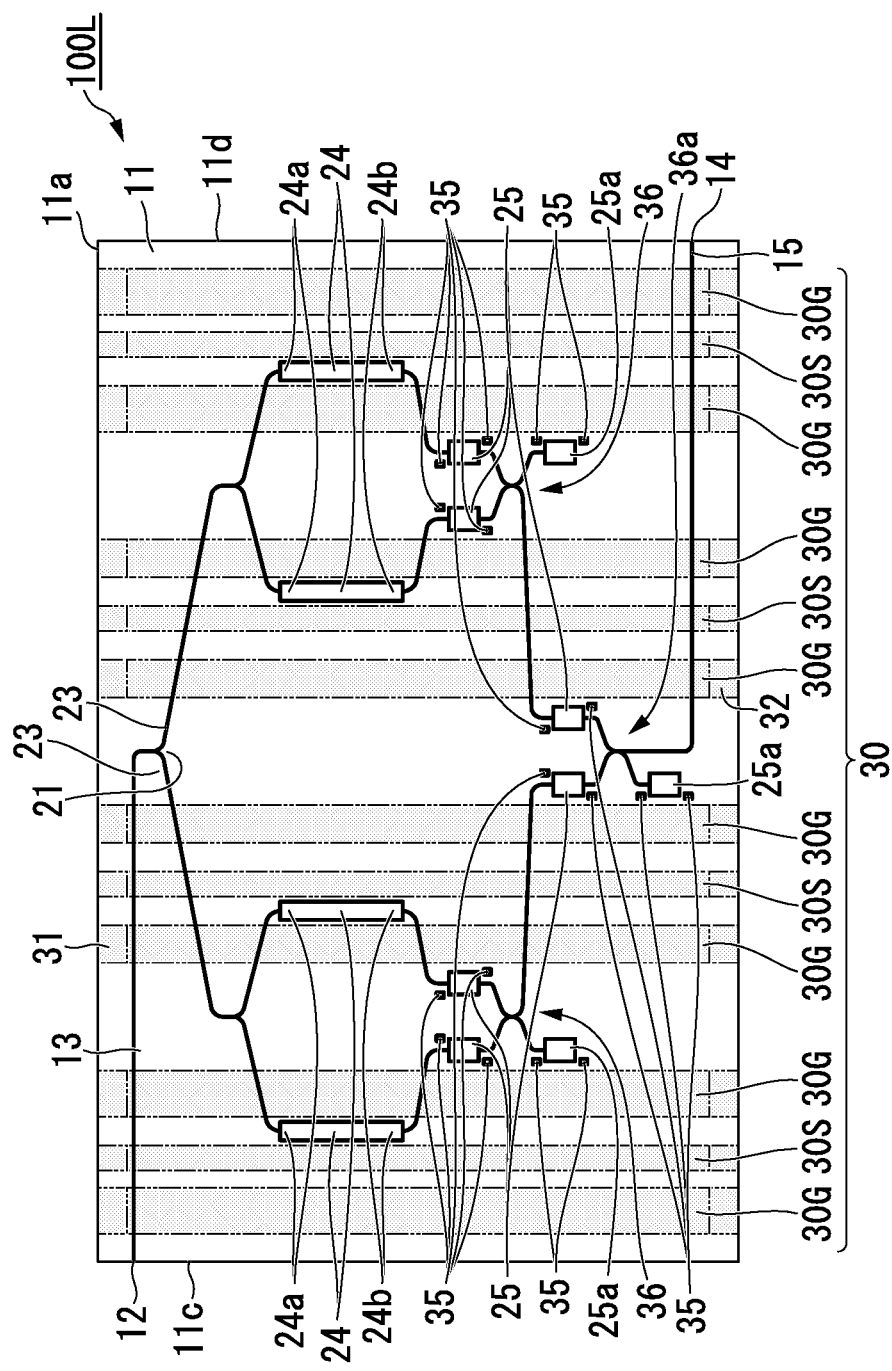
FIG. 41 is a plan view illustrating an optical modulation device according to an eleventh embodiment of the present invention.

In FIG. 41, an optical modulation device of an eleventh embodiment according to the present invention is illustrated. Optical modulation device 100L includes a quadrature phase shift keying modulator (a QPSK modulator) in which two Mach-Zehnder interferometers 20 are combined, light branched by a common optical splitter section (a second optical splitter section) 16 to be incident on a waveguide 17 of the Mach-Zehnder interferometer 20, and a waveguide 19 launching the light from each of the Mach-Zehnder interferometers 20 is combined to a common optical coupler section (a second optical coupler section) 18. In the optical modulation device 10L, in each of the Mach-Zehnder interferometers 20, the phase modulator (for example, the low speed phase adjuster) 25 and the PD for a monitor 25a which are the element parts 36 are disposed on the inside of the two phase modulation units 24, and one more element part 36a is disposed immediately before the optical coupler section 18. That is, the optical modulation device 10L has a structure in which the element parts 36 disposed in each of the Mach-Zehnder interferometers 20 are arranged on the inside of the Mach-Zehnder interferometer 20, and the element part 36a in the coupler section of the two Mach-Zehnder interferometers 20 is arranged between the two Mach-Zehnder interferometers 20, that is, on the outside of each of the Mach-Zehnder interferometers 20.

Here, it is preferable that the element part 36a is usually arranged such that the lengths of the optical waveguides from the respective Mach-Zehnder interferometers 20 are equalized, and according to the configuration of this embodiment, it is possible to easily equalize the lengths of the optical waveguides from the Mach-Zehnder interferometers 20 to the element part 36a.

Accordingly, according to the configuration of this embodiment, it is possible to increase a degree of freedom on a layout without degrading properties of a high frequency transmission path.

Furthermore, in the optical modulation device 10K of FIGS. 40A and 40B, it is not limited to the longitudinal direction of the phase modulation unit 24 perpendicular to the two sides 11a and 11b, and the longitudinal direction of the phase modulation unit 24 may be inclined with respect to the two sides 11a and 11b.

Twelfth Embodiment

Figure 42A:
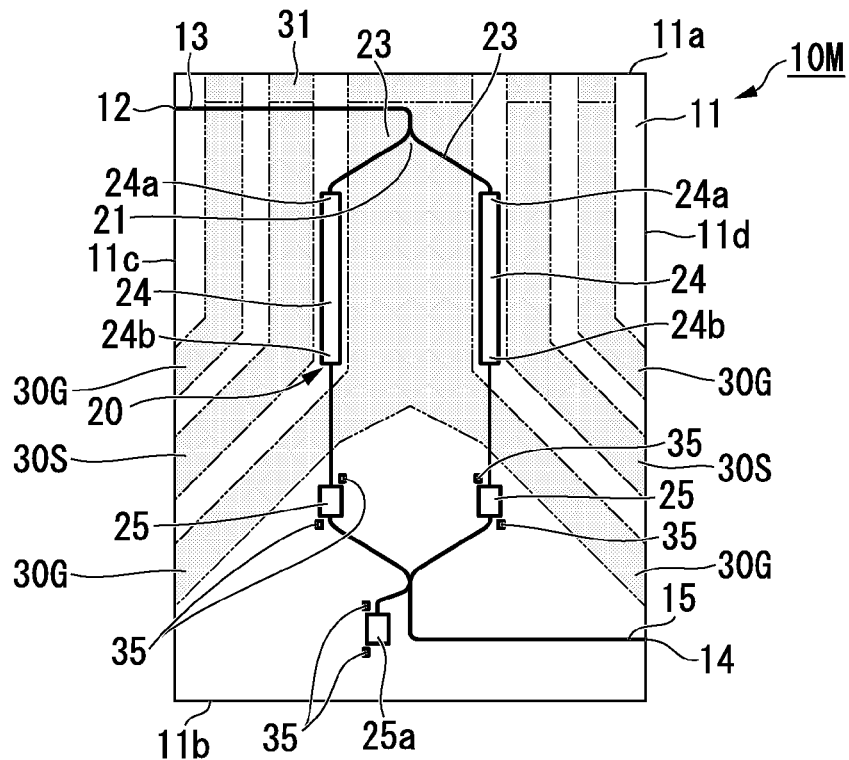
FIG. 42A is a plan view illustrating an optical modulation device according to a twelfth embodiment of the present invention.
Figure 42B:
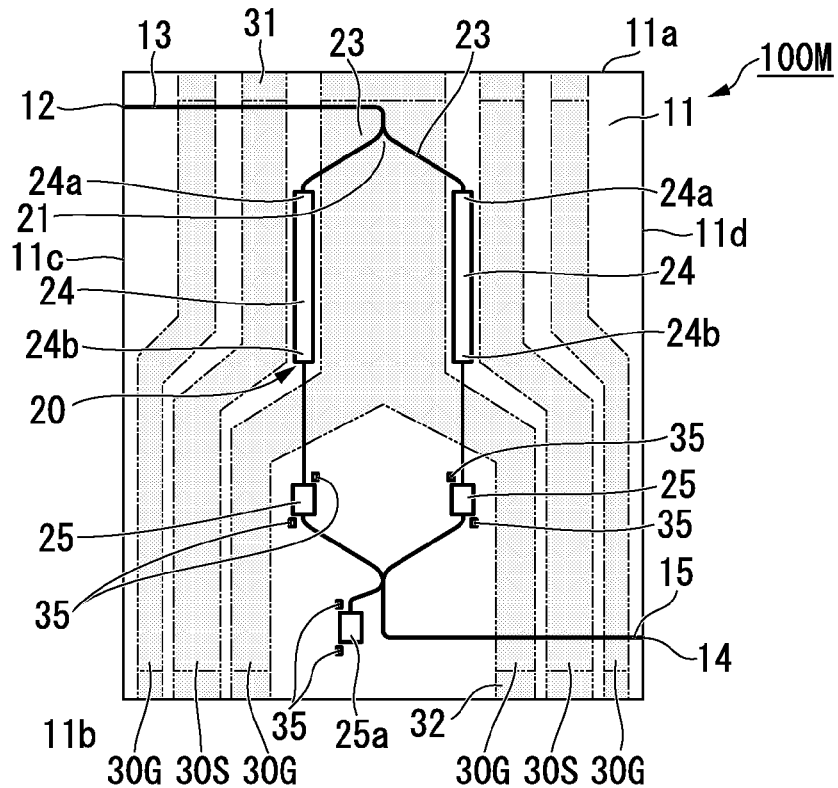
FIG. 42B is a plan view illustrating the optical modulation device according to the twelfth embodiment of the present invention.

In FIGS. 42A and 42B, an optical modulation device of a twelfth embodiment according to the present invention is illustrated. Optical modulation devices 10M and 100M are configured of the planar optical waveguide 11 including the Mach-Zehnder interferometer 20, as with the optical modulation devices 10 and 100 of the first embodiment. In addition, in this embodiment, as with the optical modulation devices 10B and 10K of the fourth embodiment and the tenth embodiment, the phase adjustment unit (for example, the low speed phase modulation unit) 25 which is electrically independent and different from the phase modulation unit 24 is included on each of the arm portions 23 of the Mach-Zehnder interferometer 20. In the optical modulation device 10B, the phase adjustment unit 25 is disposed on the outside of the two phase modulation units 24 or between the two phase modulation units 24, and in the optical modulation device 10M, the phase adjustment unit 25 is disposed on the extended line in the length direction on the output side of each of the phase adjustment units 25. That is, the phase adjustment unit 24 and the phase adjustment unit 25 are linearly arranged.

In addition, in this embodiment, in order to attain the configuration described above, the traveling-wave electrode 30 on the output side from the phase modulation unit 24 is bent. This is because, even when a loss occurs in the electrical signal on the output side (a poststage) from the position in which a mutual interaction occurs with respect to the phase modulation unit in the traveling-wave electrode, a mutual interaction with respect to the light has already completed, and thus the output modulate signal is less affected. Accordingly, the traveling-wave electrode 30 of this embodiment is not limited insofar as the input unit 31 of the traveling-wave electrode to the position in which the mutual interaction occurs with respect to the phase modulation unit are linearly configured along the phase modulation unit 24.

In addition, the side on which the output unit is disposed is different in FIG. 42A and FIG. 42B. Furthermore, the position of the output unit is not limited insofar as the poststage of the traveling-wave electrode 30 is configured to avoid the low speed phase modulation unit 25.

By using this embodiment, it is possible to linearly arrange the phase adjustment unit 24 and the phase adjustment unit 25 by bending the poststage of the traveling-wave electrode, and thus it is possible to enhance the freedom of design of layout of the optical waveguide design. In particular, in this embodiment, it is possible to reduce the optical waveguide, and it is possible to reduce a loss of the propagate light.

(Configuration Example of Phase Modulation Unit)

Figure 7:
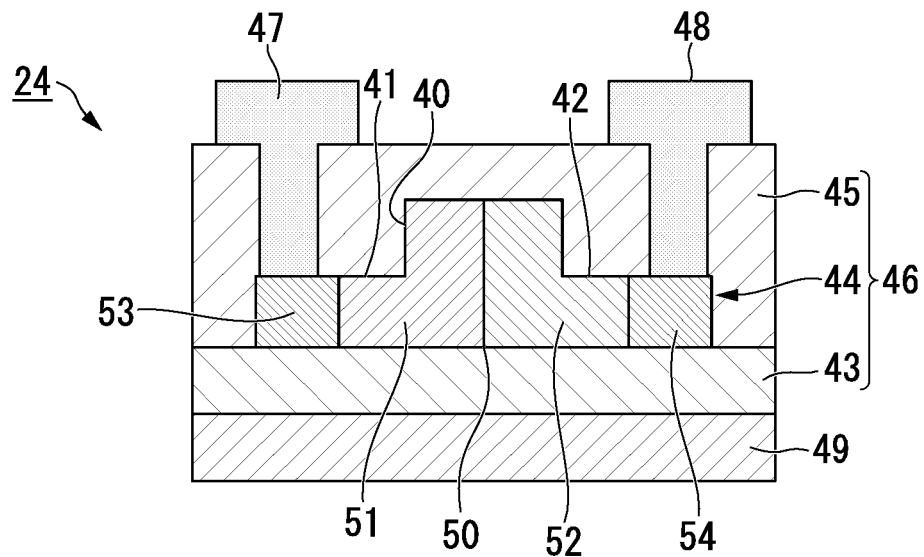
FIG. 7 is a sectional view illustrating an example of a sectional structure of a phase modulation unit.

In FIG. 7, an example of a sectional structure of the phase modulation unit is illustrated. The sectional surface is perpendicular to a traveling direction of the light. In such a configuration example, an optical waveguide 46 used in the phase modulation unit 24 includes a pair of slab portions 41 and 42 of which a core 44 is respectively connected to a rib portion 40 and both sides thereof, and a lower portion clad 43 and an upper portion clad 45 respectively surrounding the core 44. An upper portion of electrodes 47 and 48 is formed on the upper portion clad 45, and a lower portion of the electrodes 47 and 48 is electrically connected to the slab portions 41 and 42.

Such a waveguide structure is formed of a laminated body of Si—$SiO_2$—Si, and is can be manufactured on the basis of a Silicon on insulator (SOI) substrate. A silica ($SiO_2$) layer in the middle is used as the lower portion clad 43, and a silicon (Si) layer in the upper portion is used as the core 44. The Si layer is a rib waveguide including the rib portion 40 which is thick in the center, and the light is distributed on the basis of the rib portion 40. The upper portion clad 45 is formed by stacking silica ($SiO_2$) or the like after a rib structure of the core 44 is formed. The upper portion clad 45 is not an essential configuration, and a material having a refractive index lower than that of the core 44 may be arranged, and for example, a resin material clad or a air clad can be applied. In the electrodes 47 and 48 connected to the slab portions 41 and 42 which are thin, a material which can form Ohmic contact with the silicon material of the core 44, such as aluminum (Al), is preferable. The electrodes 47 and 48 are arranged by having a distance in a horizontal direction from the rib portion 40. The Si layer of the lower portion of the SOI substrate is a substrate 49 under the optical waveguide 46.

Part of the silicon core 44 is doped with P-type impurities or N-type impurities. In such a configuration example, one slab portion 41 is doped with the P-type impurities, and the other slab portion 42 is doped with the N-type impurities.

A dopant (the impurities) which applies conductivity to a semiconductor can be used by being suitably selected according to a base medium. For example, as in this configuration example, when the base medium is a IV group semiconductor such as silicon, a III group element such as boron (B) is used as a P-type dopant, and a V group element such as phosphorus (P) or arsenic (As) is used as an N-type dopant.

As the arrangement of a doping region, in this configuration example, a part of the slab portion 41 and the rib portion 40 which is in contact with the slab portion 41 is doped with the P-type impurities, and a part of the slab portion 42 and the rib portion 40 which is in contact with the slab portion 42 is doped with the N-type impurities. A P-type region 51 and an N-type region 52 are in contact with each other in the rib portion 40, and a depletion layer is generated in a boundary (a PN joining portion) 50 thereof. By applying a voltage to this PN structure from the outside through the electrodes 47 and 48, a carrier distribution of the PN joining portion 50 is fluctuated, and the width of the depletion layer is changed. It is known that the refractive index of silicon is changed according to a carrier density. By using this, an effective refractive index of the optical waveguide can be controlled by a voltage according to the change in the carrier distribution, and a phase state of the light at the time of being output from the phase modulation unit can be controlled.

In addition, a part separated from the rib portion 40 of the slab portions 41 and 42 has a doping concentration which is higher than that of other portions, and thus becomes a P+ region 53 and an N+ region 54. Accordingly, the Ohmic contact with the electrodes 47 and 48 can be formed. The P+ region 53 and the N+ region 54 may be formed at least on an upper surface of the slab portions 41 and 42 (a portion which is in contact with the electrodes 47 and 48), and can be formed over the entire thickness direction of the slab portions 41 and 42 according to the thickness of the slab portions 41 and 42 or doping conditions. Accordingly, it is possible to reduce parasitic resistance up to the PN joining portion 50 which is the center portion of the rib portion 40.

Figure 8:
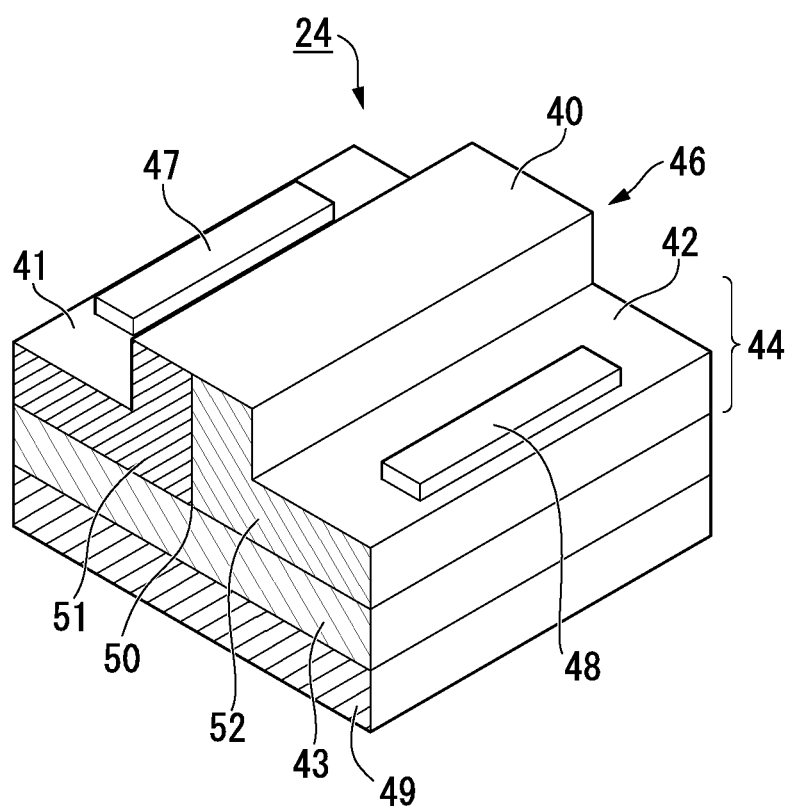
FIG. 8 is a perspective view illustrating an example of a guide direction structure of the phase modulation unit.

In FIG. 8, an example of a guide direction structure of the phase modulation unit is illustrated. The phase modulation unit 24 has a continuous structure in which the sectional structure illustrated in FIG. 7 is successive in the longitudinal direction. The length of the phase modulation unit 24 in the longitudinal direction is determined according to conditions such as the necessary amount of phase change and a voltage to be applied. For example, in a case where an assumed operation voltage is 4 Vpp, and the amount of phase change per a unit length (for example, 1 mm) at the operation voltage is π/4 radians, when the necessary amount of phase change in the entire phase modulation unit 24 is π/2 radians, the length can be determined as being double the unit length (for example, 2 mm), and when the necessary amount of phase change is 7 radian, the length can be determined as being quadruple the unit length (for example, 4 mm).

In addition, the electrodes 47 and 48 configure the traveling-wave electrode. That is, the electrodes 47 and 48 travel in parallel with a rib optical waveguide 46 in the longitudinal direction of the phase modulation unit 24, and the voltage propagates in the same direction as that of the light. For example, when the light guided to the optical waveguide propagates towards the inner side from the front of the drawing, the voltage is applied by connecting a signal source to the front side of the electrodes 47 and 48 and a termination to the inner side. When the propagation direction is directed towards the front side from the inner side, the voltage is applied by connecting the signal source to the inner side of the electrode and the termination to the front side.

(Specification of Waveguide Structure)

In the connection between the phase modulation unit 24 and the other elements (for example, the optical splitter section 21 or the optical coupler section 22) and the wiring of the waveguide on the substrate, a rectangular waveguide (a fine line waveguide) of which a sectional surface is in the shape of a rectangle can be used in addition to the rib waveguide. The rectangular waveguide has a disadvantage that the rectangular waveguide is more strongly affected by fine concavities and convexities (side wall roughness) which are generated in a waveguide side wall at the time of the manufacturing due to stronger concentration of an electric field, and thus an optical loss increases, but it is possible to decreases a radius of curvature by strong confinement. In addition, MMI, MFC, and the like described later are configured by using the rectangular waveguide.

Figure 9:
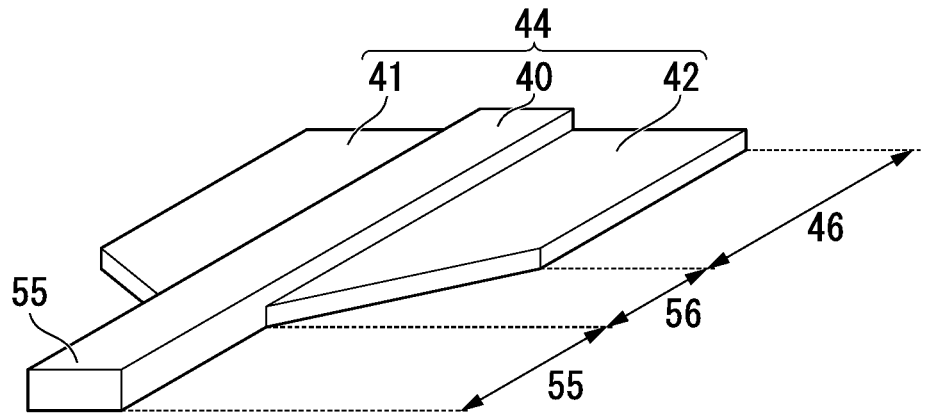
FIG. 9 is a perspective view illustrating an example of a connection portion between a rib waveguide and a rectangular waveguide.

In FIG. 9, an example of a connection portion between the rib waveguide and the rectangular waveguide is schematically illustrated. In the illustrated example, the rectangular waveguide 55 and the rib portion 40 of the rib waveguide 46 have the same width and the same thickness, and the rectangular waveguide 55 and the rib portion 40 of the rib waveguide 46 having different widths may be continuously connected to each other. In a transition region 56 from the rectangular waveguide 55 to the rib waveguide 46, the width of the slab portions 41 and 42 is continuously changed from 0. In the transition region 56, the width of the slab portions 41 and 42 may be linearly increased along the propagation direction of the light (the longitudinal direction of the rib portion 40), or may be increased like a quadratic function. When the width is linearly changed, the design is easily performed. In order to further reduce an optical loss, the width may be changed like a quadratic function.

It is necessary that the length of the transition region 56 is sufficiently longer than the wavelength of the light (for example, approximately 1 μm to 2 μm). The length of the transition region 56 is not particularly limited, and for example, approximately 20 μm can be exemplified.

When the rectangular waveguide is optically coupled to the optical fiber in a direct way or in an indirect way through an optical component such as a lens, it is preferable that an inversely tapered waveguide (refer to FIG. 32 described later) of which the width is gradually narrowed towards an end surface is disposed in a tip end portion of the rectangular waveguide. Accordingly, it is possible to reduce mode mismatch in the optical fiber and the waveguide end surface, and it is possible to reduce an optical loss in the optical coupling.

The thickness of the rib waveguide and the rectangular waveguide is in a submicron scale, and thus the width and the thickness of the tip end portion of the inversely tapered waveguide are extremely fine. Accordingly, in the vicinity of the waveguide end surface, a sectional area of a high refractive index core is less than or equal to $1/100$ with respect to the width of a mode distribution of incident light intensity, and thus it is possible to suppress a reflection ratio in the inversely tapered waveguide end surface with respect to the light incident from the optical fiber to approximately −30 dB. As a result thereof, it is possible to configure a light integrated circuit having not only a low optical loss and a high extinction ratio, but also a high return loss (a small reflectance loss).

Figure 10A:
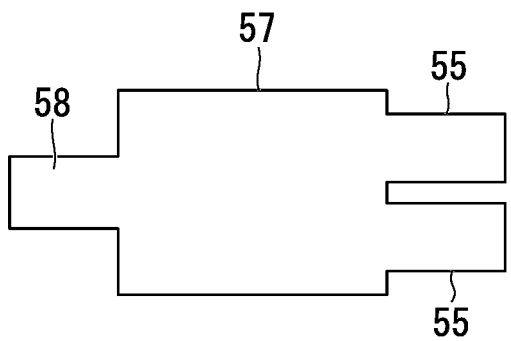
FIG. 10A is a plan view illustrating an example of a 1×2 optical splitter section formed of a multimode interferometer.
Figure 10B:
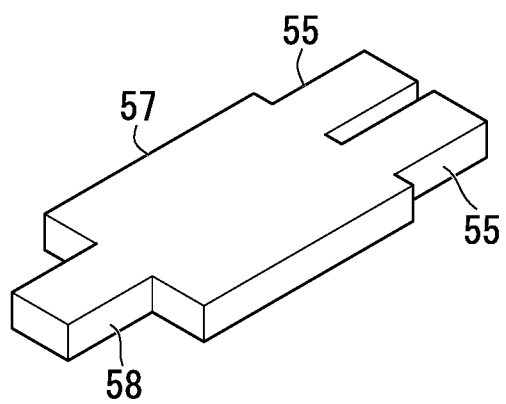
FIG. 10B is a perspective view illustrating an example of a 1×2 optical splitter section formed of the multimode interferometer.

As the optical splitter section and the optical coupler section, it is possible to use a 1×2 multimode interferometer (MMI). In FIGS. 10A and 10B, a schematic view of the 1×2 MMI is illustrated. FIG. 10A is a plan view, and FIG. 10B is a perspective view. In an MMI 57, one rectangular waveguide (a reference numeral is 58) is connected to one side, and two rectangular waveguides (a reference numeral is 55) are connected to the opposite side. It is preferable that the width of these rectangular waveguides 55 and 58 be identical to a rib width of the rib waveguide. As a specific example, it is exemplified that the width of the rectangular waveguides 55 and 58 is 0.5 μm, a gap between two rectangular waveguides 55 is 0.3 the width of the MMI is 1.5 μm, and the length of the MMI is 1.8 μm, with respect to the rib width of 500 nm (0.5 μm). In this case, as the gap from the rectangular waveguide 55 to a long side of the MMI 57, a gap of 0.1 μm is ensured according to calculations.

Figure 17A:
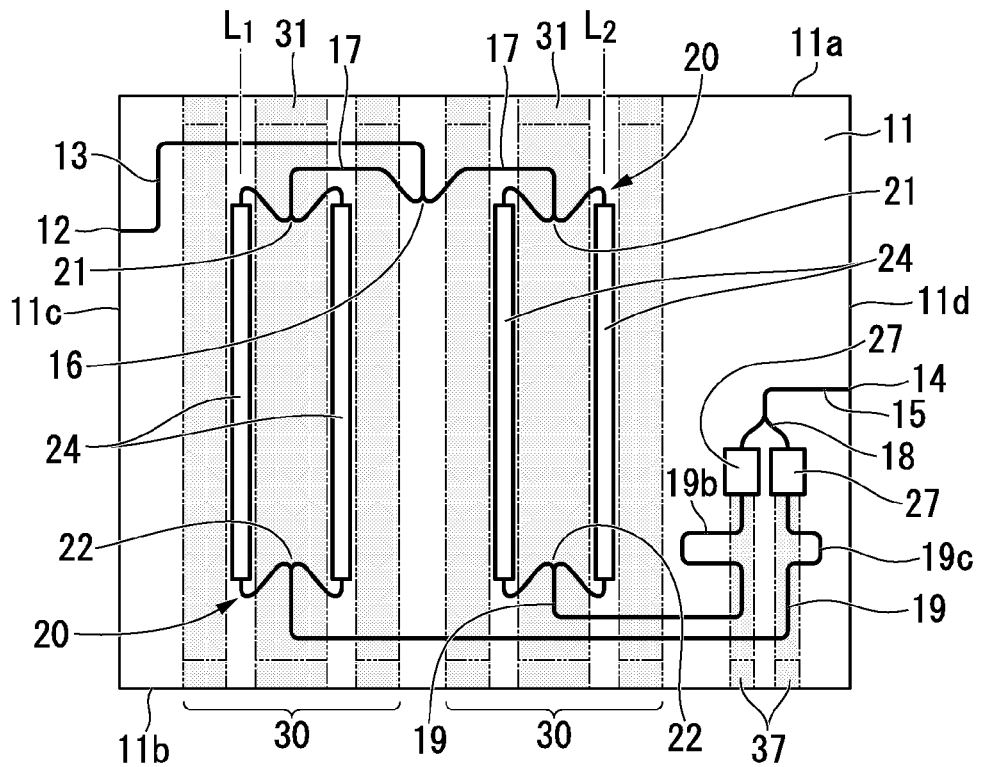
FIG. 17A is a plan view illustrating a first example of an optical modulator for QPSK.
Figure 17B:
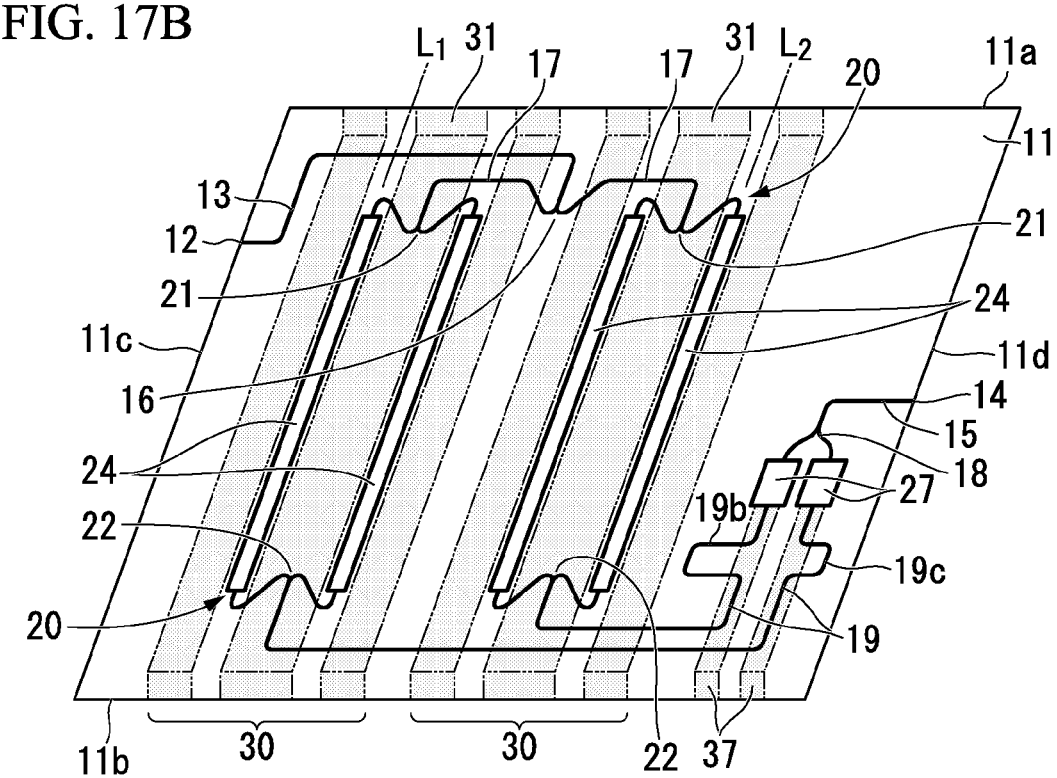
FIG. 17B is a plan view illustrating a first example of an optical modulator for QPSK of a modification example.

It is preferable that the MMI is adopted to the optical splitter section and the optical coupler section (for example, the optical splitter section 16, the optical coupler section 18, and the like of FIGS. 17A and 17B, or the like) used in the planar optical waveguide 11 in addition to the optical splitter section 21 and the optical coupler section 22 of the Mach-Zehnder interferometer 20 of FIG. 1A or the like.

Figure 11:
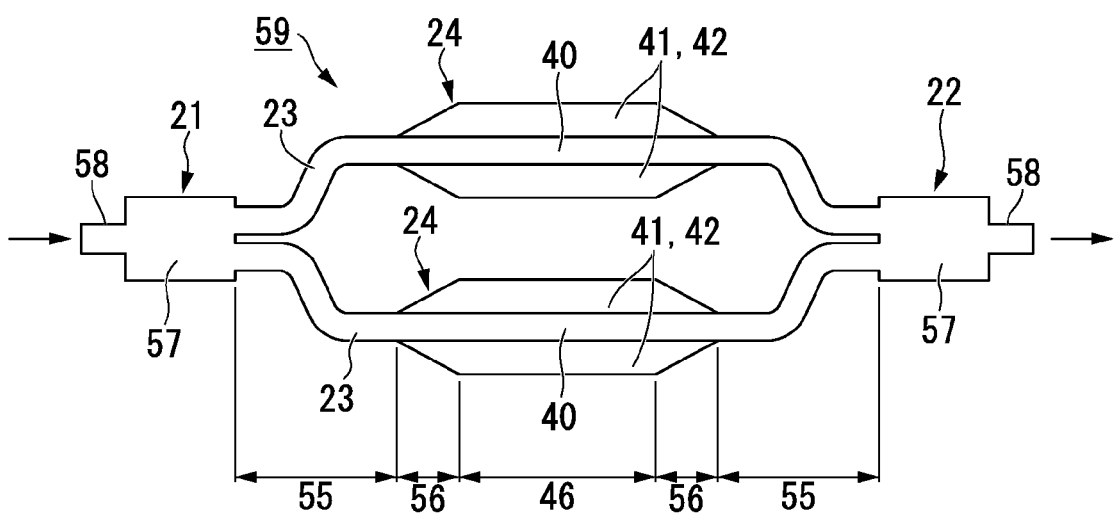
FIG. 11 is a plan view illustrating an example of a Mach-Zehnder waveguide.

In FIG. 11, a schematic view of a Mach-Zehnder waveguide 59 is illustrated. The light incident on the optical splitter section 21 from the rectangular waveguide 58 on a left side is branched by the two rectangular waveguides 55 on a right side, and propagates both of the arm portions 23 of the Mach-Zehnder waveguide 58. By inputting a high speed electrical signal to the rib optical waveguide 46 configuring the phase modulation unit 24, the optically modulated signal light is launched from the rectangular waveguide 58 on the right side of the optical coupler section 22. The rectangular waveguides 58 before and after the Mach-Zehnder waveguide 59 correspond to the optical waveguides 13 and 15 in FIGS. 1A to 1C, are bent by 90° in a direction horizontal to the rib optical waveguide 46, and are connected to an optical coupling unit (in FIGS. 1A to 1C, corresponding to the light incidence unit 12 and the light launching unit 14) formed of the inversely tapered waveguide described above.

As described above, it is possible to configure the Mach-Zehnder waveguide 58 (corresponding to the Mach-Zehnder interferometer 20 of FIGS. 1A to 1C) suitable for an optical modulator, in which attenuation in the input of the electrical signal is suppressed with a low optical loss. When the Mach-Zehnder waveguide is used, it is possible to control a chirp of an optical signal, and it is possible to configure a high speed optical modulator suitable for long distance transmission.

In addition, even though the detail will be described later, the Mach-Zehnder waveguide 58 is connected in multi-stages, and thus it is possible to configure an optical modulator which responds to a more complicated modulating method.

(Details of Electrode Structure)

Figure 12:
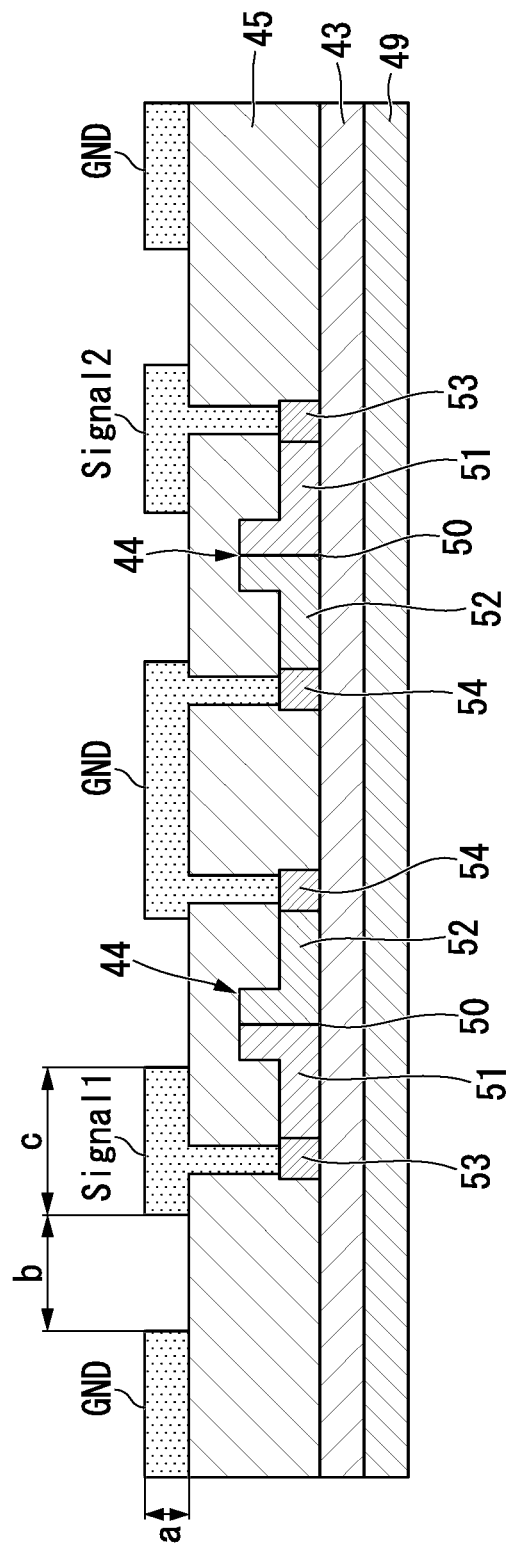
FIG. 12 is a sectional view taken along line A-A of FIGS. 14A and 14B.

In FIG. 12, a sectional view (corresponding to line A-A of FIGS. 14A and 4B) across two rib waveguides of the Mach-Zehnder interferometer is illustrated. The sectional structure of the rib waveguide is identical to that of FIG. 7 and FIG. 8. The PN joining portion 50 of each of two waveguide cores 44 is arranged such that the directions of the PNs are opposite to each other, and the N+ region 54 on both sides is connected to the same earth electrode (GND).

A different high frequency signal can be applied to the P+ region by two signal electrodes (Signal 1 and Signal 2). An earth electrode (GND) is further arranged on the outside of the two signal electrodes, and it is possible to configure a coplanar electrode formed of GSGSG.

In a push-pull operation using the Mach-Zehnder interferometer, signals (DATA, xDATA) in which the Ons and Offs are inverted from each other are applied to the Signal 1 and the Signal 2.

Each dimension can be designed according to desirable characteristic impedance. It is known that a ratio of a width c of the signal electrode and a gap b with respect to the earth electrode c:b is 2:1 in a coplanar line on Si, and thus it is possible to set the characteristic impedance to approximately 50Ω. In this structure, c/b is designed to be less than 2 in consideration of an influence of junction capacity which occurs in the PN structure of the silicon rib waveguide, and thus it is possible to adjust the characteristic impedance. As an example, an electrode thickness a is 2 μm, a gap b between GSs is 8 μm, and a signal electrode width c is 10 μm.

Figure 13A:
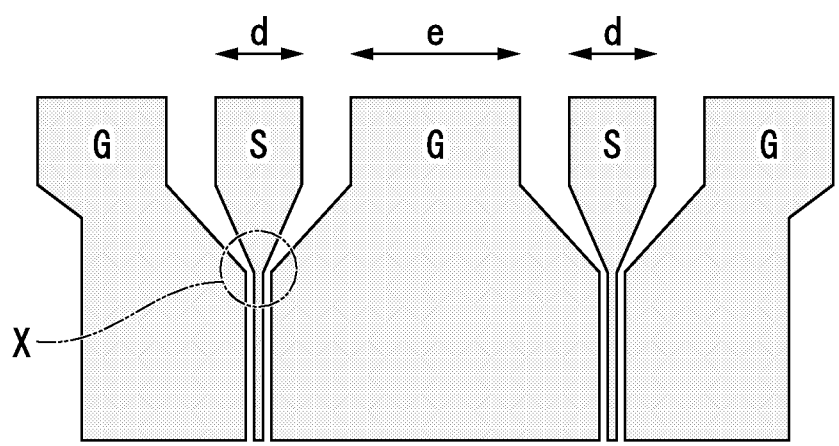
FIG. 13A is an overall view of a plan view illustrating an example of an electrode structure of a chip end.
Figure 13B:
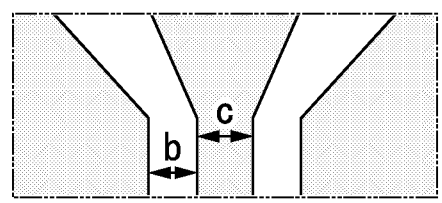
FIG. 13B is a partially enlarged view of an X portion of a plan view illustrating an example of the electrode structure of the chip end.
Figure 13C:
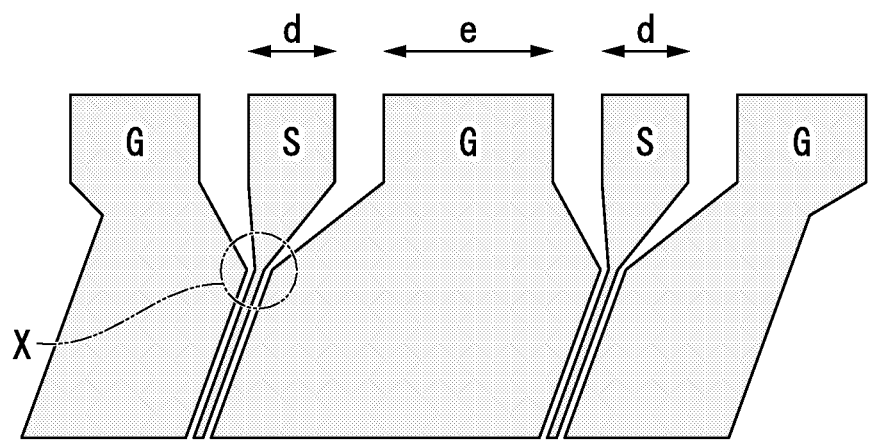
FIG. 13C is an overall view of a plan view illustrating an example of a modification example of the electrode structure of the chip end.
Figure 13D:
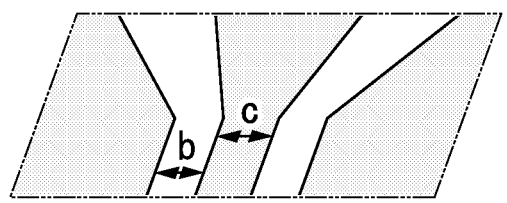
FIG. 13D is a partially enlarged view of an X portion of a plan view illustrating an example of a modification example of the electrode structure of the chip end.
Figure 14A:
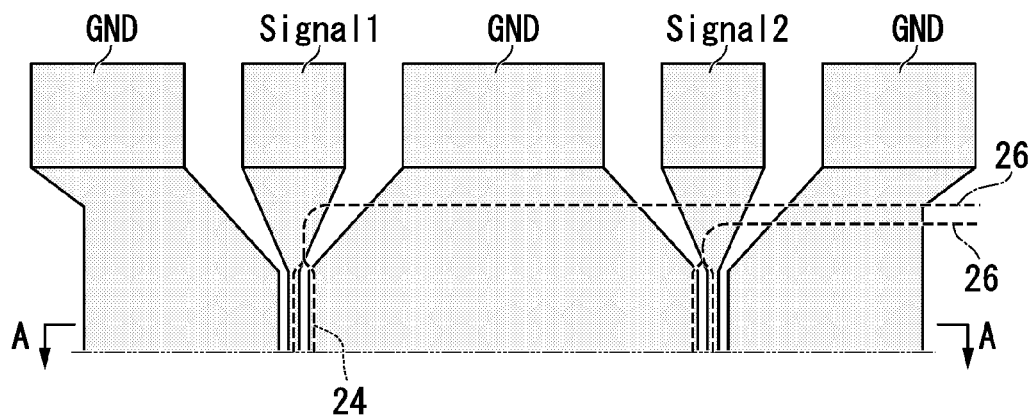
FIG. 14A is a plan view illustrating a structure in which an optical waveguide passes under the electrode structure.
Figure 14B:
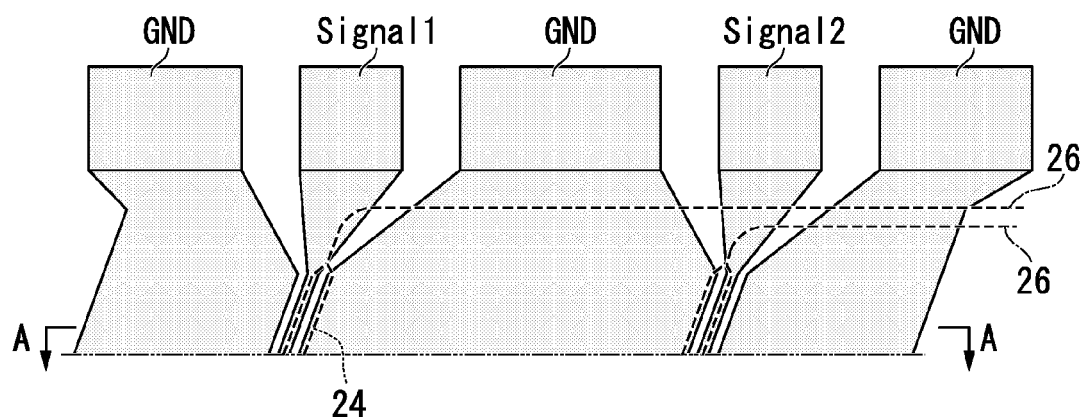
FIG. 14B is a plan view illustrating a structure in which an optical waveguide passes under the electrode structure of the modification example.

Next, a schematic view of the electrode on the chip end is illustrated in FIGS. 13A to 13D and FIGS. 14A and 14B. FIGS. 13A, 13B, and 14A are schematic views of the electrode when the longitudinal direction of the phase modulation unit is perpendicular to the two sides 11a and 11b, and FIGS. 13C, 13D, and 14B are schematic views of the electrode when the longitudinal direction of the phase modulation unit is inclined with respect to the two sides 11a and 11b.

In the chip end portion, electrical connection is performed with respect to the package positioned on the outside or the electrode manufactured on the relay substrate or the like by bonding. As a connecting method, a flip chip, wire bonding, or the like can be used. In order to ensure a sufficient contact area, for example, a bonding connection portion of 100 μm square is arranged on the end portion of the electrode. By performing the connection by continuously changing the width from the end portion of the electrode towards the electrode of the phase modulation unit 24, reflectance or attenuation due to mismatch of characteristic impedance is reduced. An optical waveguide 26, as illustrated in FIGS. 14A and 14B, passes through the lower portion of the electrode, and thus it is possible to reduce a distance from the bonding connection portion of the chip end portion to the phase modulation unit 24. Furthermore, in FIG. 14A, each optical waveguide 26 arranged on the lower portion of the electrode may be a part of the arm portion 23 which is directed towards the outside of the phase modulation unit 24 as illustrated in FIG. 5A, or may be the optical waveguides 13 and 15 before and after the Mach-Zehnder interferometer 20, and in FIG. 14B, each optical waveguide 26 arranged on the lower portion of the electrode may be a part of the arm portion 23 which is directed towards the outside of the phase modulation unit 24 as illustrated in FIG. 5B, or may be the optical waveguides 13 and 15 before and after the Mach-Zehnder interferometer 20.

FIG. 13B is a partially enlarged view of an X portion of FIG. 13A, and FIG. 13D is a partially enlarged view of an X portion of FIG. 13C. At this time, the optical waveguide passing through the lower portion of the electrode avoids the bonding connection portion which is set on the chip end portion in the shape of a rectangle, and thus it is possible to avoid an influence of distortion which occurs at the time of the bonding.

As the size of each element of FIGS. 13A to 13D, as with FIG. 12, the gap b between GSs is 8 μm and the signal electrode width c is 10 μm on the phase modulation unit, and a signal electrode width d is 100 μm and an earth electrode width e is 200 μm on the chip end portion.

In an example illustrated in FIGS. 12 to 14B, the electrode has a GSGSG structure. The entire optical modulation device of this case is exemplified in FIGS. 15A and 15B. In optical modulation devices 10E and 100E, a traveling-wave electrode 30A includes an earth electrode 30G between the two arm portions 23 of the Mach-Zehnder interferometer 20, includes a signal electrode 30S on the outside of each of the two arm portions 23, and further includes the earth electrode 30G on the outside of the signal electrode 30S.

Figure 15A:
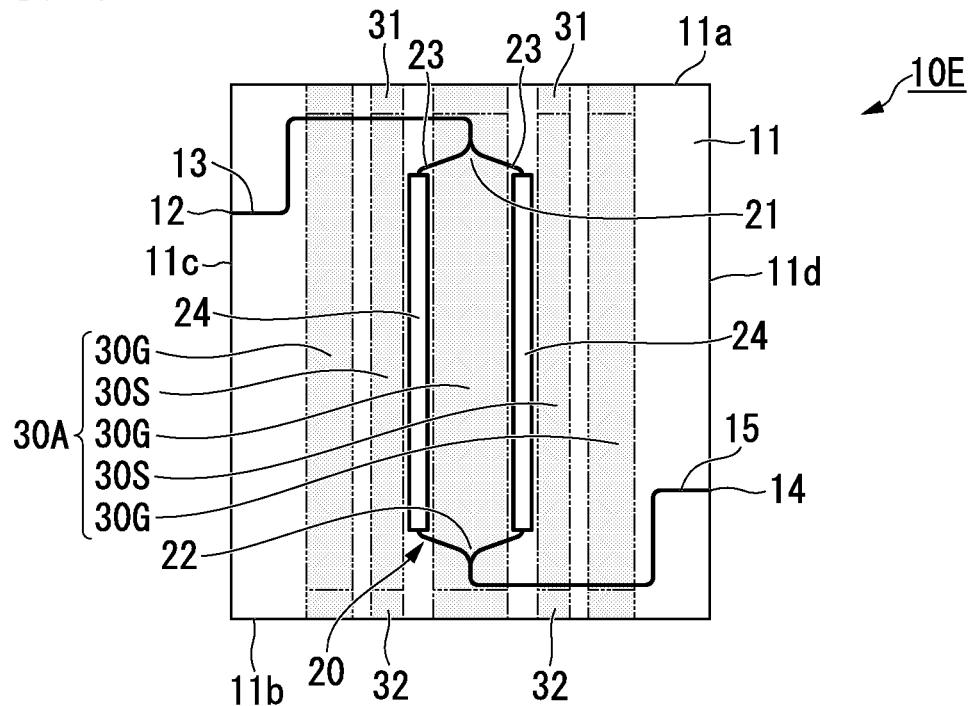
FIG. 15A is a plan view exemplifying the optical modulation device in which the electrode has a GSGSG structure.

Furthermore, in the optical modulation device 10E of FIG. 15A, the longitudinal direction of the phase modulation unit 24 is perpendicular to the two sides 11a and 11b. On the other hand, in the optical modulation device 100E of FIG. 15B, the longitudinal direction of the phase modulation unit 24 is inclined with respect to the two sides 11a and 11b.

Figure 16A:
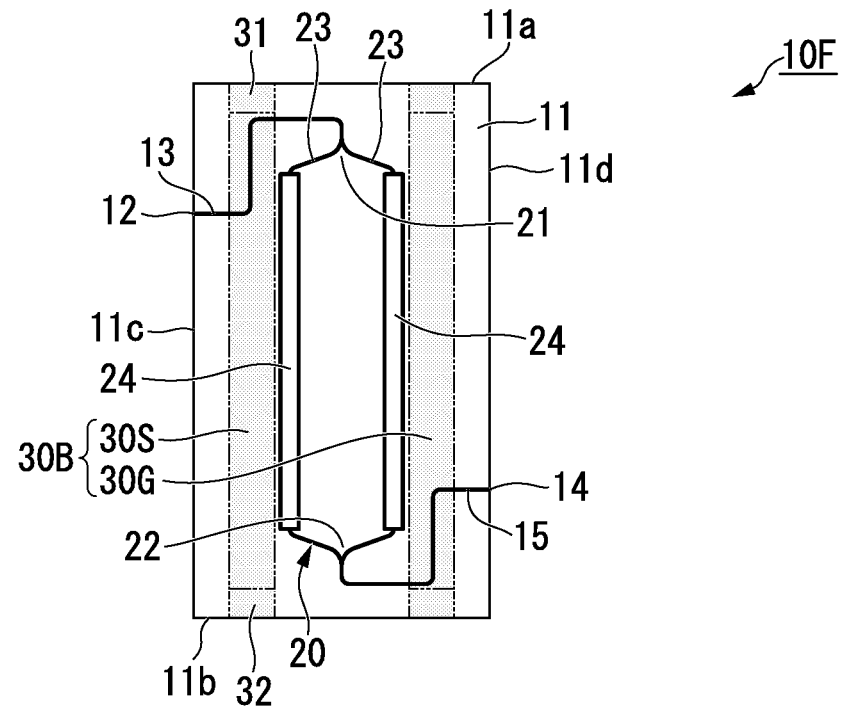
FIG. 16A is a plan view exemplifying the optical modulation device in which the electrode has a GS structure.
Figure 16B:
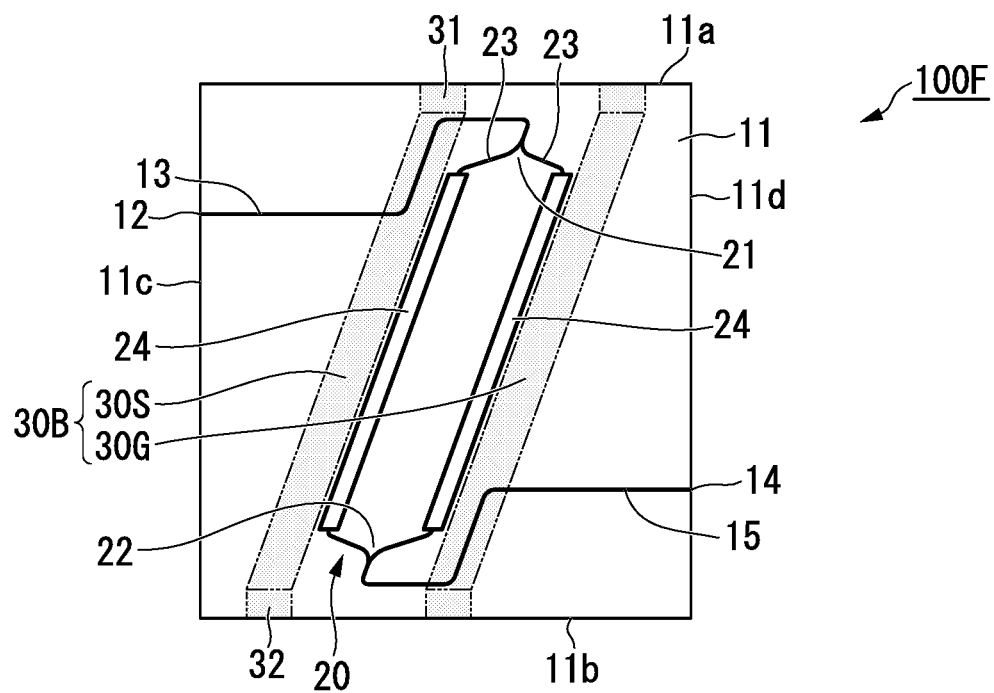
FIG. 16B is a plan view exemplifying the optical modulation device in which the electrode of the modification example has a GS structure.

In addition, in FIGS. 16A and 16B, an example of an optical modulation device in which the electrode is GS is illustrated. The electrode having a GS structure, for example, is disclosed in NPL 1. In an optical modulation device 10F, a traveling-wave electrode 30B includes the earth electrode 30G and the signal electrode 30S on the outside of each of the two arm portions 23 of the Mach-Zehnder interferometer 20.

Furthermore, in the optical modulation device 10F of FIG. 16A, the longitudinal direction of the phase modulation unit 24 is perpendicular to the two sides 11a and 11b, but in an optical modulation device 100F of FIG. 16B, the longitudinal direction of the phase modulation unit 24 is inclined with respect to the two sides 11a and 11b.

Thus, even when the electrode does not have a GSG structure, it is possible to decrease a loss of an electrical signal of a high frequency electrode and to widen a bandwidth thereof by the structure illustrated in FIGS. 1A to 1C, FIG. 3A to FIG. 6B, or the like.

(Optical Modulator for QPSK)

The embodiment according to the present invention is not limited to the configuration in which the planar optical waveguide includes one Mach-Zehnder interferometer, and a configuration including a plurality of Mach-Zehnder interferometers (MZI) can be also used. In particular, in a case of multi-valuing, even when light is branched into the plurality of MZIs, or is combined from the plurality of MZIs, it is possible to maintain a distance from the phase modulation unit of each of the MZIs to the end portion of the device to be minimized.

As an example, in FIGS. 17A and 17B and FIGS. 18A and 18B, a configuration example of an optical modulator for QPSK is illustrated. Light branched by a common optical splitter section 16 is incident on the waveguide 17 of each of the Mach-Zehnder interferometers 20, and the waveguide 19 launching the light from each of the Mach-Zehnder interferometers 20 is combined to a common optical coupler section 18. Furthermore, in FIGS. 17A and 18A, the longitudinal direction of the phase modulation unit 24 is perpendicular to the two sides 11a and 11b, but in FIGS. 17B and 18B, the longitudinal direction of the phase modulation unit 24 is inclined with respect to the two sides 11a and 11b.

The electrode structure of the traveling-wave electrode 30 disposed in each of the Mach-Zehnder interferometers 20 may be GSG, GSGSG, GS, and the like. When each of the two Mach-Zehnder interferometers 20 has a GSGSG structure, each of the two Mach-Zehnder interferometers 20 may have an independent GSGSG-GSGSG structure, or may have a GSGSGSGSG structure in which the adjacent earth electrodes are in common. When each of the two Mach-Zehnder interferometers 20 has a GS structure, each of the two Mach-Zehnder interferometers 20 may have a GS-GS structure having the same direction, or may have a GS-SG structure having opposite directions.

When an optical modulator for a quadrature phase shift keying (QPSK) format is used, phase modulation of $\pi/2$ is performed between the outputs of the two Mach-Zehnder interferometers 20. A $\pi/2$ shift adjustment unit 27 for this can be realized by a heater type phase adjustment unit having the same configuration as that of the phase adjustment unit 25 described above, and as with the configuration illustrated in FIGS. 5A and 5B, it is possible to arrange the other elements on a side portion.

When a part or all of the waveguides 17 which connect each of the Mach-Zehnder interferometers 20 to the common optical splitter section 16 are arranged on the side portion, it is preferable that lengths of the waveguides 17 are identical to each other. In addition, when a part or all of the waveguides 19 which connect each of the Mach-Zehnder interferometers 20 to the common optical coupler section 18 are arranged on the side portion, it is preferable that the lengths of the waveguides 19 are identical to each other.

In FIGS. 17A and 17B, the waveguides 19 which connect each of the Mach-Zehnder interferometers 20 to the common optical coupler section 18 are arranged on the side portion. Other elements can be arranged between the two Mach-Zehnder interferometers 20, and as with FIGS. 5A and 5B, it is preferable that a space is arranged between the Mach-Zehnder interferometer 20 and a substrate side portion. In this example, the $\pi/2$ shift adjustment unit 27 or the common optical coupler section 18 is arranged on the outside from a region between the outermost two lines L1 and L2 among a plurality of lines extending in the longitudinal direction of the phase modulation units 24 of each of four Mach-Zehnder interferometers 20, specifically, in a region between the line L2 and the side 11d. Then, length equalization units 19b and 19c are disposed on one or both of the waveguides 19.

Figure 18A:
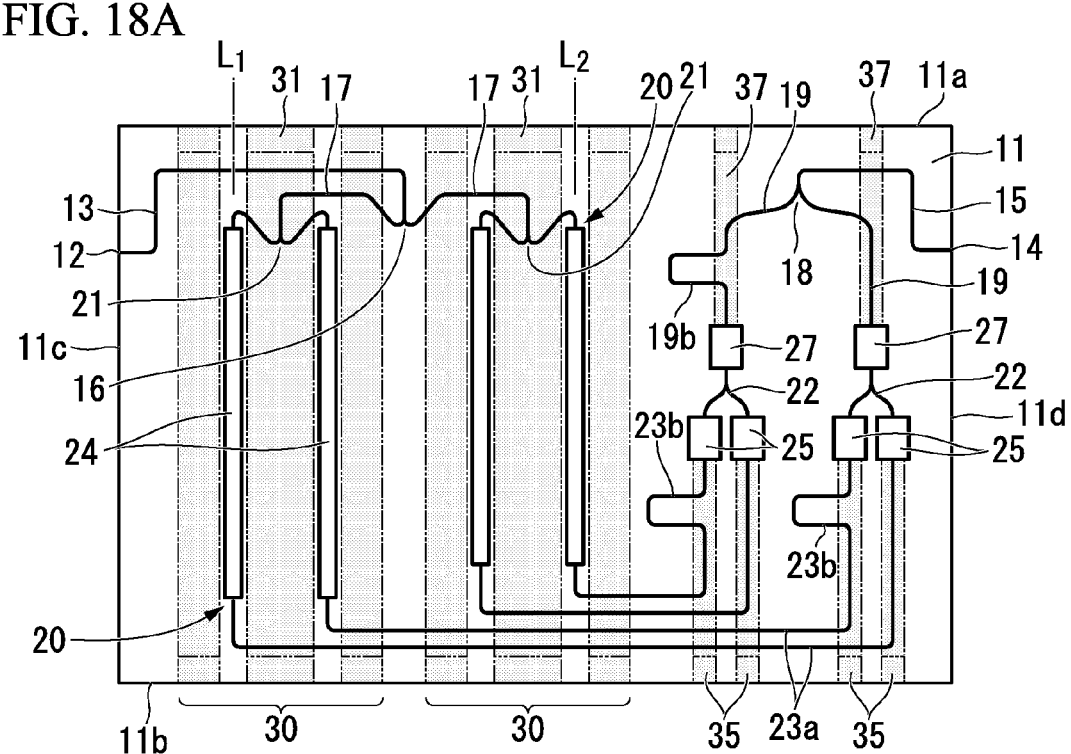
FIG. 18A is a plan view illustrating a second example of the optical modulator for QPSK.
Figure 18B:
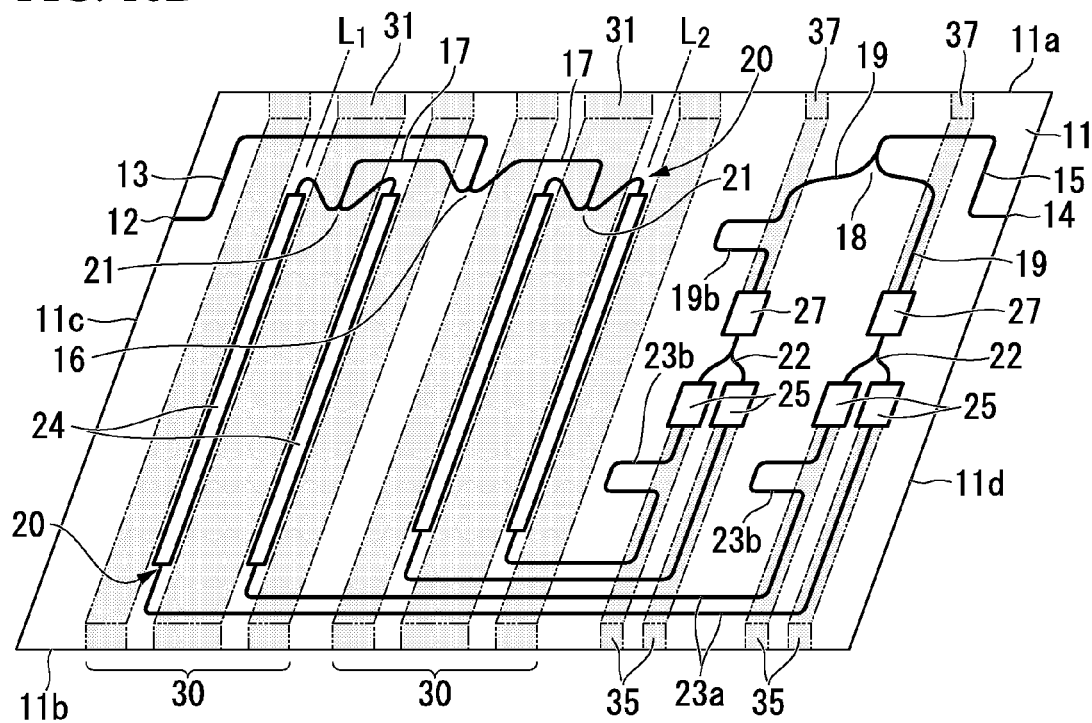
FIG. 18B is a plan view illustrating a second example of the optical modulator for QPSK of the modification example.

In FIGS. 18A and 18B, the waveguide 23a between the phase modulation unit 24 and the optical coupler section 22 of each of the Mach-Zehnder interferometers 20 is drawn out to the side. In addition, a length equalization unit 23b is also disposed on the waveguide 23a. An electrode 37 for supplying power to the $\pi/2$ shift adjustment unit 27 on the waveguide 19 is arranged towards the side 11a, and an electrode 35 for supplying power to the phase adjustment unit 25 on the waveguide 23a is arranged towards the side 11b. In addition, the electrode for supplying power 37 may be disposed on the side 11b, as with the electrode 35.

In this case, the power supply is performed on one side of the side 11b, and even in the package arranged on the outside, the electrode is easily drawn out only to the one side. In addition, even when both of the electrodes 35 and 37 are arranged on the side 11a, the same effect is obtained. In FIGS. 18A and 18B, in contrast to FIGS. 17A and 17B, the phase adjustment unit 25 is disposed on each of the arms of the Mach-Zehnder interferometer 20. Accordingly, for example, it is possible to adjust a difference between the respective arms of the Mach-Zehnder interferometers which occurs at the time of the manufacturing.

The optical modulator for QPSK described herein is one of formats which can be modulated by the modulator of this embodiment. In general, the modulator of the present invention applies a suitable electrical signal to the two Mach-Zehnder interferometers, and thus it is possible to perform arbitrary amplitude and phase modulation. For example, an intensity change occurs in the electrical signal of the input, and thus the modulator of the present invention can be used in 16QAM modulation and 64QAM modulation.

(Optical Modulator for DP-QPSK)

Figure 19A:
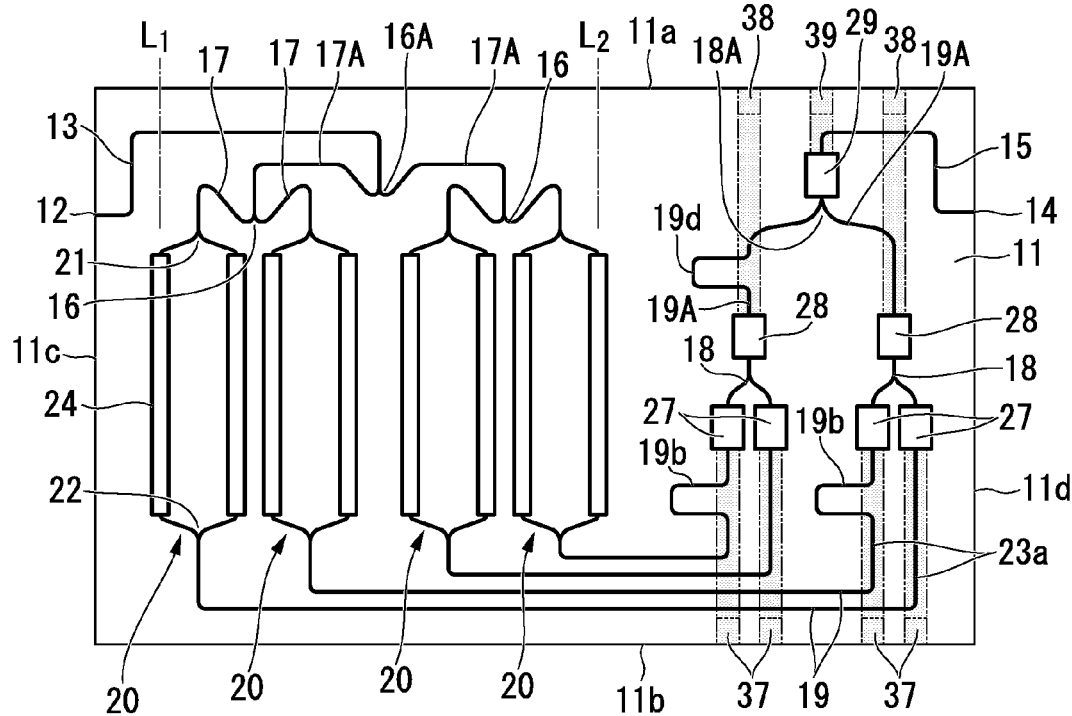
FIG. 19A is a plan view of a configuration example of an optical modulator for DP-QPSK.
Figure 19B:
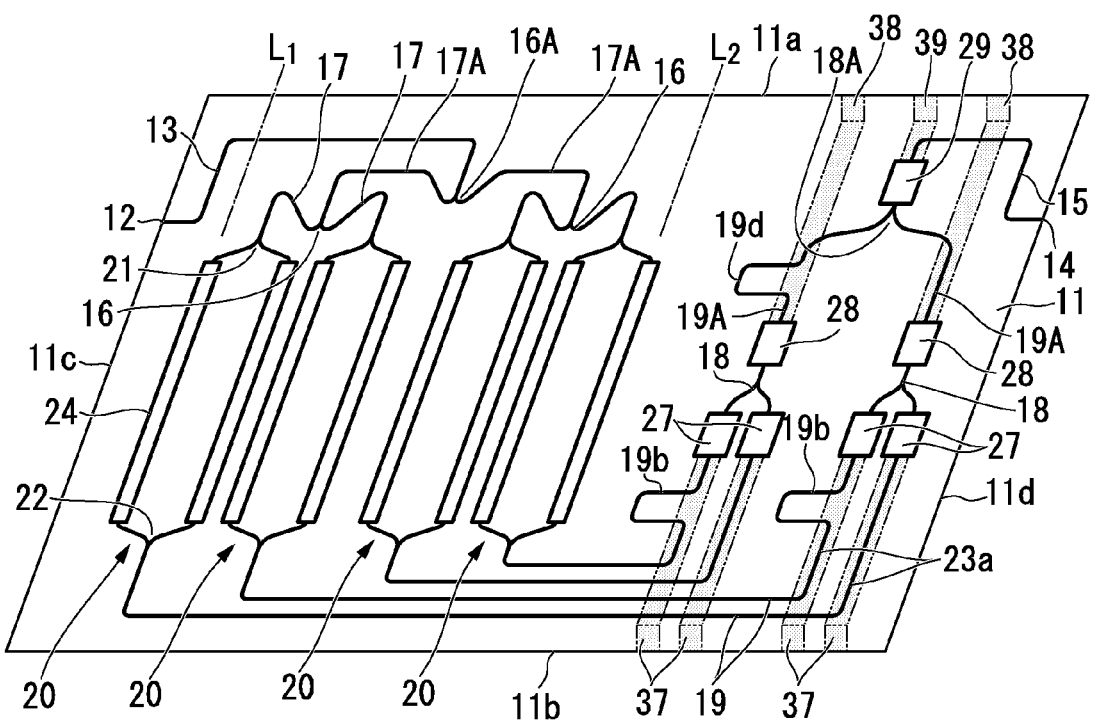
FIG. 19B is a plan view illustrating a configuration example of an optical modulator for DP-QPSK of a modification example.

As illustrated in FIGS. 19A and 19B, two optical modulators for QPSK are combined, and thus it is possible to configure a Dual polarization (DP)-optical modulator for QPSK. In FIGS. 19A and 19B, the traveling-wave electrode disposed on the Mach-Zehnder interferometer (MZI) 20 is not illustrated. In FIG. 19A, the longitudinal direction of the phase modulation unit 24 is perpendicular to the two sides 11a and 11b, but in FIG. 19B, the longitudinal direction of the phase modulation unit 24 is inclined with respect to the two sides 11a and 11b.

The light propagating the optical waveguide is generally represented as superposition of a plurality of modes, and in a case of a single mode, the light propagating the waveguide is formed of only one mode. However, when the size in a height direction is close to the size in the width direction on the sectional surface of the waveguide, in general, there are two modes of a mode where a main electric field is in the width direction (here, conveniently referred to as a "TE mode") and a mode where the main electric field is in the height direction (here, conveniently referred to as a "TM mode").

As described above, the optical modulator for QPSK includes the two MZIs 20, the optical splitter section 16 branching the incident light into the two MZIs 20, the optical coupler section 18 combining the light launched from each of the MZIs 20, and the $\pi/2$ shift adjustment unit 27 arranged on a previous stage of the optical coupler section 18.

The optical modulator for DP-QPSK includes an optical splitter section 16A shared by the two optical modulators for QPSK, two optical waveguides 17A connecting the optical splitter section 16A to the optical splitter section 16 of each of the optical modulators for QPSK, an optical coupler section 18A shared by the two optical modulators for QPSK, and two optical waveguides 19A connecting the optical coupler section 18A to the optical coupler section 18 of each of the optical modulators for QPSK.

In the optical modulator for DP-QPSK, the fact that there are two modes of TE/TM in a normal waveguide is used, the light which is input as TE polarized light is branched to be changed to a QPSK signal, and then one polarized light ray is rotated to be TM polarized light, two polarized light rays are synthesized on the same waveguide by a polarized light synthesis unit (a combiner), and DP-QPSK modulation including a QPSK signal independent from both polarized waves of TE/TM is performed. The polarization rotation device 28 is disposed on the optical waveguide 19A on a subsequent stage of the optical coupler section 18 of the optical modulator for QPSK. The polarized wave synthesize device 29 is formed by being integrated with the optical coupler section 18A of the optical modulator for DP-QPSK, and connects the light incident from the optical waveguide 19A to the optical waveguide 15 on the subsequent stage as two polarized wave states of TE and TM. In addition, in this embodiment, the position of the polarized wave synthesize device 29 is separated from the position of the polarization rotation device 28, and a polarization rotation synthesize device having an integrated function can be also disposed.

It is preferable that the same length equalization units 19b and 19d as that in described above are disposed on the optical waveguide 19 (the length equalization unit 19b) on the previous stage of the optical coupler section 18 of the optical modulator for QPSK, and the optical waveguide 19A (the length equalization unit 19d) on the previous stage of the optical coupler section 18A of the optical modulator for DP-QPSK.

In FIGS. 19A and 19B, the polarization rotation device 28 can be disposed on two places, and in general, the polarization rotation device 28 may be arranged on one side. It is preferable that two optical waveguides combined in the same light combining device have the same length. As the polarization rotation device 28 or the polarized wave synthesize device 29, a polarization rotation device or a polarized wave synthesize device disclosed in NPL 2 is included. Electrodes 38 and 39 for supplying power to the polarization rotation device 28 and the polarized wave synthesize device 29, or as with FIGS. 18A and 18B, the electrode 35 for supplying power to the phase adjustment unit 25 can be suitably arranged towards the side 11a or the side 11b, as necessary.

According to this embodiment, even in an optical modulator having a complicated configuration, an electrode portion can reach the phase modulation unit in the shortest amount of time. In addition, the electrical signal to the phase modulation unit can be input from the same direction of the device, and thus an input port of the high frequency signal of the package can be disposed in the same direction.

(PD Integration)

Figure 20A:
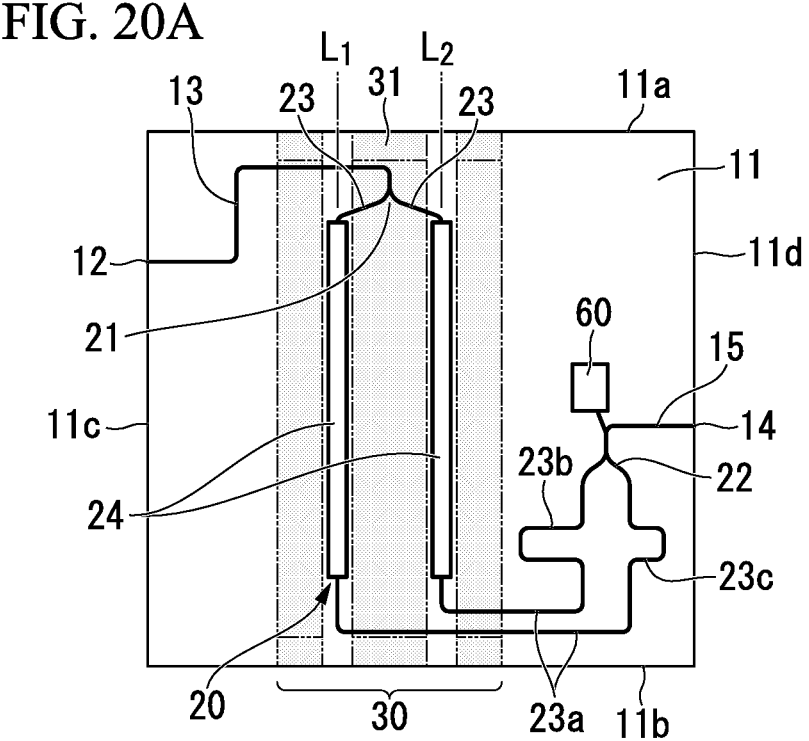
FIG. 20A is a plan view illustrating a configuration example in which PD is integrated.
Figure 20B:
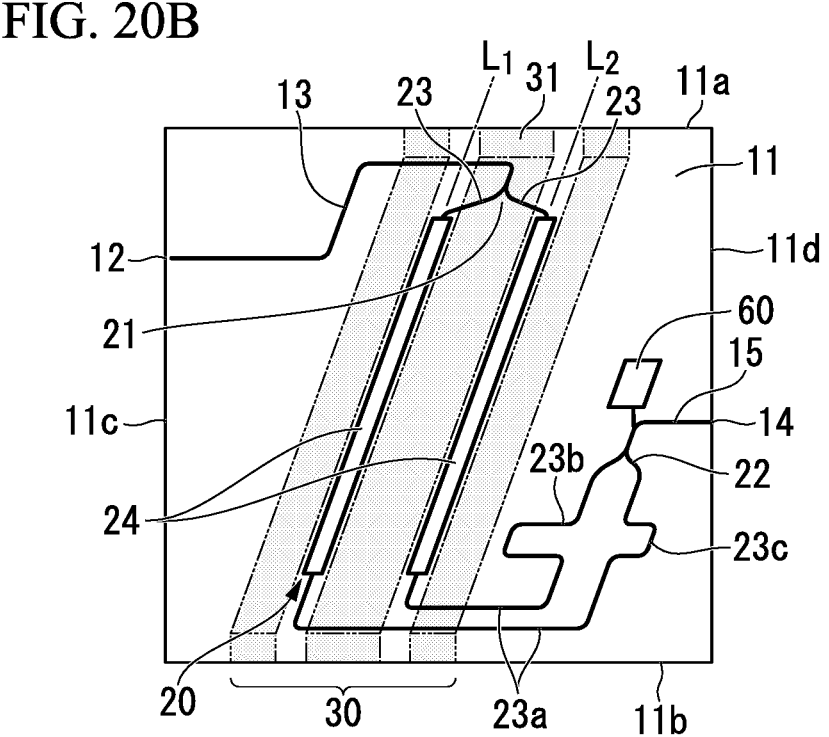
FIG. 20B is a plan view illustrating a configuration example in which PD of a modification example is integrated.

In FIGS. 20A and 20B, an embodiment is illustrated in which a photodiode (PD) is integrated. As disclosed in NPL 3, a PD 60 can be integrated on the silicon waveguide. In this embodiment, the PD 60 is arranged on the subsequent stage of the optical coupler section 22 on which the side portion (between the line L2 and the side 11d) is arranged. In FIG. 20A, the longitudinal direction of the phase modulation unit 24 is perpendicular to the two sides 11a and 11b, but in FIG. 20B, the longitudinal direction of the phase modulation unit 24 is inclined with respect to the two sides 11a and 11b.

(Example of Including Other Elements on Both Side Portions)

Figure 21A:
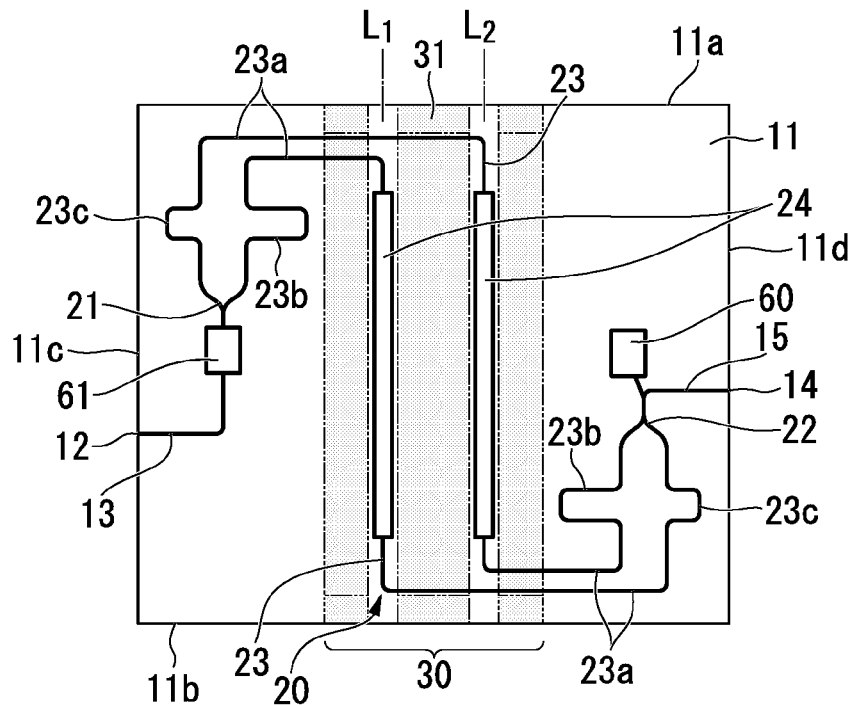
FIG. 21A is a plan view illustrating a configuration example in which a high-order mode removing unit and PD are integrated.
Figure 21B:
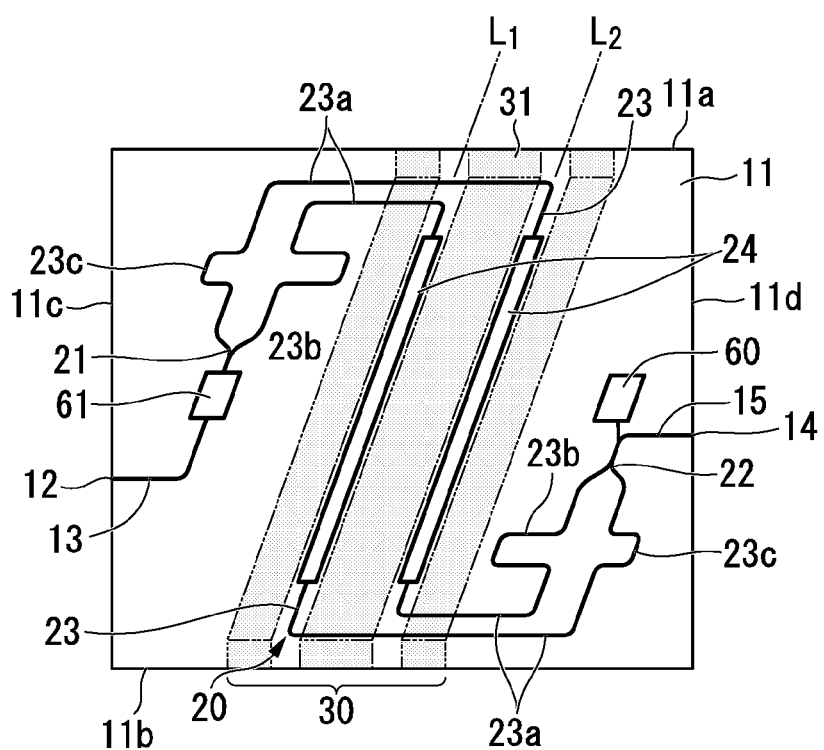
FIG. 21B is a plan view illustrating a configuration example in which a high-order mode removing unit and PD of a modification example are integrated.

In FIGS. 21A and 21B, a high-order mode removing unit 61 is disposed on the previous stage of the optical splitter section 21 on the side portion (between the line L1 and the side 11c) in the vicinity of the light incidence unit 12, and the PD 60 is arranged on the subsequent stage of the optical coupler section 22 which is arranged on the side portion (between the line L2 and the side 11d) in the vicinity of the light launching unit 14. Here, the high-order mode removing unit has a structure which can be applied to a case where this waveguide is designed as a multimode waveguide, and has a structure excluding an unnecessary high-order mode from the waveguide. For example, the high-order mode removing unit can be integrated on silicon.

The present invention is not limited thereto, and the phase adjustment unit 25 as illustrated in FIGS. 5A and 5B can be disposed before and after the Mach-Zehnder interferometer 20.

(Configuration Example in which Light Incidence Unit and Light Launching Unit are Arranged on Same Side)

Figure 22A:
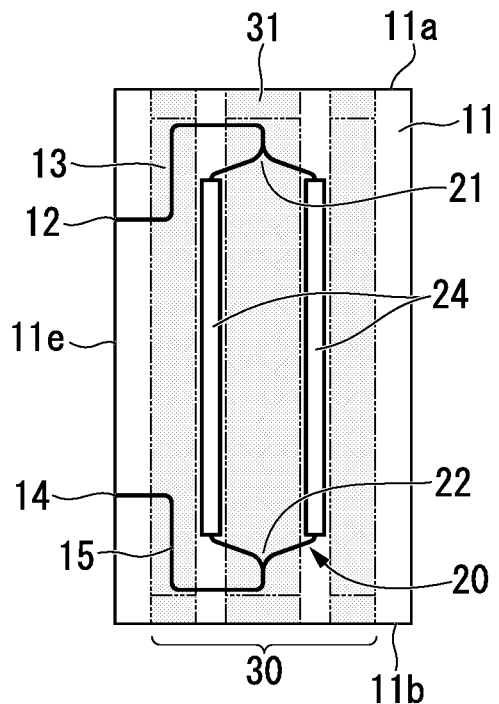
FIG. 22A is a plan view illustrating a configuration example in which a light incidence unit and a light launching unit are arranged on the same side.
Figure 22B:
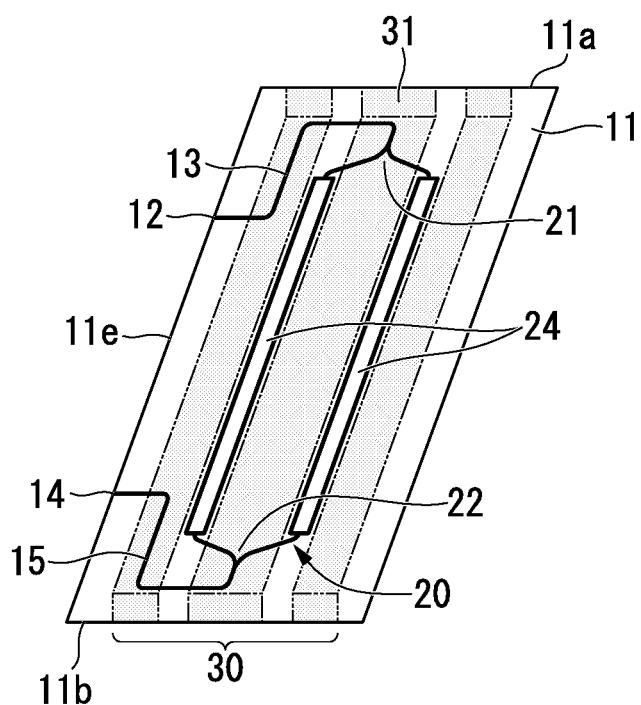
FIG. 22B is a plan view illustrating a configuration example in which a light incidence unit and a light launching unit of a modification example are arranged on the same side.

In the embodiments described thus far (for example, refer to FIG. 1A), each of the light incidence unit 12 and the light launching unit 14 is arranged on different sides 11c and 11d, and as illustrated in FIGS. 22A and 22B, the light incidence unit 12 and the light launching unit 14 can be arranged on the same side 11e. According to this arrangement, it is possible to simultaneously align the light incidence unit 12 and the light launching unit 14 by using a fiber array. Furthermore, in FIG. 22A, the longitudinal direction of the phase modulation unit 24 is perpendicular to the two sides 11a and 11b, but in FIG. 22B, the longitudinal direction of the phase modulation unit 24 is inclined with respect to the two sides 11a and 11b.

(Configuration Example in which Light Incidence Unit and/or Light Launching Unit are Arranged on Substrate)

Figure 23A:
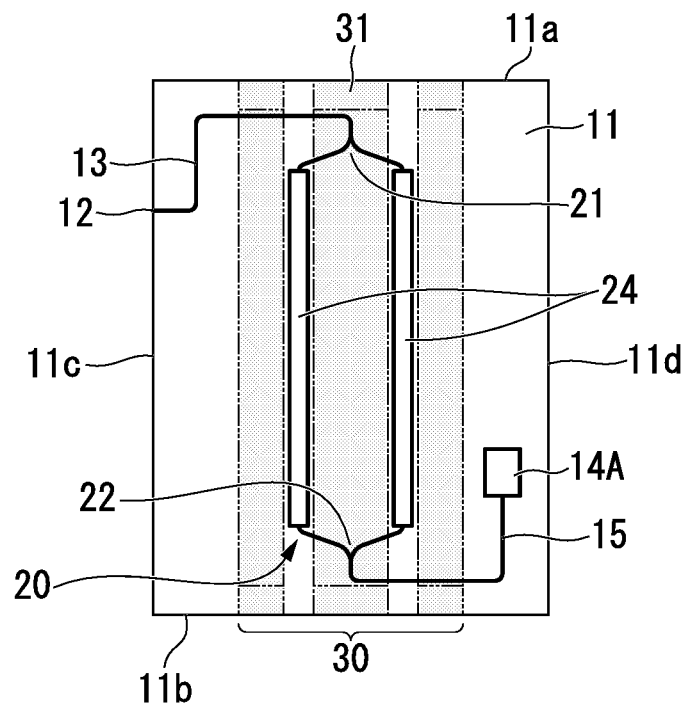
FIG. 23A is a plan view illustrating a configuration example in which the light launching unit is disposed on the substrate.
Figure 23B:
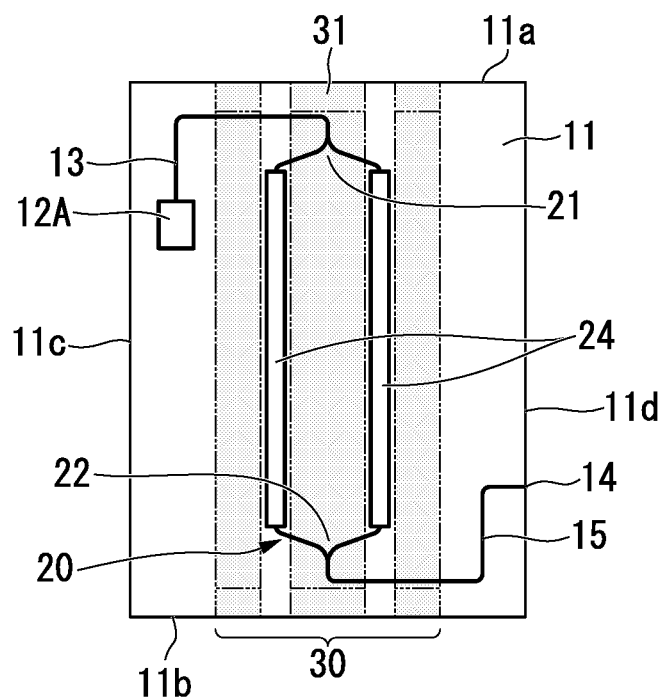
FIG. 23B is a plan view illustrating a configuration example in which the light incidence unit is disposed on the substrate.
Figure 23C:
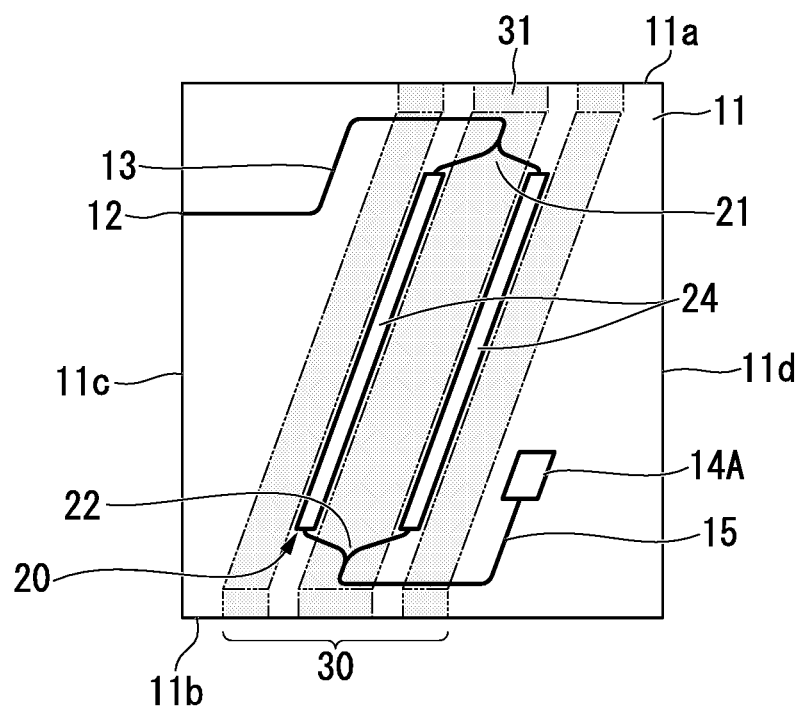
FIG. 23C is a plan view illustrating a configuration example in which the light launching unit of the modification example is disposed on the substrate.
Figure 23D:
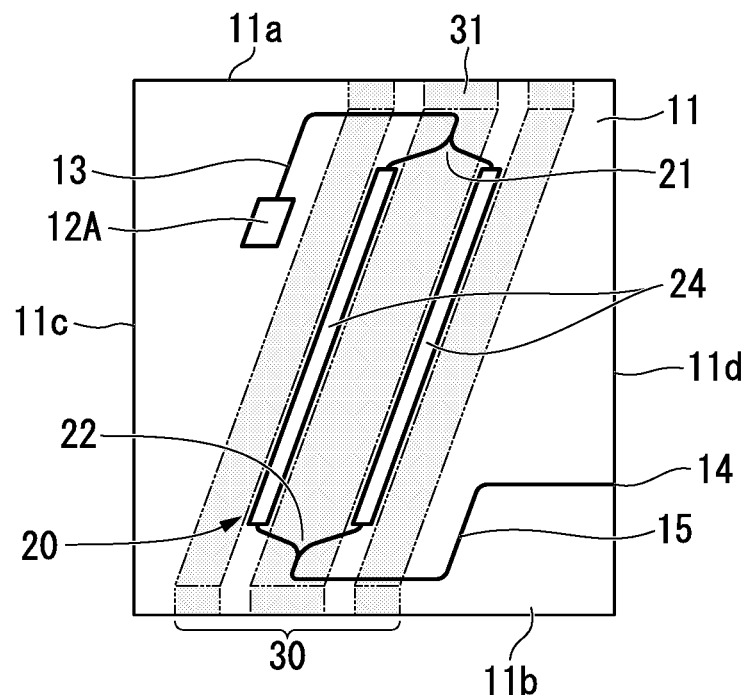
FIG. 23D is a plan view illustrating a configuration example in which the light incidence unit of the modification example is disposed on the substrate.

In the embodiments described thus far (for example, refer to FIG. 1A), each of the light incidence unit 12 and the light launching unit 14 is arranged on the end portion of the planar optical waveguide 11, and can be optically coupled to the optical fiber on the outside, and as illustrated in FIGS. 23A and 23C, a light launching unit 14A such as a light receiver can be disposed on the substrate, or as illustrated in FIGS. 23B and 23D, a light incidence unit 12A such as a light source can be disposed on the substrate. In FIGS. 23A and 23C, the light launching unit 14A is disposed between the traveling-wave electrode 30 and the side 11d on the side of the traveling-wave electrode 30, but is not in contact with the side 11d. In addition, In FIGS. 23B and 23D, the light incidence unit 12A is disposed between the traveling-wave electrode 30 and the side 11c on the side of the traveling-wave electrode 30, but is not in contact with the side 11c. Furthermore, in FIGS. 23A and 23B, the longitudinal direction of the phase modulation unit 24 is perpendicular to the two sides 11a and 11b, but in FIGS. 23C and 23D, the longitudinal direction of the phase modulation unit 24 is inclined with respect to the two sides 11a and 11b.

(Other Example of Including Plurality of Mach-Zehnder Interferometers)

Figure 24A:
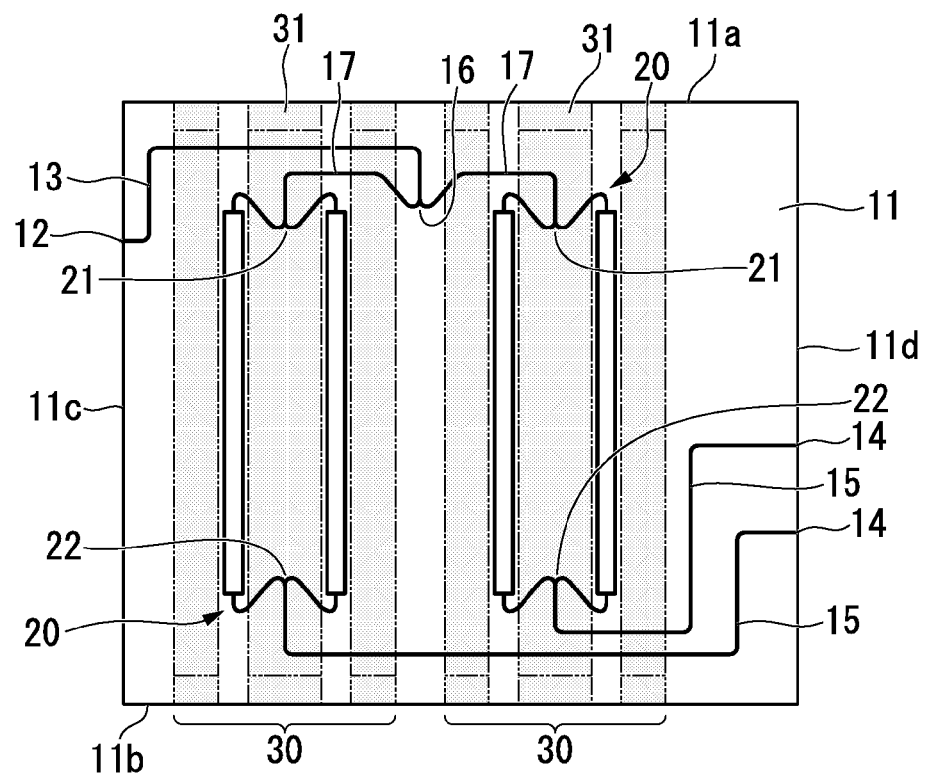
FIG. 24A is a plan view illustrating a configuration example in which two Mach-Zehnder interferometers are connected in parallel.
Figure 24B:
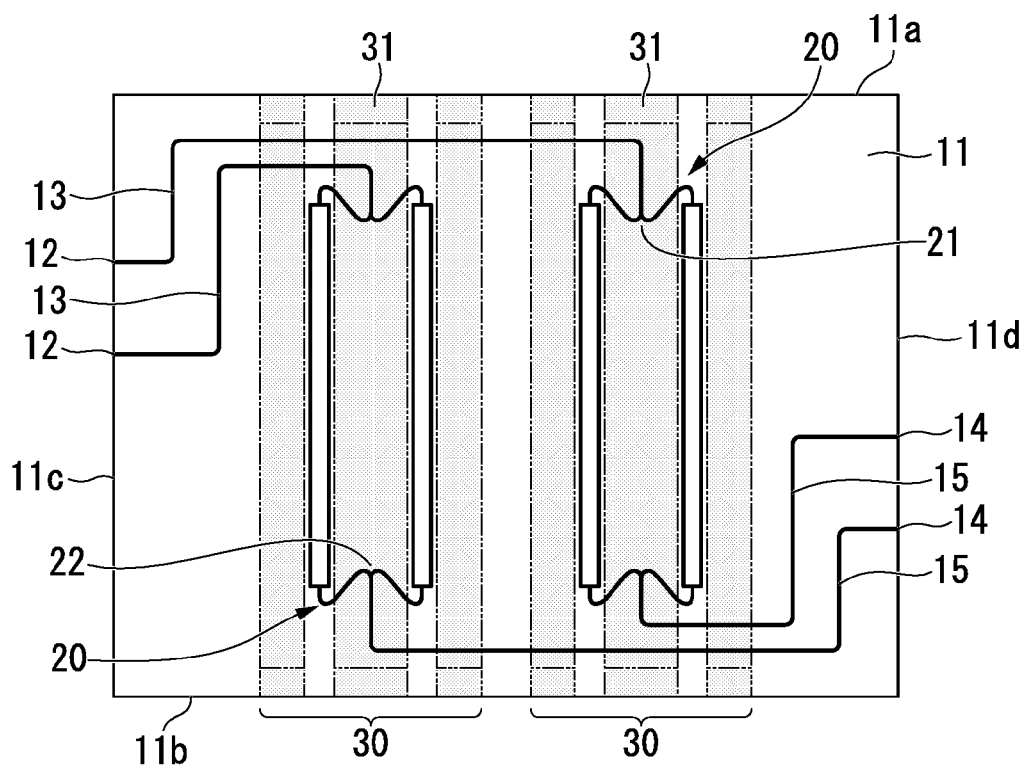
FIG. 24B is a plan view illustrating a configuration example in which the two Mach-Zehnder interferometers are independently disposed.
Figure 24C:
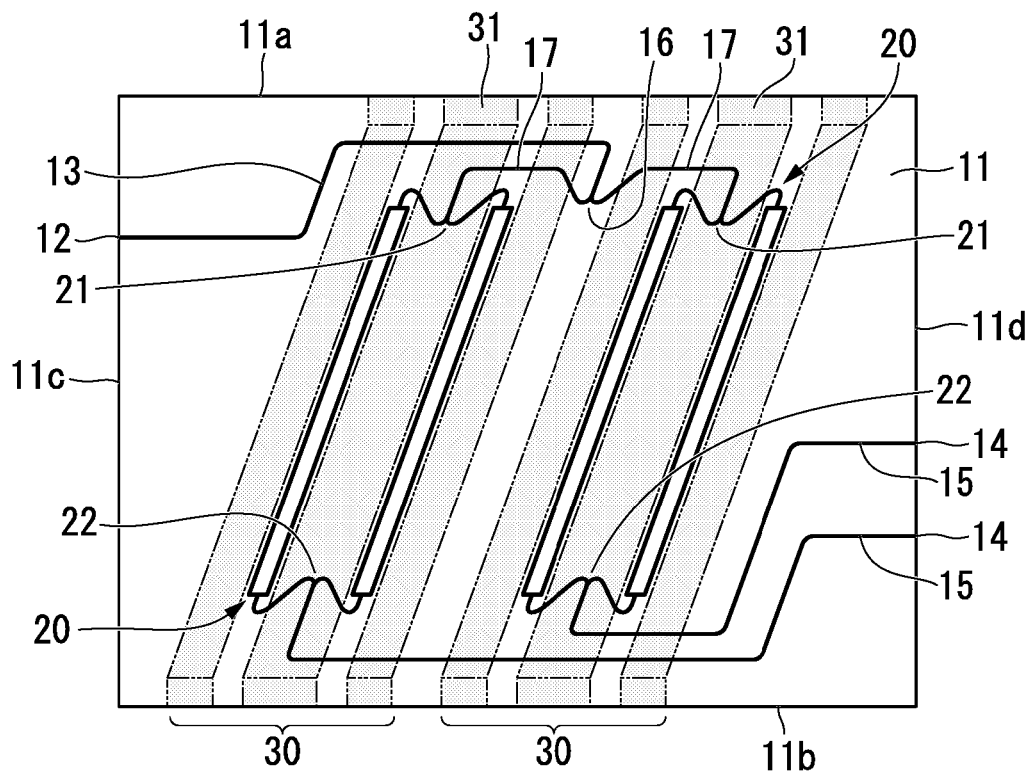
FIG. 24C is a plan view illustrating a configuration example in which two Mach-Zehnder interferometers of a modification example are connected in parallel.
Figure 24D:
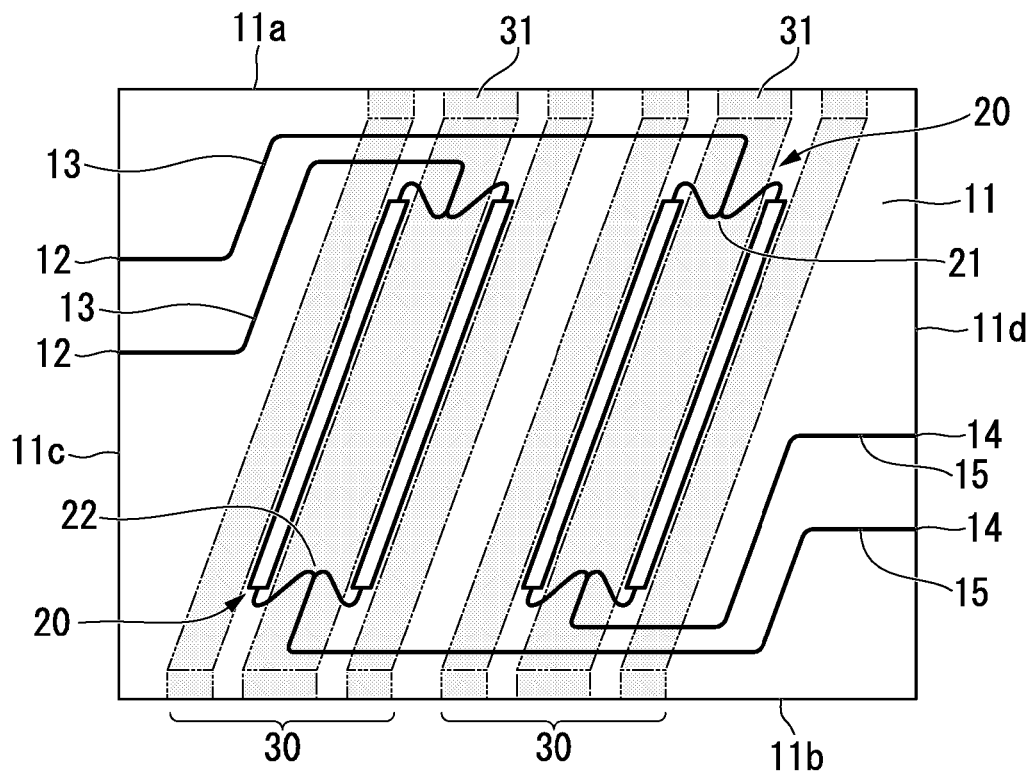
FIG. 24D is a plan view illustrating a configuration example in which the two Mach-Zehnder interferometers of the modification example are independently disposed.

As illustrated in FIGS. 24A and 24C, the two Mach-Zehnder interferometers 20 can be connected in parallel, or as illustrated in FIGS. 24B and 24D, the two Mach-Zehnder interferometers 20 can be independently disposed. In FIGS. 24A and 24B, the longitudinal direction of the phase modulation unit 24 is perpendicular to the two sides 11a and 11b, but in FIGS. 24C and 24D, the longitudinal direction of the phase modulation unit 24 is inclined with respect to the two sides 11a and 11b.

Furthermore, FIGS. 17A and 17B and FIGS. 18A and 17B also correspond to an example where the two Mach-Zehnder interferometers 20 are connected in parallel, and in FIGS. 24A and 24C, the waveguide 13 is branched into two waveguides 17 from one light incidence unit 12 by the common optical splitter section 16, and the two waveguides 17 are connected to the two Mach-Zehnder interferometers 20. In addition, the output of each of the Mach-Zehnder interferometers 20 is launched from the light launching unit 14 through the waveguide 15 without being combined. In FIGS. 24A and 24C, one light incidence unit and two light launching units are disposed on one substrate, and one light incidence unit and three or more light launching units may be disposed. In addition, various variations can be performed in which two light incidence units and one light launching unit are disposed, or three or more light incidence units and one light launching unit are disposed.

In FIGS. 24B and 24D, a plurality of light incidence units 12 and a plurality of light launching units 14 are respectively disposed on one planar optical waveguide 11. In addition, the Mach-Zehnder interferometer 20 is disposed between each of the light incidence units 12 and the light launching units 14, and a path reaching the light launching unit 14 from the light incidence unit 12 is independently arranged.

(Radius of Curvature of Silicon Waveguide)

According to NPL 4, the silicon waveguide can be bent up to a few μm without increasing an optical loss. Accordingly, a distance between electrode structures from the phase modulation unit depends on a radius of curvature, the length of the coupling unit, and a waveguide gap when a plurality of waveguides are in parallel.

For example, when the radius of curvature of the waveguide is 10 μm, it is possible to configure curvature without an excessive optical loss. In addition, for the sake of simplicity, the MMI 57 illustrated in FIGS. 10A and 10B is used in the optical splitter section or the optical coupler section, and the length necessary for the arrangement of MMI 57 is also 10 μm.

Figure 25A:
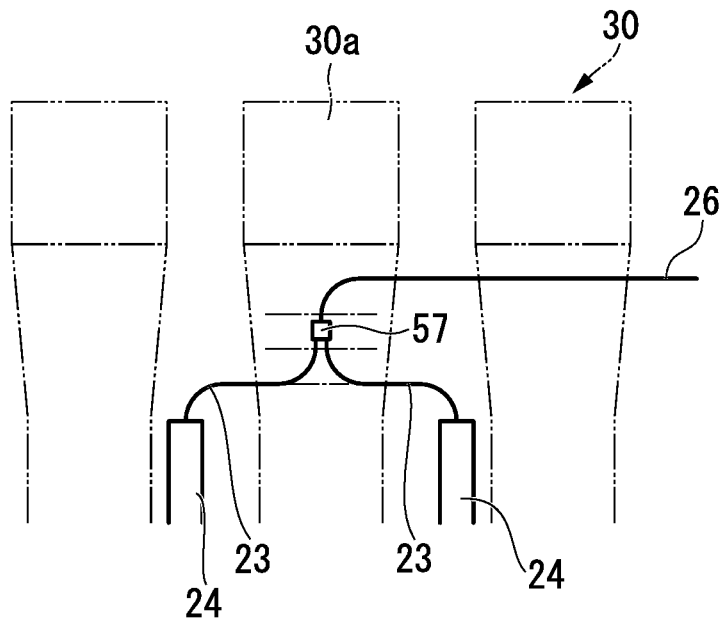
FIG. 25A is a first diagram illustrating a distance between an end portion of a phase modulation unit and a bonding connection portion.
Figure 25B:
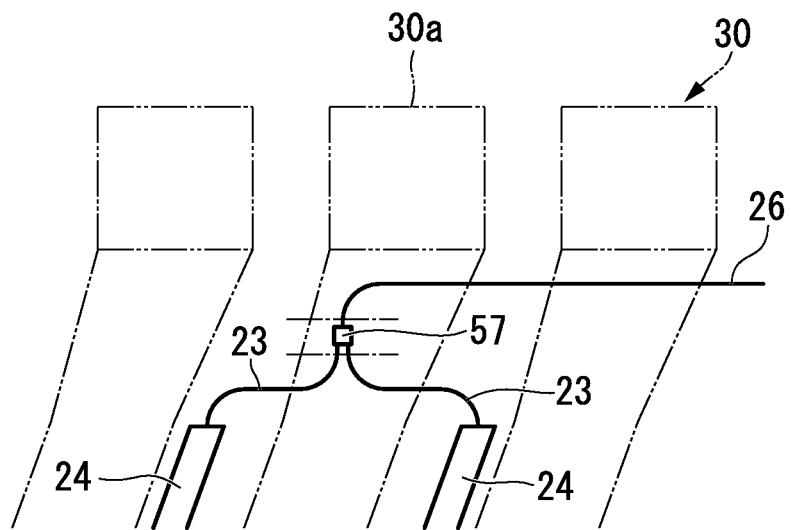
FIG. 25B is a first diagram illustrating a distance between an end portion of a phase modulation unit and a bonding connection portion of a modification example.

FIGS. 25A and 25B are formed of a pair of Mach-Zehnder interferometers 20 as in FIGS. 1A and 1B. In FIG. 25A, a distance of 10 μm is necessary for curvature of 90° from the phase modulation unit 24, a distance of 10 μm is necessary for curvature to the MMI 57, a distance of 10 μm is necessary for the MMI 57, a distance of 10 μm is necessary for a bent portion to the optical waveguide 26, and when a distance to the electrode pad 30a is 10 μm, it is possible to configure a distance between the phase modulation unit 24 and the electrode pad 30a to be 50 μm. In FIG. 25B, a distance of 10 μm is necessary for curvature around 90° from the phase modulation unit 24, a distance of 10 μm is necessary for curvature to the MMI 57, a distance of 10 μm is necessary for the MMI 57, a distance of 10 μm is necessary for the bent portion of the optical waveguide 26, and when a distance to the electrode pad 30a is 10 μm, it is possible to configure the distance between the phase modulation unit 24 and the electrode pad 30a to be 50 μm.

Figure 26A:
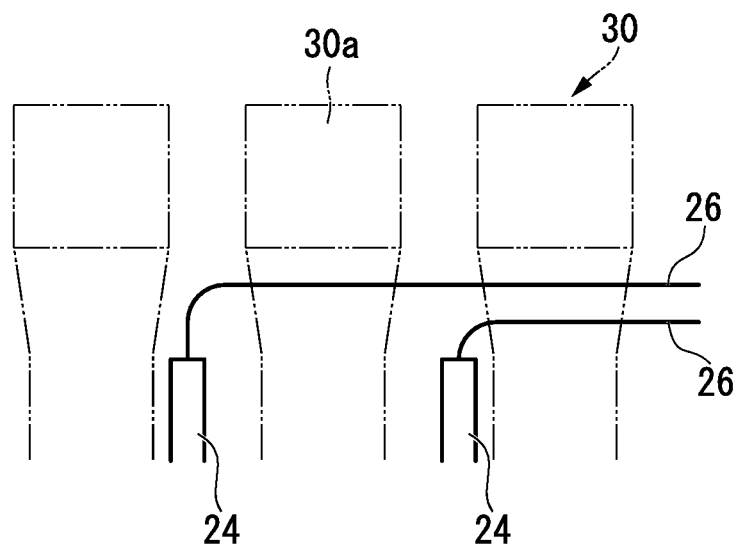
FIG. 26A is a second diagram illustrating the distance between the end portion of the phase modulation unit and the bonding connection portion.
Figure 26B:
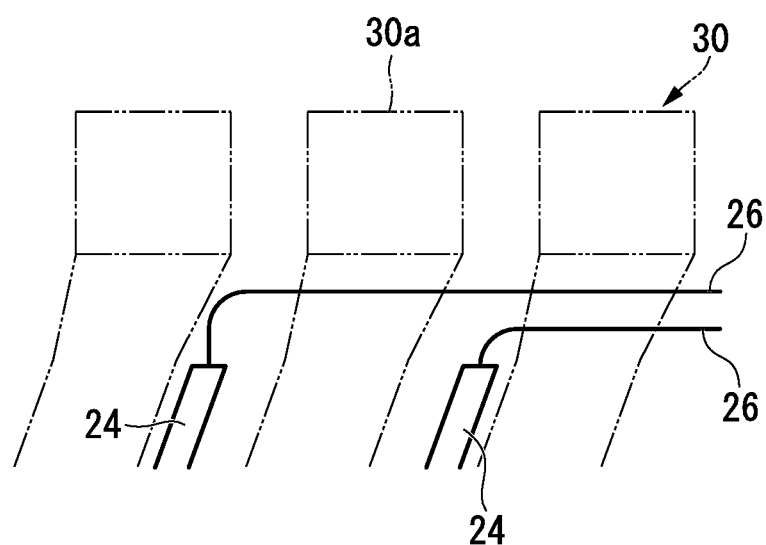
FIG. 26B is a second diagram illustrating the distance between the end portion of the phase modulation unit and the bonding connection portion of the modification example.

FIGS. 26A and 26B illustrate a case where the optical coupler section is arranged on the side portion as in FIGS. 5A and 5B. In this case, when the radius of curvature from the phase modulation unit 24 is 10 μm, a gap between two optical waveguides 26 is 10 μm, and a gap to the electrode pad 30a is 10 μm, it is possible to configure a gap between the phase modulation unit 24 and the electrode pad 30a to be 30 μm.

Figure 27A:
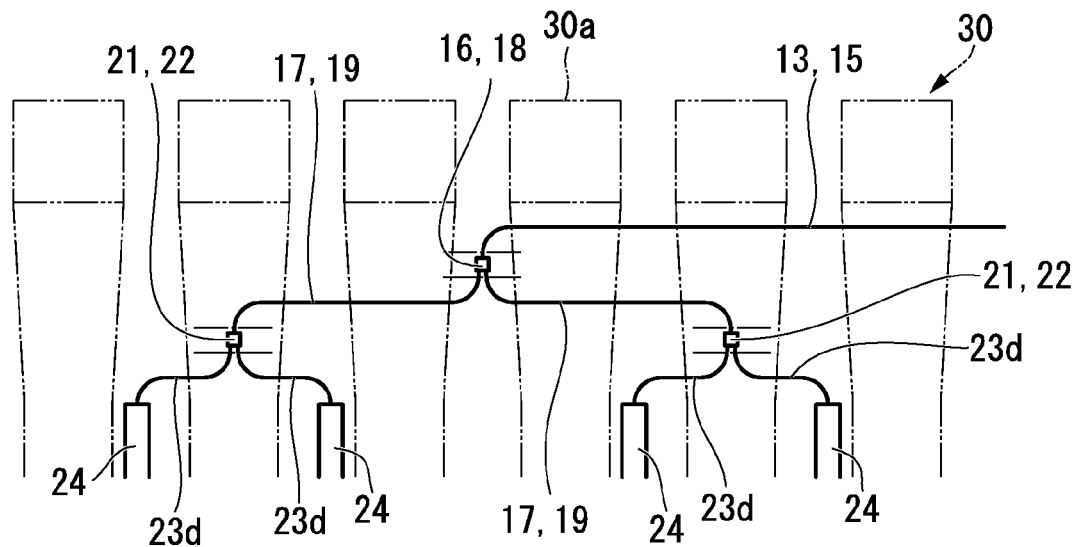
FIG. 27A is a third diagram illustrating the distance between the end portion of the phase modulation unit and the bonding connection portion.
Figure 27B:
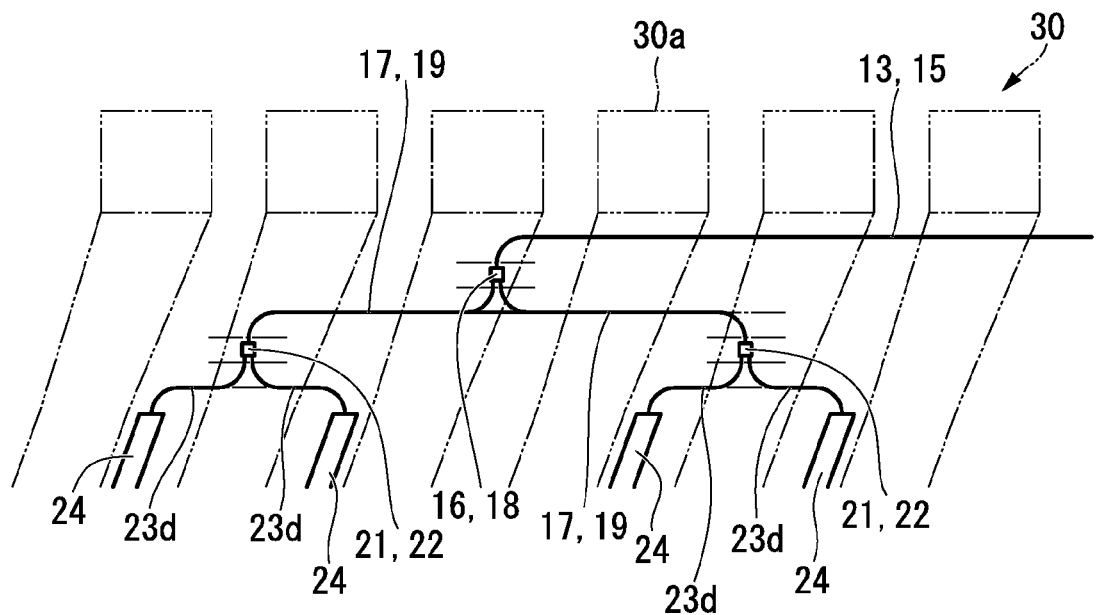
FIG. 27B is a third diagram illustrating the distance between the end portion of the phase modulation unit and the bonding connection portion of the modification example.

FIGS. 27A and 27B illustrate a case where two Mach-Zehnder interferometers 20 are combined as in FIGS. 17A and 17B, and FIGS. 24A and 24C. In FIG. 27A, as with FIG. 25A, when a distance to curvature connected to the phase modulation unit 24 is 10 μm, and after that, a distance to curvature of 90° through the optical splitter section 21 or the optical coupler section 22 is 30 μm, a distance to bend two optical waveguides 17 and 19 by combining in the optical splitter section 16 or the optical coupler section 18 is 30 μm, and a gap from the optical waveguides 13 and 15 to the electrode pad 30a is 10 μm, the gap between the phase modulation unit 24 and the electrode pad 30a can be configured to be 80 μm in total.

In FIG. 27B, as with FIG. 25B, when a distance to curvature connected to the phase modulation unit 24 is 10 μm, and after that, a distance to curvature around 90° through the optical splitter section 21 or the optical coupler section 22 is 30 μm, a distance to bend two optical waveguides 17 and 19 by combining in the optical splitter section 16 or the optical coupler section 18 is 30 μm, and a gap from the optical waveguides 13 and 15 to the electrode pad 30a is 10 μm, the gap between the phase modulation unit 24 and the electrode pad 30a can be configured to be 80 μm in total.

Figure 28A:
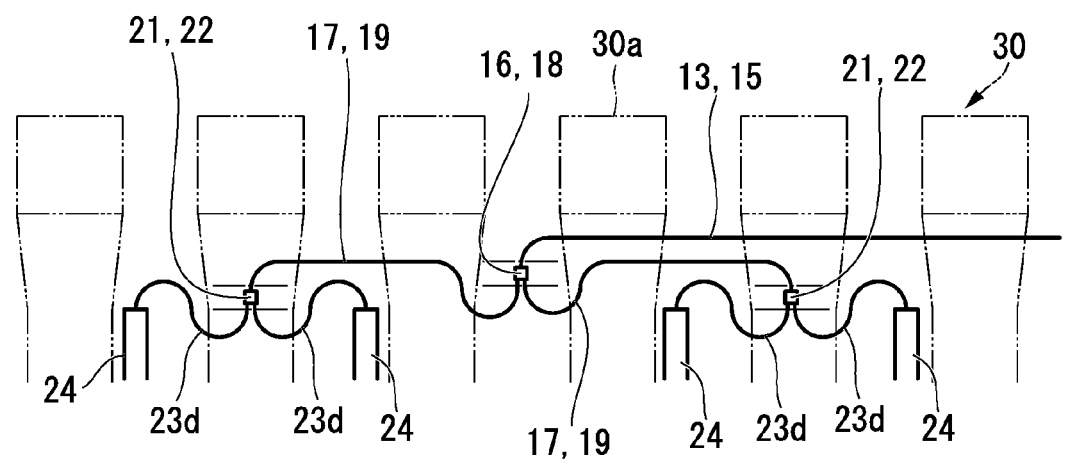
FIG. 28A is a fourth diagram illustrating the distance between the end portion of the phase modulation unit and the bonding connection portion.
Figure 28B:
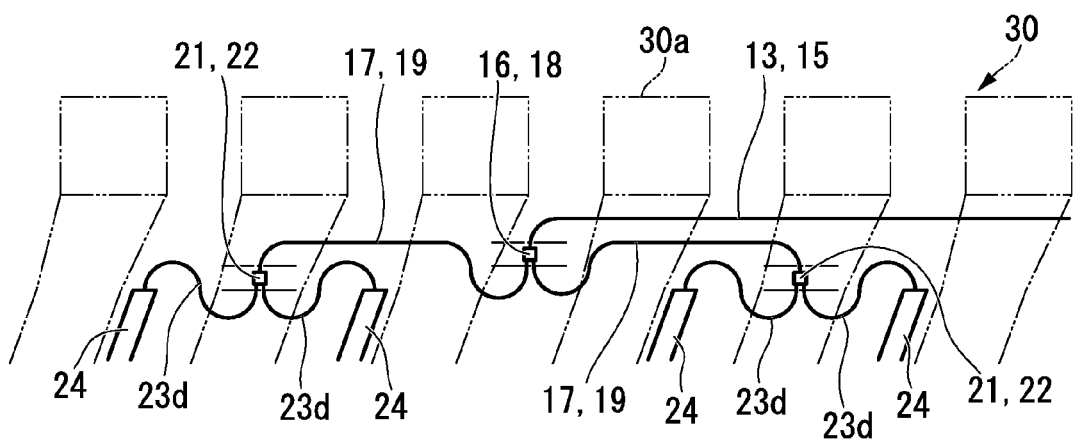
FIG. 28B is a fourth diagram illustrating the distance between the end portion of the phase modulation unit and the bonding connection portion of the modification example.

FIGS. 28A and 28B illustrate a case where the optical coupler section is arranged towards the inside of the phase modulation unit as in FIGS. 6A and 6B. As with FIGS. 27A and 27B, two Mach-Zehnder interferometers 20 are combined, and the gap between the phase modulation unit 24 and the electrode pad 30a can be 40 μm. In addition, when a case of including a pair of Mach-Zehnder interferometers 20 is examined as in FIGS. 1A to 1C, the gap between the phase modulation unit 24 and the electrode pad 30a can be 30 μm.

In FIG. 28A, the optical splitter section 21 or the optical coupler section 22 is shifted to a lower side by 20 μm, compared to FIG. 27A, and the position of 10 μm of the curvature of 90° from the optical splitter section 21 or the optical coupler section 22 and the position of 10 μm of the gap from the waveguide 23d to the waveguides 17 and 19 are arranged on either side. In addition, in FIG. 28B, the optical splitter section 21 and the optical coupler section 22 are shifted to the lower side by 20 μm, compared to FIG. 27B, and the position of 10 μm of the curvature around 90° from the optical splitter section 21 or the optical coupler section 22 and the position of 10 μm of the gap from the waveguide 23d to the waveguides 17 and 19 are arranged on either side.

For this reason, when a pair of Mach-Zehnder interferometers 20 is included, the distance is 30 μm which is shorter than the distance of 50 μm in FIGS. 25A and 25B by 20 μm. In addition, even when two Mach-Zehnder interferometers 20 are combined as in FIGS. 28A and 28B, the distance is 40 μm which is shorter than the distance of 80 μm in FIGS. 27A and 27B by twice 20 μm.

Furthermore, even when the position of optical splitter section 21 or the optical coupler section 22 is further shifted to the lower side (towards a space between the right and left phase modulation units 24), a distance of 10 μm is necessary for bending the waveguide 23d by 90° or around 90° from the end portion of the phase modulation unit 24, and the gap of 10 μm from the position to the waveguides 17 and 19 is necessary, and thus the same result is obtained.

Further, in FIG. 25A to 28B, the radius of curvature of 10 μm and the waveguide gap of 10 μm are an example which can be realized as described above, and the size is not limited thereto, and can be further narrowed.

In the example described above, the rectangular waveguide is described, but in the rib waveguide, an optical loss is reduced, and the radius of curvature increases, and for example, when the radius of curvature is doubled, a distance between the electrode pad and the phase modulation unit is less than or equal to double, and an electrode pad-phase modulation unit distance of approximately 100 μm to 200 μm can be realized.

Furthermore, in FIGS. 25B, 26B, 27B, and 28B, when the longitudinal direction of the phase modulation unit 24 is inclined with respect to the width direction of the chip (a horizontal direction of the drawing described above), for example, it is enough to form curvature of less than 90° from the phase modulation unit 24 on a left side of FIG. 25B, but it is necessary to form curvature of greater than 90° from the phase modulation unit 24 on a right side. In this case, it is preferable that the waveguide lengths of the two arm portions 23 are adjusted to be equalized between the optical splitter section 21 or the optical coupler section 22 and the phase modulation unit 24.

(Optical Modulation Device Module)

Figure 29:
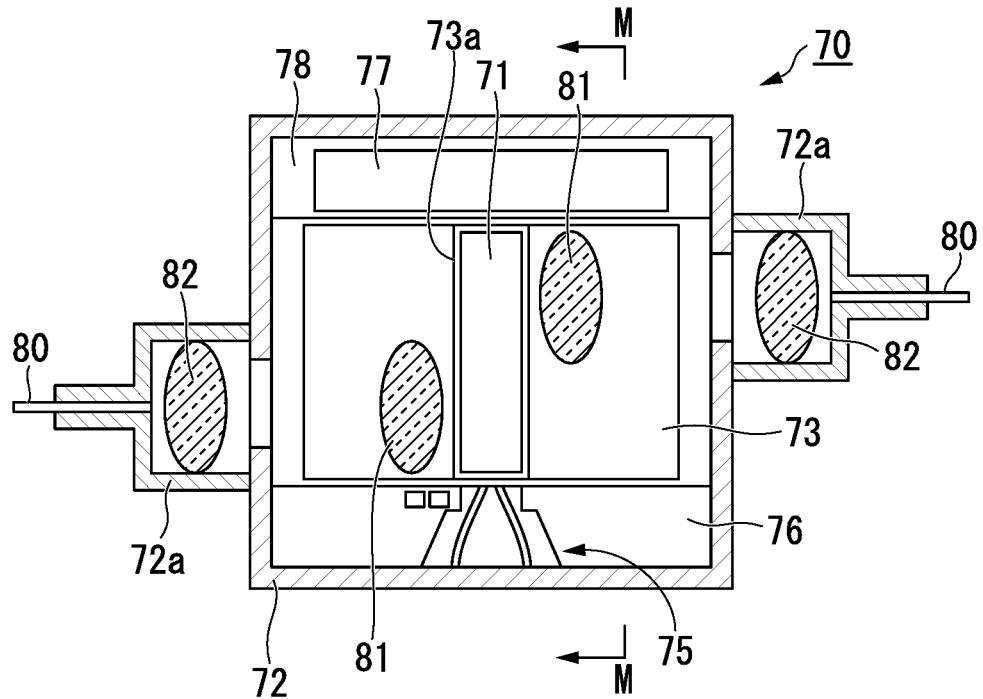
FIG. 29 is a sectional view when an example of an optical modulation device module is seen from an upper side.
Figure 30:
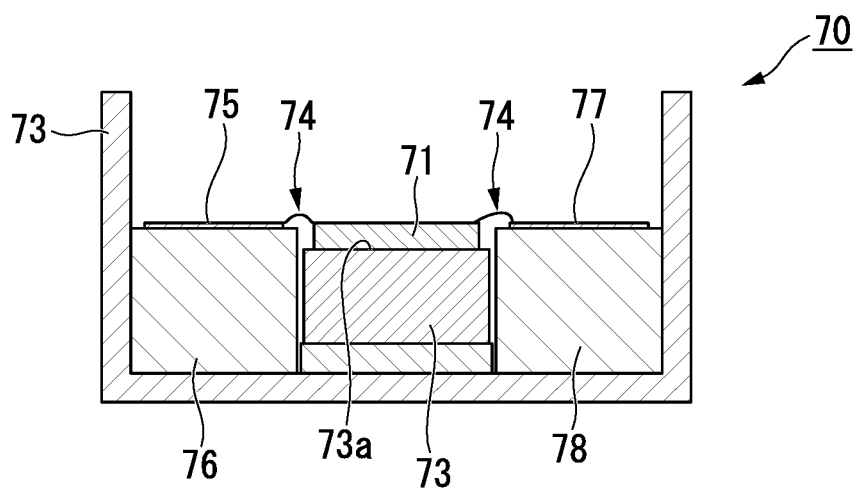
FIG. 30 is a sectional view when the optical modulation device module of FIG. 29 is seen from a side.

In FIG. 29 and FIG. 30, an embodiment of an optical modulation device module is illustrated. FIG. 30 is a sectional view taken along line M-M of FIG. 29. A lid covering an upper portion of a package (a housing) is not illustrated.

An optical modulation device module 70 contains an optical modulation device chip 71 in a package 72. The package 72, for example, is formed of an insulating body such as ceramic. The optical modulation device chip 71 is arranged on a center concave portion 73a of a chip carrier 73, and is fixed by soldering or the like. On both sides in a longitudinal direction of the chip carrier 73, a metallized pattern forming unit 76 which forms a metallized pattern 75, and a termination circuit arrangement unit 78 in which a termination circuit substrate 77 is arranged are disposed.

Figure 31:
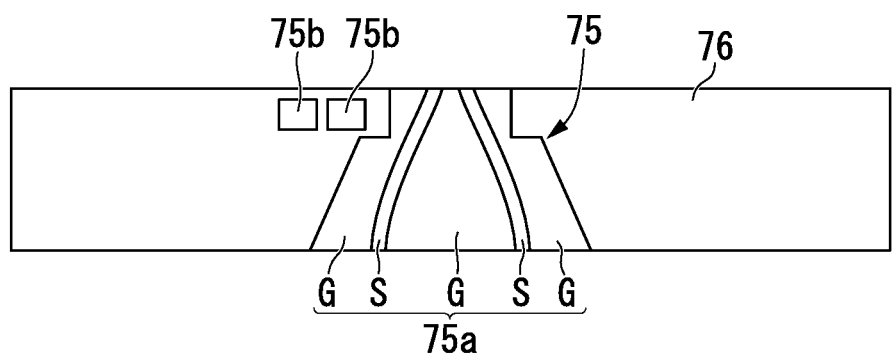
FIG. 31 is a plan view illustrating a metallized pattern of the optical modulation device module of FIG. 29.

As illustrated in FIG. 31, the metallized pattern 75 includes an electrode pattern of GSGSG as a stripline 75a. A metal configuring the electrode is not particularly limited, and for example, gold (Au) is used. The metallized pattern 75 is electrically connected to the input unit of the traveling-wave electrode of the optical modulation device chip 71 (refer to the input unit 31 in FIGS. 15A and 15B) by a wire 74 (refer to FIG. 30). In order to match a signal input line to a gap in a lead wire on the outside, as illustrated in FIG. 29, the signal input line has an inverse V-shaped pattern in which the line is narrowed on the optical modulation device chip 71 side, and is widened towards an end portion of the package 72. In addition, the signal input lines are right-left symmetric with respect to the center axis.

In addition, the metallized pattern 75 of FIG. 31 includes a pad 75b for performing input and output wiring with respect to a PD for a feedback operation, which is disposed on the inside of the optical modulation device chip 71 in the vicinity of the optical modulation device chip 71 on a left side of the stripline 75a.

The termination circuit substrate 77 fixes the termination circuit of 50Ω to be right-left symmetric with respect to a center axis by soldering or the like. The termination circuit substrate 77 is electrically connected to the output unit of the traveling-wave electrode of the optical modulation device chip 71 (refer to the output unit 32 in FIGS. 15A and 15B) by the wire 74 (refer to FIG. 30). The wire 74 is not particularly limited, and an Au wire is used. Five GSGSGs are each bonded to the input unit and the output unit.

As an optical coupling system, two lenses 81 and 82 are respectively disposed between the light incidence unit or the light launching unit and an optical fiber 80. A first lens 81 is fixed to a jig (not illustrated) on the chip carrier 73 by welding using a YAG laser, and is arranged on either side of the optical modulation device chip 71. A second lens 82 is connected to an outer wall portion 72a of the package 72 along with the optical fiber 80.

Figure 15B:
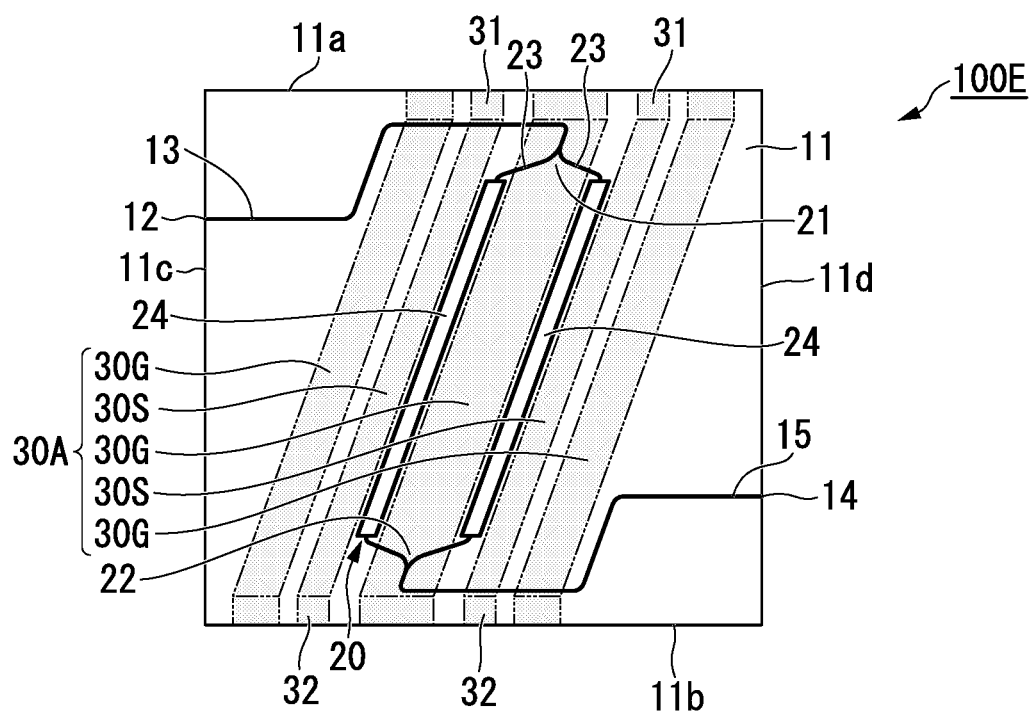
FIG. 15B is a plan view exemplifying the optical modulation device in which the electrode of the modification example has a GSGSG structure.

The light incidence unit or the light launching unit of the optical modulation device chip 71 (refer to the light incidence unit 12 and the light launching unit 14 in FIGS. 15A and 15B), the first lens 81, the second lens 82, and the optical fiber 80 are arranged on one line. The optical modulation device chip 71 is arranged on the center portion of the chip carrier 73 and the center portion of the package 72.

An example of the size is as follows. A horizontal size is the horizontal direction in FIG. 29, a vertical size is the vertical direction in FIG. 29, and the height is the vertical direction in FIG. 30.

The horizontal size of the package 72: 18.2 mm.
The vertical size of the package 72: 14.8 mm.
The height of the package 72: 6.7 mm.
The vertical size of the metallized pattern 75: 3 mm.
The vertical size of the chip carrier 73: 6 mm.
The vertical size of the termination circuit arrangement unit 78: 3 mm.
The gap in the lead wire: 1 mm.
A shortened surface of the optical modulation device chip 71: 1.4 mm.
An elongated surface of the optical modulation device chip 71: 4.9 mm.
A distance from a shortened surface end of the optical waveguide coupling unit (corresponding to a distance from the side 11a to the light incidence unit 12 and a distance from the side 11b to the light launching unit 14, in FIGS. 15A and 15B): respectively 1.55 mm.
A gap between the traveling-wave electrodes: 0.5 mm.
The diameter of the Au wire: 25 μm.
The diameter of the first lens: 2.5 mm.
The length of the jig for fixing the first lens 81: 5 mm.

(Structure of Inversely Tapered Portion)

Figure 32:
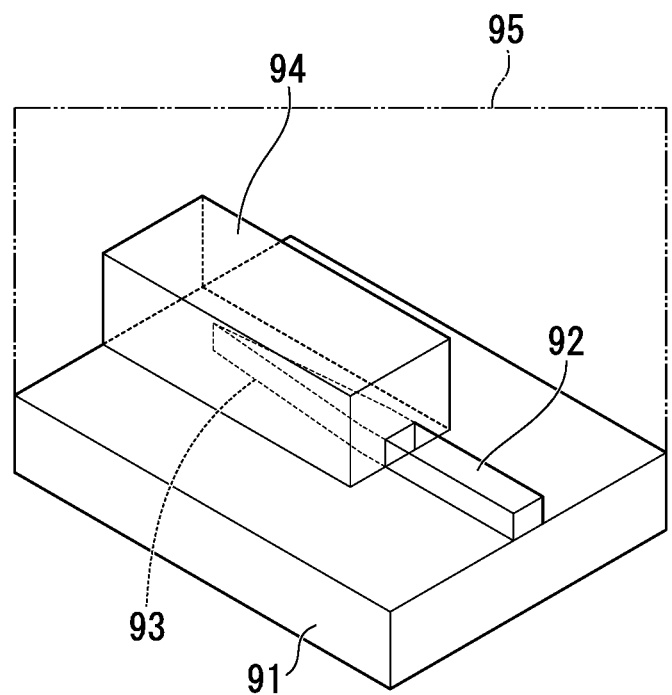
FIG. 32 is a perspective view illustrating an example of an inversely tapered waveguide.

As an inversely tapered portion structure used in a mode field converter (MFC), for example, a structure as illustrated in FIG. 32 (refer to FIG. 2 in NPL 4) is proposed and verified.

In FIG. 32, an external device such as an optical fiber is arranged on an inner left side of the drawing, and optical coupling can be efficiently realized towards a tapered tip end portion by using various modes.

For example, a rectangular waveguide 92 of a silicon core is arranged on a lower portion clad 91 of silica, and a tip end portion of the rectangular waveguide 92 is formed of an inversely tapered waveguide 93. The inversely tapered waveguide 93 is covered with a clad 94 such as a resin (a polymer). Further, an upper portion clad 95 is disposed on the rectangular waveguide 92 or the like.

(Thickness of Clad)

As described above, when the optical waveguides vertically intersect with each other through the lower portion of the electrode, an optical loss of the waveguide (hereinafter, referred to as a "waveguide loss") increases due to a metal used in the electrode. For this reason, it is preferable that a suitable gap is ensured between the electrode and the waveguide.

The thickness of the clad indicates a result of simulation. The waveguide loss due to the metal when the electrode is arranged on the upper portion of the optical waveguide is obtained by performing the simulation with respect to each of the rib waveguide and the rectangular waveguide.

Figure 33A:
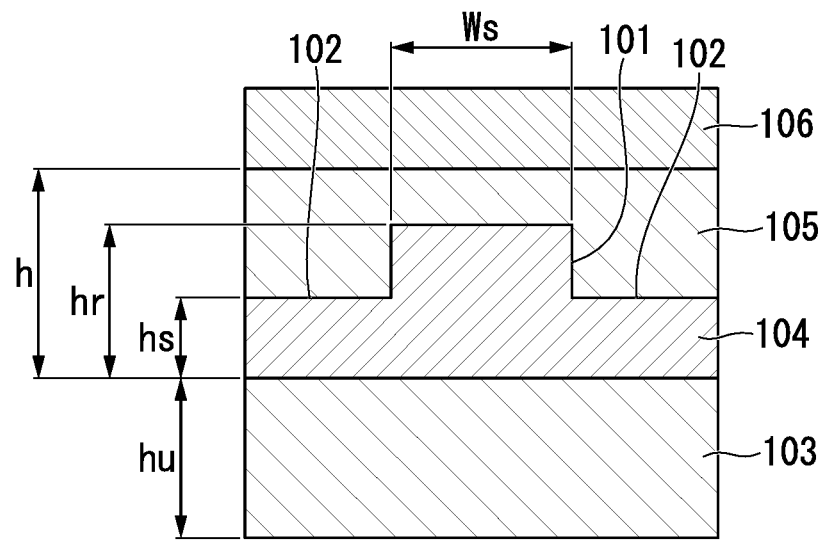
FIG. 33A is a sectional view illustrating a structure of a rib waveguide used in a simulation.
Figure 33B:
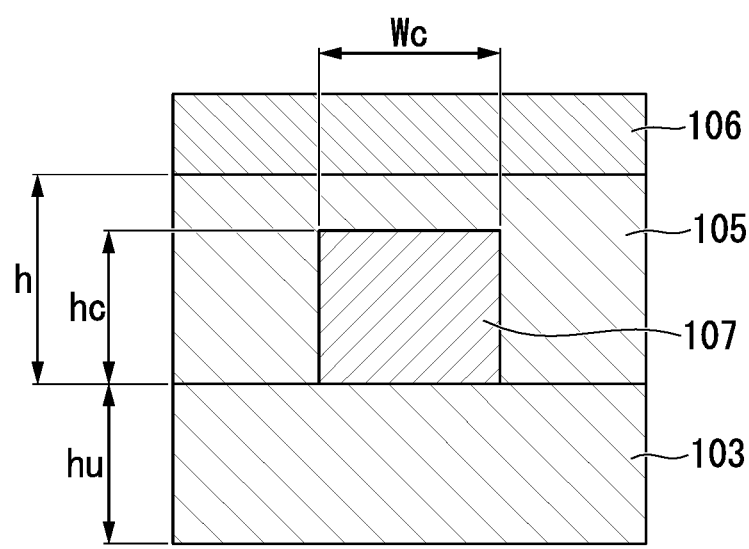
FIG. 33B is a sectional view illustrating a structure of a rectangular waveguide used in a simulation.

A model used in the simulation of the rib waveguide is a structure illustrated in FIG. 33A, a core 104 is formed of a rib portion 101 and slab portions 102 on both sides, a width $w_r$ of the rib portion 101 is 500 nm, a height $h_r$ of the rib portion 101 is 220 nm, a height $h_s$ of the slab portion 102 is 95 nm, a thickness $h_u$ of a lower clad 103 is 2 μm, and a height h from a lower surface of the core 104 to a lower surface of an electrode 106 is a variable. The rectangular waveguide has a structure illustrated in FIG. 33B, a width $w_c$ of a core 107 is 500 nm, a height $h_r$ of the core 107 is 220 nm, a thickness $h_u$ of the lower clad 103 is 2 μm, and a height h from a lower surface of the core 107 to the lower surface of the electrode 106 is variable. In this case, the height h corresponds to the thickness of an upper clad 105.

The material of the clads 103 and 105 is silica ($SiO_2$), the material of the cores 104 and 107 is silicon (Si), and the material of the electrode 106 is aluminum (Al).

Figure 34:
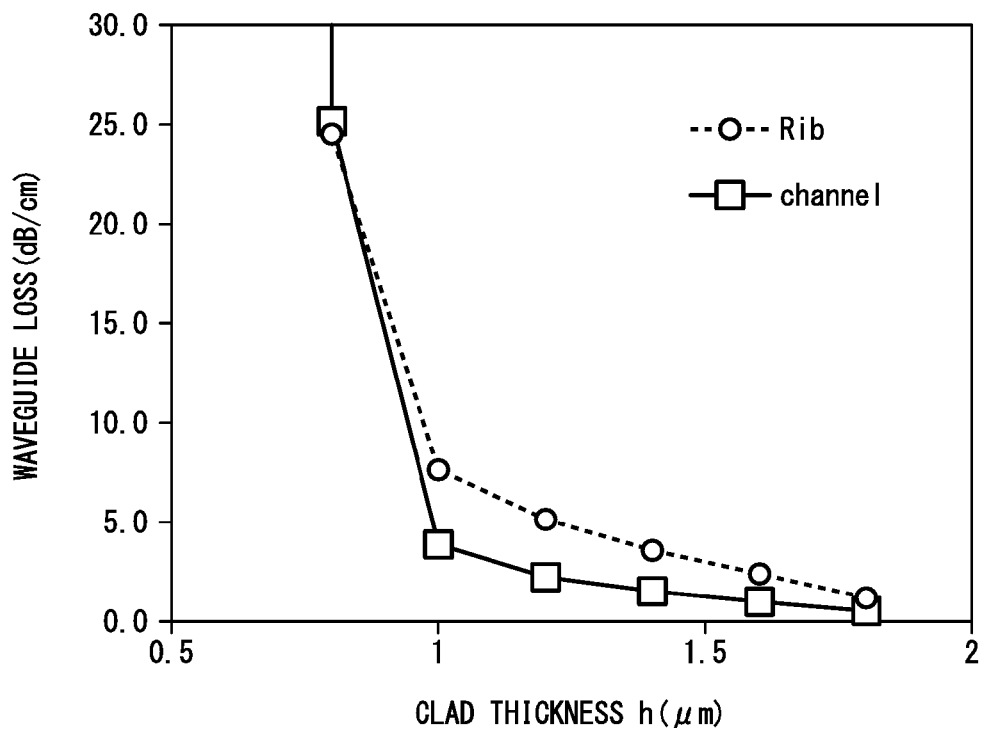
FIG. 34 is a graph illustrating an example of a relationship between a clad thickness and an optical loss of a waveguide.

In the simulation, it is assumed that the electrode 106 is also configured of silica as with the clads 103 and 105, and a ratio of light power in the region of the electrode 106 is obtained from guide modes obtained with respect to the silicon cores 104 and 107. Further, an effective optical loss due to the electrode 106 is calculated from a light extinction coefficient of aluminum. The obtained result is illustrated in FIG. 34.

According to the simulation result, an optical loss is rapidly reduced within h of 0.6 μm to 1.0 μm, and when h is greater than or equal to 1 μm, a waveguide loss with respect to the waveguide length is less than or equal to 10 dB/cm. It is assumed that the waveguide length positioned under the electrode is around 100 μm from the size of the electrode. From this, when a clad size is greater than or equal to 1 μm, an excessive optical loss (hereinafter, referred to as an "excessive loss") due to the fact that the optical waveguide passes under the electrode is less than or equal to 0.1 dB.

When it is considered that the optical loss of the silicon waveguide is approximately 1 dB/cm to 2 dB/cm, it is assumed that the entire length of the silicon waveguide is greater than or equal to 1 cm, and thus the excessive loss of approximately 0.1 dB is less than or equal to 1/10, and an influence thereof is sufficiently reduced.

Therefore, when the clad (the upper clad 105 in FIGS. 33A and 33B) formed of silica is disposed between the upper surface of the core of the planar optical waveguide and the traveling-wave electrode, it is preferable that the thickness of the clad (h in FIGS. 33A and 33B) is greater than or equal to 1 μm in a position where the core and the traveling-wave electrode vertically intersect with each other. In addition, it is preferable that the optical waveguide is a portion other than the phase modulation unit (the rib waveguide) in the position where the core and the traveling-wave electrode vertically intersect with each other, and it is preferable that the optical waveguide is a portion of the rectangular waveguide.

Figure 35:
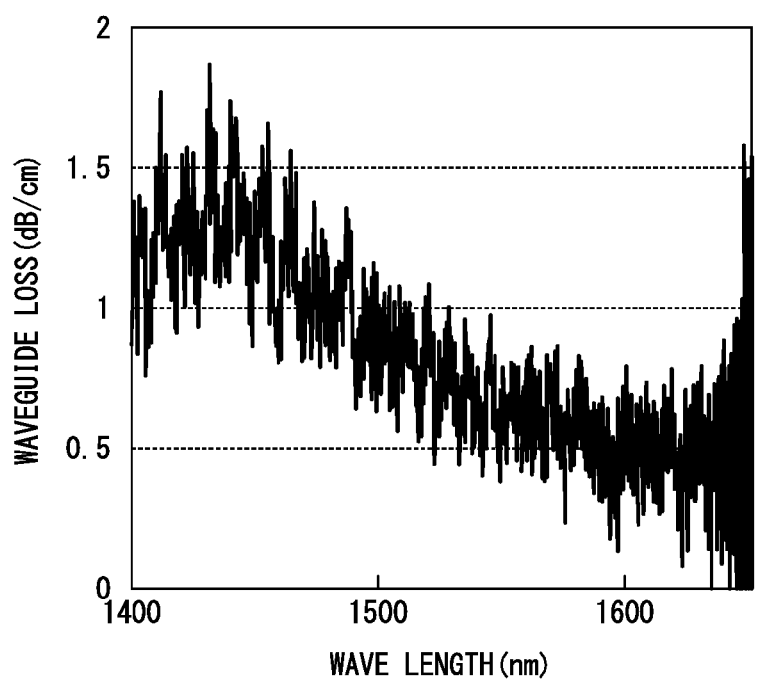
FIG. 35 is a graph illustrating an example of a measurement result of an excessive optical loss due to an electrode of the rectangular waveguide.

A measurement result of the excessive loss due to the electrode of the rectangular waveguide at the time of h is 1.2 μm is illustrated in FIG. 35. Here, the excessive loss due to the electrode indicates a difference which is obtained by subtracting an optical loss when the electrode is not on the upper portion of the rectangular waveguide from an optical loss when the electrode is on the upper portion of the rectangular waveguide.

An excessive loss (WGLoss in FIG. 35) at a communication wavelength of 1.55 μm is 0.5 dB/cm, and it is possible to configure an optical modulator in which attenuation of a high frequency signal in a high frequency electrode is suppressed while suppressing an influence (the excessive loss) due to the fact that the optical waveguide passes through the lower portion of the electrode.

As described above, the present invention is described on the basis of the preferred embodiments, but the present invention is not limited to the examples described above, and various modifications can be performed without departing from the gist of the present invention.

The characteristics described in each of the embodiments or the configuration examples can be arbitrarily combined unless it is technologically contradictory.

In FIGS. 4A, 4B, 5A, and 5B, the other element such as the phase adjustment unit 25 is inserted between the phase modulation unit 24 and the optical coupler section 22 in the arm portion 23. Similarly, the other element may be inserted between the phase modulation unit 24 and the optical splitter section 21. In addition, in the configuration of FIGS. 5A and 5B, the optical splitter section 21 may be positioned in a region on the outside (the region between the line L1 and the side 11c), and may be arranged in the vicinity of the light incidence unit 12.

In the second embodiment (FIGS. 3A and 3B), the fifth embodiment (FIGS. 6A and 6B), or the like, when the sides 11a and 11b are not in parallel with each other at the time of defining the two lines La and Lb, it is possible to define the lines La and Lb, independently. For example, the line La extending from the end portion 24a of the phase modulation unit 24 on the optical splitter section 21 side can be in parallel with the side 11a on which the input unit 31 is arranged, and the line Lb extending from the end portion 24b of the phase modulation unit 24 on the optical coupler section 22 side can be in parallel with the side 11b on which the output unit 32 is arranged.

What is claimed is:
1. An optical modulation device, comprising:
    a planar optical waveguide;
    a light incidence unit which allows light to be incident on the planar optical waveguide;
    a Mach-Zehnder interferometer which comprises a first optical splitter section branching the light incident on the light incidence unit, two arm portions guiding the light branched by the first optical splitter section, a phase modulator comprising a first phase modulation unit linearly disposed on a first one of the two arm portions and a second phase modulation unit disposed on a second one of the two arm portions, and a first optical coupler section combining the light guided from the two arm portions;
    a light launching unit which launches the light combined by the first optical coupler section from the planar optical waveguide;
    a traveling-wave electrode which comprises an input unit and an output unit, and applies a voltage to the phase modulator; and
    a groove portion which is configured to fix an optical fiber,
    wherein the planar optical waveguide has an outline comprising a first side and a second side, wherein each of the first side and the second side intersect with an extended line extending in a longitudinal direction of the phase modulator in a plan view,
    the input unit is formed on one of the first side and the second side,
    the light incidence unit and the light launching unit are positioned in a region different from a region in which the traveling-wave electrode is formed in a plan view, and
    a first end of the groove portion is formed on the outline, and at least one of the light incidence unit and the light launching unit is formed on a second end of the groove portion.
2. The optical modulation device according to claim 1,
    at least one of the light incidence unit and the light launching unit is arranged on a same side, of the first side and the second side, on which the output unit is arranged.

3. The optical modulation device according to claim 2, the light launching unit is arranged on the same side, of the first side and the second side, on which the output unit is arranged.

4. The optical modulation device according to claim 1, wherein an optical waveguide configuring the phase modulator comprises a rib waveguide comprising a rib portion, and a pair of slab portions respectively connected to both sides of the rib portion,
a rectangular waveguide is connected to at least one end of the rib waveguide, and
a transition region in which a width between the pair of slab portions is continuously changed to be optically coupled to the rectangular waveguide, is included in a connection portion between the rib waveguide and the rectangular waveguide.

5. The optical modulation device according to claim 1, wherein a distance between the first phase modulation unit and the first side is identical to a distance between the second phase modulation unit and the first side, and
a distance between the first phase modulation unit and the second side is identical to a distance between the second phase modulation unit and the second side, and
the light incidence unit and the light launching unit are positioned in a region between a first line and a second line, wherein:
the first line is parallel with the first side and the second side and intersects a first end portion of the first phase modulation unit of the Mach-Zehnder interferometer and a first end portion of the second phase modulation unit of the Mach-Zehnder interferometer, and
the second line is parallel with the first side and the second side and intersects a second end portion of the first phase modulation unit of the Mach-Zehnder interferometer and a second end portion of the second phase modulation unit of the Mach-Zehnder interferometer.

6. The optical modulation device according to claim 1, wherein the longitudinal direction of the phase modulator has an inclination at an angle of greater than 0° and less than 90° with respect to each of the two sides, and
a distance between the first phase modulation unit and the first side is identical to a distance between the second phase modulation unit and the first side, and a distance between the first phase modulation unit and the second side is identical to a distance between the second phase modulation unit and the second side.

7. The optical modulation device according to claim 1, wherein the longitudinal direction of the phase modulator is perpendicular to the two sides.

8. The optical modulation device according to claim 1, wherein the longitudinal direction of the phase modulator has an inclination at an angle of greater than 0° and less than 90° with respect to each of the two sides.

9. The optical modulation device according to claim 1, wherein a distance between the first phase modulation unit and the first side is identical to a distance between the second phase modulation unit and the first side, and
a distance between the first phase modulation unit and the second side is identical to a distance between the second phase modulation unit and the second side.

10. The optical modulation device according to claim 1, wherein the input unit is formed on the first side and the output unit is formed on the second side.

11. The optical modulation device according to claim 1, wherein the traveling-wave electrode is linearly formed from the input unit to the output unit.

12. The optical modulation device according to claim 1, wherein the planar optical waveguide is in a shape of a polygon comprising a plurality of sides, including the first side and the second side, in a plan view, and
the light incidence unit and the light launching unit are each arranged on a side different from the first side and the second side among the plurality of sides.

13. The optical modulation device according to claim 1, wherein the planar optical waveguide is in a shape of a polygon comprising a plurality of sides, including the first side and the second side, in a plan view, and
the light incidence unit and the light launching unit are each arranged on any one of the plurality of sides, and a side on which the light incidence unit is arranged is different from a side on which the light launching unit is arranged.

14. The optical modulation device according to claim 1, wherein the planar optical waveguide is in a shape of a polygon comprising a plurality of sides, including the first side and the second side, in a plan view, and
the light incidence unit and the light launching unit are each arranged on any one of the plurality of sides, and a side on which the light incidence unit is arranged is identical to a side on which the light launching unit is arranged.

15. The optical modulation device according to claim 1, wherein the planar optical waveguide comprises a plurality of Mach-Zehnder interferometers.

16. The optical modulation device according to claim 15, further comprising:
at least one of a second optical splitter section which branches the light incident from the light incidence unit and launches the light to the plurality of Mach-Zehnder interferometers, and a second optical coupler section which combines the light launched from the plurality of Mach-Zehnder interferometers.

17. The optical modulation device according to claim 15, further comprising:
a second optical splitter section which branches the light incident from the light incidence unit and launches the light to the plurality of Mach-Zehnder interferometers, and
at least one of a plurality of waveguides connecting the plurality of Mach-Zehnder interferometers to the second optical splitter section is positioned on the outside of a region between an extended line in the longitudinal direction of first one of two phase modulation units which are furthest from each other of the phase modulation units of the plurality of Mach-Zehnder interferometers and an extended line in the longitudinal direction of a second one of the two phase modulation units.

18. The optical modulation device according to claim 15, further comprising:
a second optical coupler section which combines the light launched from the plurality of Mach-Zehnder interferometers, and
at least one of a plurality of waveguides connecting the plurality of Mach-Zehnder interferometers to the second optical coupler section is positioned on the outside of a region between an extended line in the longitudinal direction of first one of two phase modulation units which are furthest from each other of the phase modulation units of the plurality of Mach-Zehnder interferometers and an extended line in the longitudinal direction of a second one of the two phase modulation units.

19. The optical modulation device according to claim 17, wherein at least one of the second optical splitter section and the second optical coupler section is positioned on the outside of the region between the extended line in the longitudinal direction of the first one of the two phase modulation units and the extended line in the longitudinal direction of the second one of the two phase modulation units.

20. An optical modulation device, comprising:

a planar optical waveguide;

a light incidence unit which allows light to be incident on the planar optical waveguide;

a Mach-Zehnder interferometer which comprises a first optical splitter section branching the light incident on the light incident unit, two arm portions guiding the light branched by the first optical splitter section, a phase modulator comprising a first phase modulation unit linearly disposed on a first one of the two arm portions and a second phase modulation unit disposed on a second one of the two arm portions, and a first optical coupler section combining the light guided from the two arm portions;

a light launching unit which launches the light combined by the first optical coupler section from the planar optical waveguide; and a traveling-wave electrode which comprises an input unit and an output unit, and applies a voltage to the phase modulator, wherein the planar optical waveguide has an outline comprising a first side and a second side, wherein each of the first side and the second side intersect with an extended line extending in a longitudinal direction of the phase modulator in a plan view, the input unit is formed on one of the first side and the second side, the light incidence unit and the light launching unit are positioned in a region different from a region in which the traveling-wave electrode is formed in a plan view, the light incidence unit and the light launching unit are positioned in a region between a first line and a second line, and the first line is parallel with the first side and the second side and intersects a first end portion of the first phase modulation unit of the Mach-Zehnder interferometer and a first end portion of die second phase modulation unit of the Mach-Zehnder interferometer, and the second line is parallel with the first side and the second side and intersects a second end portion of the first phase modulation unit of the Mach-Zehnder interferometer and a second end portion of the second phase modulation unit of the Mach-Zehnder interferometer.

21. An optical modulation device, comprising:

a planar optical waveguide;

a light incidence unit which allows light to be incident on the planar optical waveguide;

a Mach-Zehnder interferometer which comprises a first optical splitter section branching the light incident on the light incident unit, two arm portions guiding the light branched by the first optical splitter section, a phase modulator comprising a first phase modulation unit linearly disposed on a first one of the two arm portions and a second phase modulation unit disposed on a second one of the two arm portions, and a first optical coupler section combining the light guided from the two arm portions;

a light launching unit which launches the light combined by the first optical coupler section from the planar optical waveguide; and a traveling-wave electrode which comprises an input unit and an output unit, and applies a voltage to the phase modulator, wherein the planar optical waveguide has an outline comprising a first side and a second side, wherein each of the first side and the second side intersect with an extended line extending in a longitudinal direction of the phase modulator in a plan view, the input unit is formed on one of the first side and the second side, the light incidence unit and the light launching unit are positioned in a region different from a region in which the traveling-wave electrode is formed in a plan view, and a part of the optical waveguide comprising the Mach-Zehnder interferometer is positioned on an outside of a region between an extended line of the first phase modulation unit and an extended line of the second phase modulation unit.

22. An optical modulation device, comprising:

a planar optical waveguide;

a light incidence unit which allows light to be incident on the planar optical waveguide;

a Mach-Zehnder interferometer which comprises a first optical splitter section branching the light incident on the light incident unit, two arm portions guiding the light branched by the first optical splitter section, a phase modulator comprising a first phase modulation unit linearly disposed on a first one of the two arm portions and a second phase modulation unit disposed on a second one of the two arm portions, and a first optical coupler section combining the light guided from the two arm portions;

a light launching unit which launches the light combined by the first optical coupler section from the planar optical waveguide; and a traveling-wave electrode which comprises an input unit and an output unit, and applies a voltage to the phase modulator, wherein the planar optical waveguide has an outline comprising a first side and a second side, wherein each of the first side and the second side intersect with an extended line extending in a longitudinal direction of the phase modulator in a plan view, the input unit is formed on one of the first side and the second side, the light incidence unit and the light launching unit are positioned in a region different from a region in which the traveling-wave electrode is formed in a plan view, at least one of the first optical splitter section and the first optical coupler section is positioned in a region between a first line and a second line, the first line is parallel with the first side and the second side and intersects a first end portion of the first phase modulation unit of the Mach-Zehnder interferometer and a first end portion of the second phase modulation unit of the Mach-Zehnder interferometer, and the second line is parallel with the first side and the second side and intersects a second end portion of the first phase modulation unit of the Mach-Zehnder interferometer and a second end portion of the second phase modulation unit of the Mach-Zehnder interferometer.

* * * * *